(12) United States Patent
Bjontegard

(10) Patent No.: US 11,489,914 B2
(45) Date of Patent: *Nov. 1, 2022

(54) CONTEXTUAL INTELLIGENCE OF EVERY-THING COMMUNICATION PLATFORM INTEGRATING EDGE COMPUTATION, AUGMENTED INTELLIGENCE AND DISTRIBUTED LEDGER DATA STORAGE NODES AND TOKENS FOR REAL WORLD DATA INTERACTIONS ACROSS INTERNET OF THINGS WITH PAYMENT INTEGRATION

(71) Applicant: Bernt Erik Bjontegard, San Diego, CA (US)

(72) Inventor: Bernt Erik Bjontegard, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,913

(22) Filed: Jan. 19, 2020

(65) Prior Publication Data

US 2021/0352134 A1 Nov. 11, 2021

(51) Int. Cl.
*H04L 67/10* (2022.01)
*G06F 16/27* (2019.01)
(Continued)

(52) U.S. Cl.
CPC .............. *H04L 67/10* (2013.01); *G06F 16/27* (2019.01); *G06N 5/04* (2013.01); *G06V 20/10* (2022.01);
(Continued)

(58) Field of Classification Search
CPC ... G06F 16/27; H04L 63/0428; H04L 63/105; H04L 67/10; H04L 9/3239; H04L 9/50
See application file for complete search history.

(56) References Cited

U.S. PATENT DOCUMENTS

| | | | |
|---|---|---|---|
| 2006/0031436 A1* | 2/2006 | Sakata | H04L 12/14 709/221 |
| 2010/0262464 A1* | 10/2010 | Monteforte | G06Q 30/0268 705/14.65 |
| 2011/0065451 A1* | 3/2011 | Danado | H04M 1/72457 455/456.1 |

* cited by examiner

Primary Examiner — Mahran Y Abu Roumi
(74) Attorney, Agent, or Firm — Alexander R. Schlee; Pascal A. Schlee; Schlee IP International, PC

(57) ABSTRACT

The use of sensor data, data interactions between connected devices, data from physical world sensors and users of these where the data gathered is stored across central computation and storage servers, across multiple data nodes in secure and encrypted distributed ledgers, and the data is interacting with on-device computation and storage capabilities to create data interactive, electronic networks that enables multi-level control, variable access, payment and re-numeration capable, multi-user communications of real-time contextually relevant data, process and workflow data and information among network-connected devices, connected displays, sensors and the actions based on those communications, with the collected data gathered from the interactions stored on cloud based augmented intelligence computation servers and or select data stored in distributed ledger blockchain nodes with smart contract per data node delivering content, information, access and instructions based on past behavior and actions, instructions or computed commands with this data combined with the data of the outcome of these interactions stored on decentralized network of data nodes for immediate benefit, rewards, reoccurring remunerations, disclosure of information and benefits to authorized and approved users as the network-connected devices move from one location to another and/or the data/information flow among those devices change over time.

5 Claims, 75 Drawing Sheets

(51) Int. Cl.
*H04L 9/40* (2022.01)
*G06N 5/04* (2006.01)
*G06V 20/10* (2022.01)
*G06N 20/00* (2019.01)

(52) U.S. Cl.
CPC .......... *H04L 63/0428* (2013.01); *G06N 20/00* (2019.01)

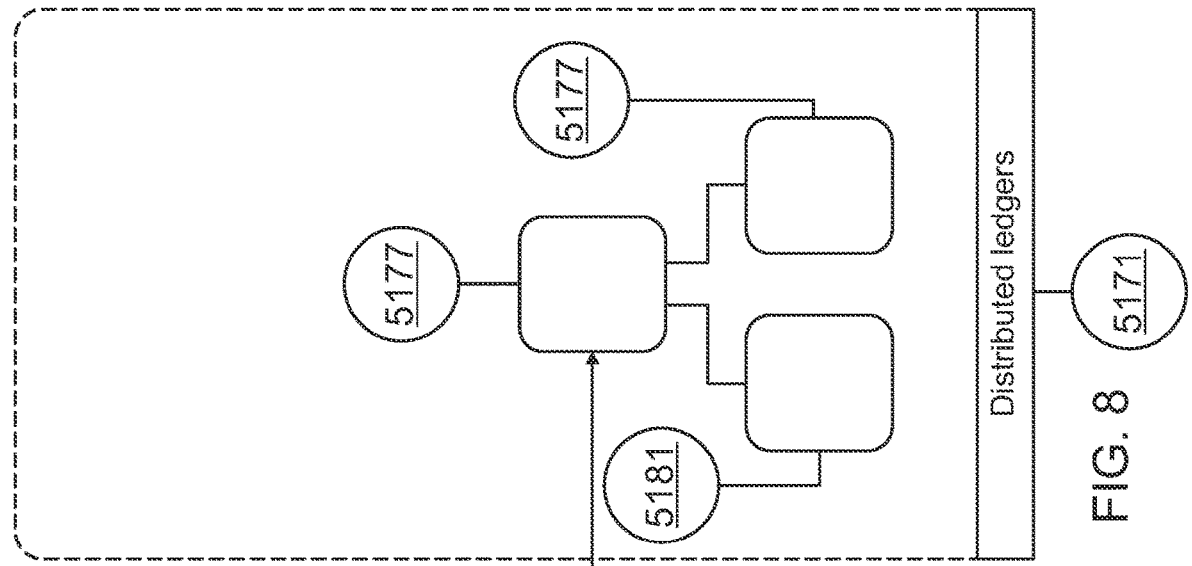
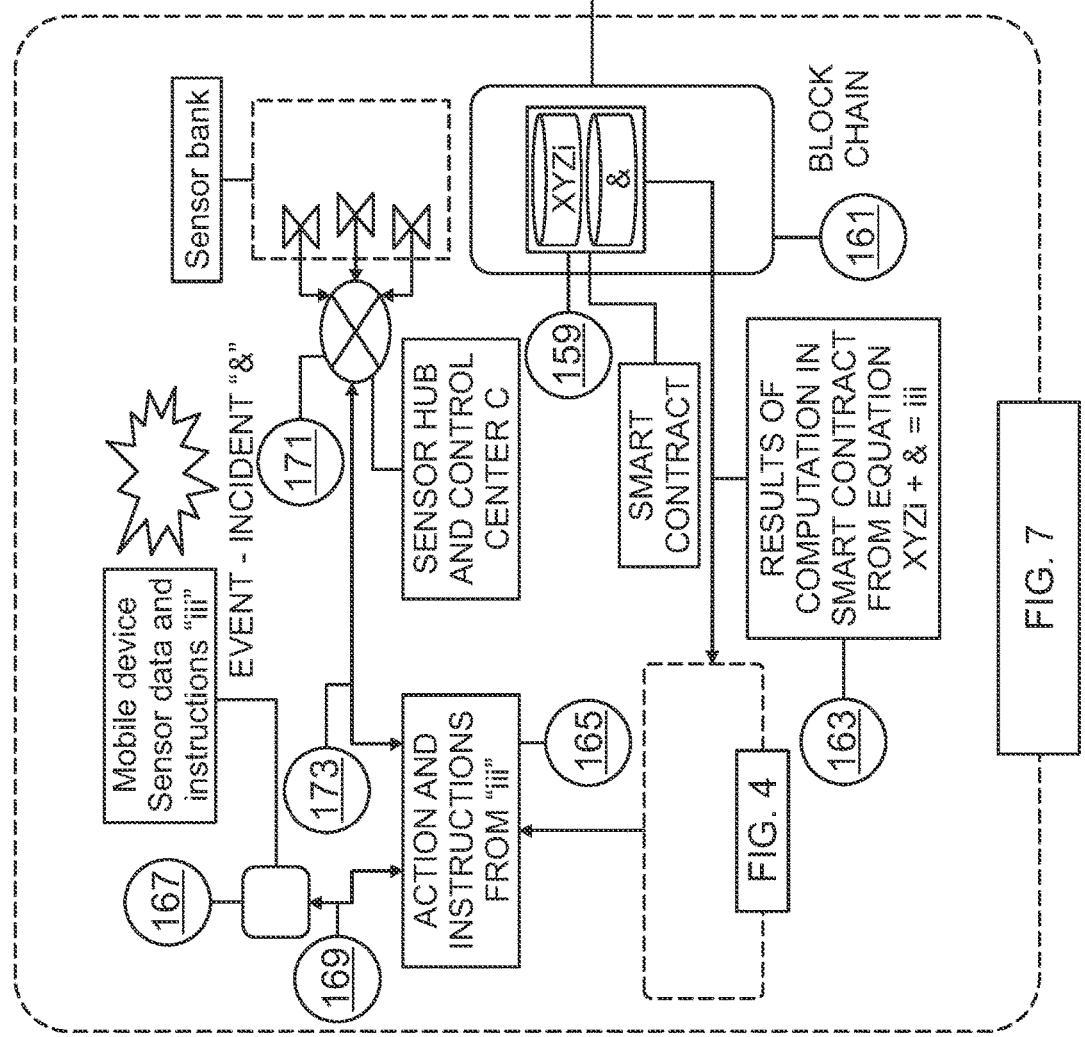
FIG. 8
FIG. 7

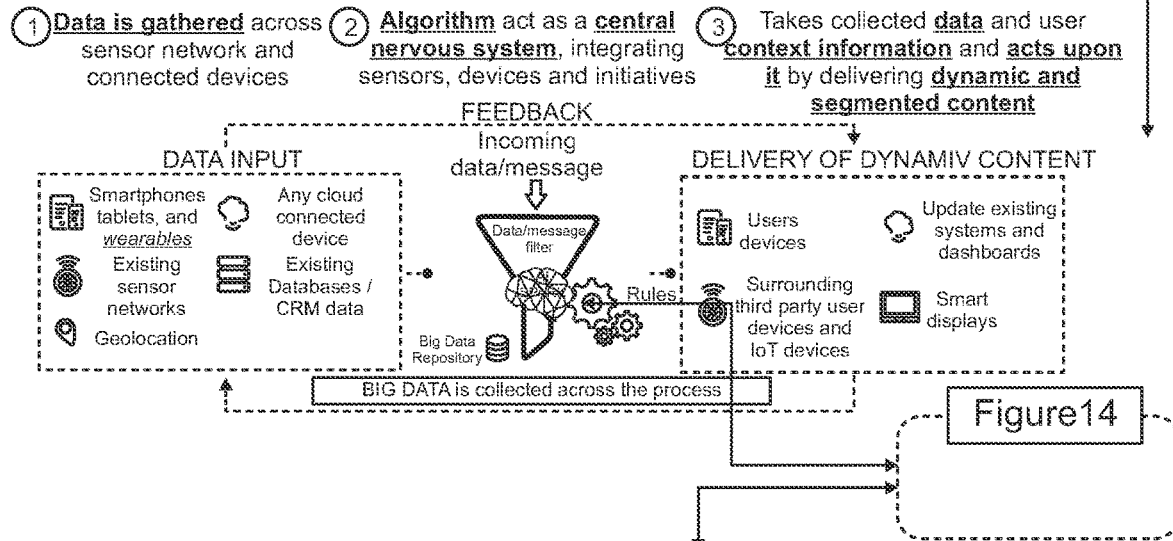
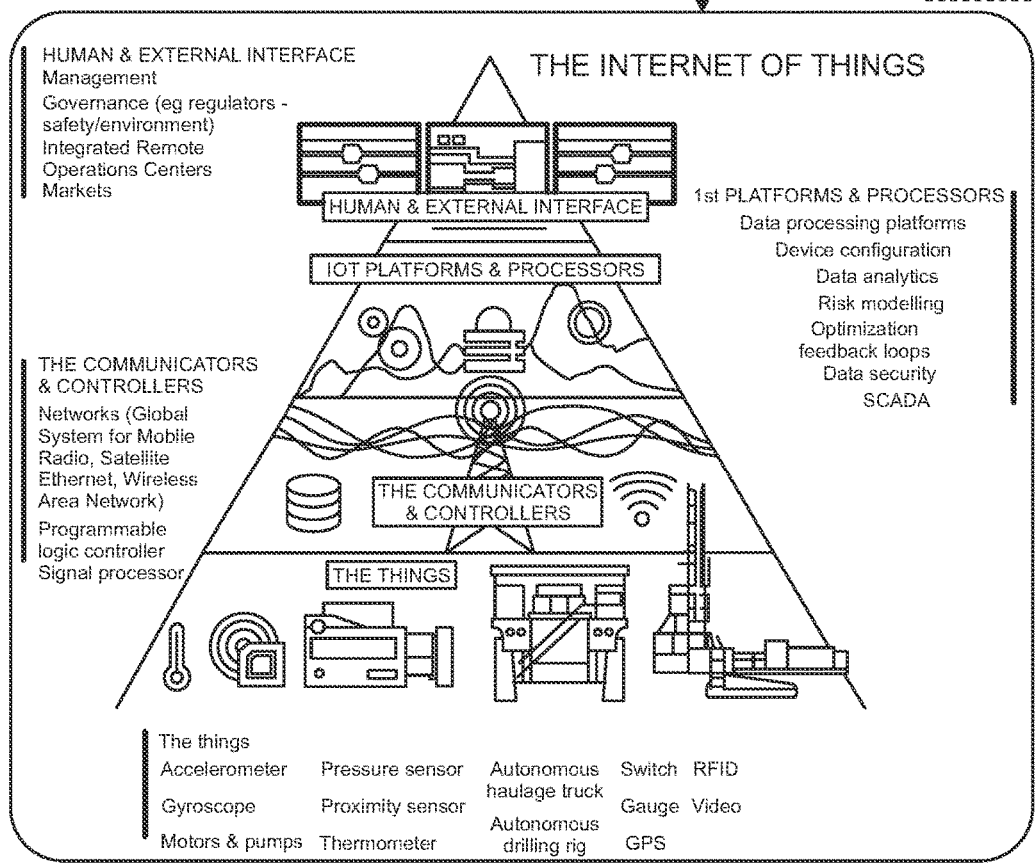
FIG. 33

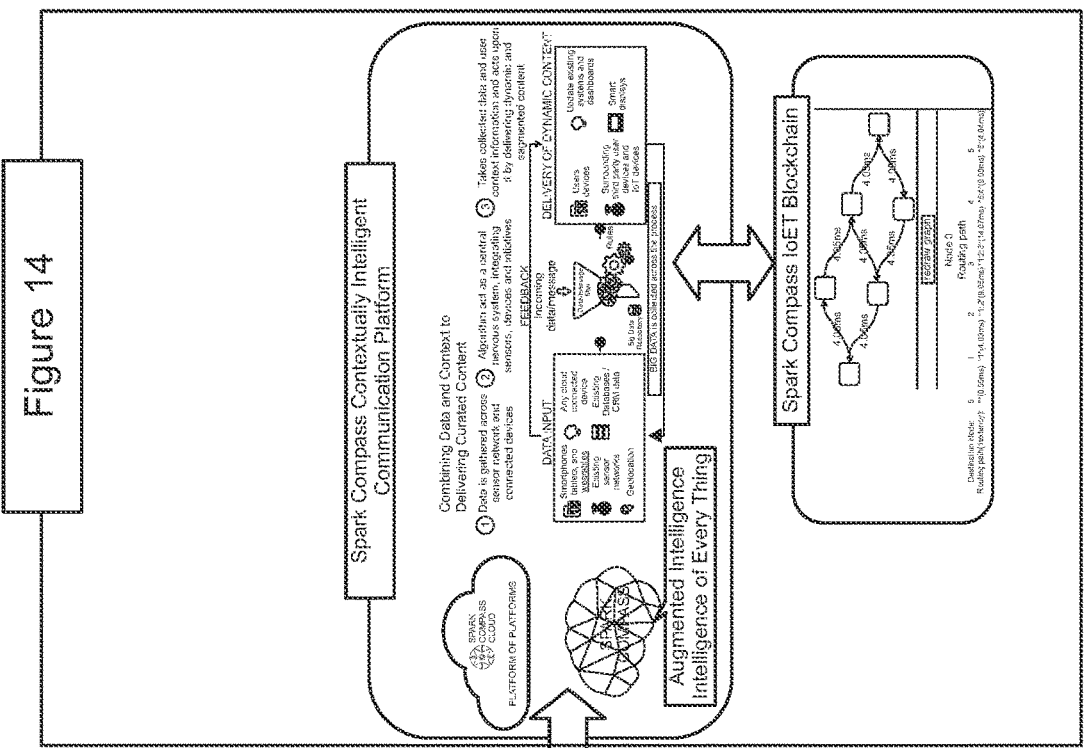
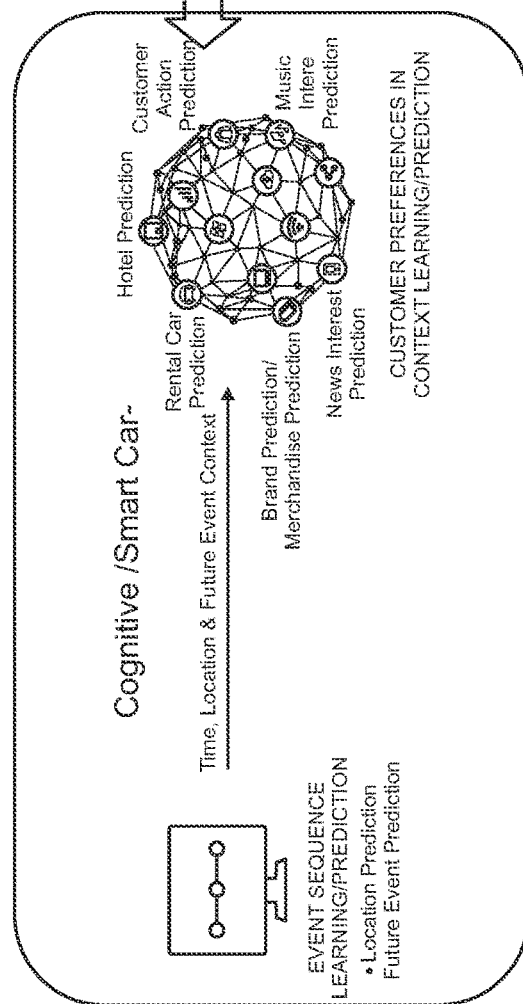
FIG. 40

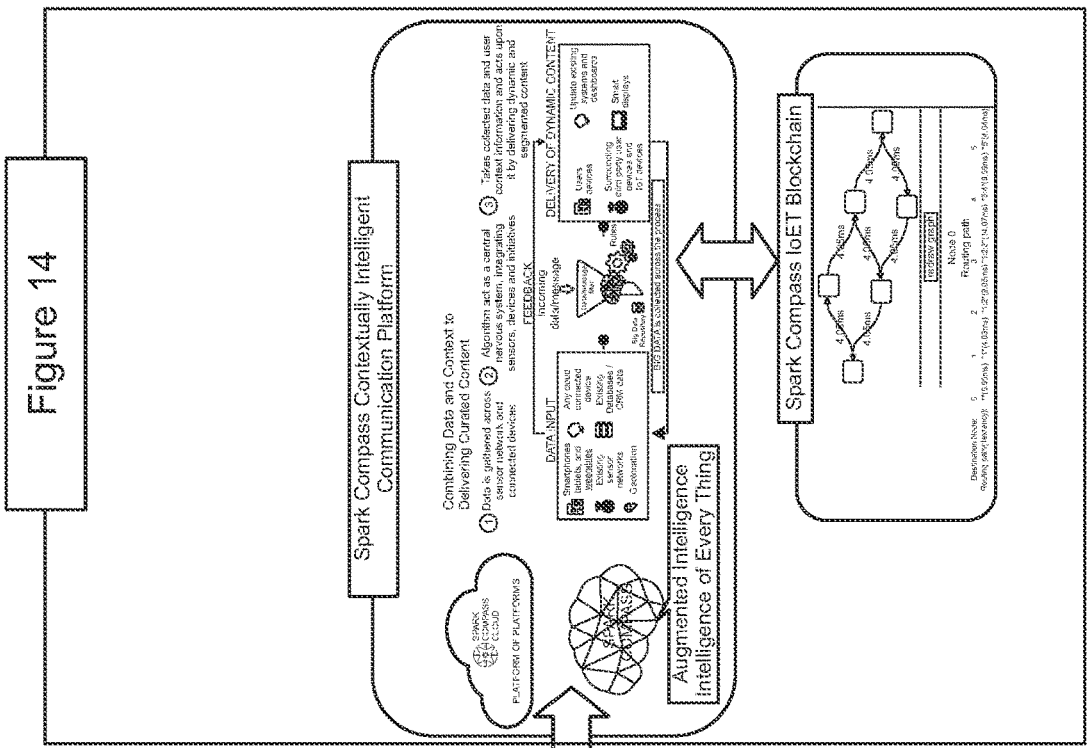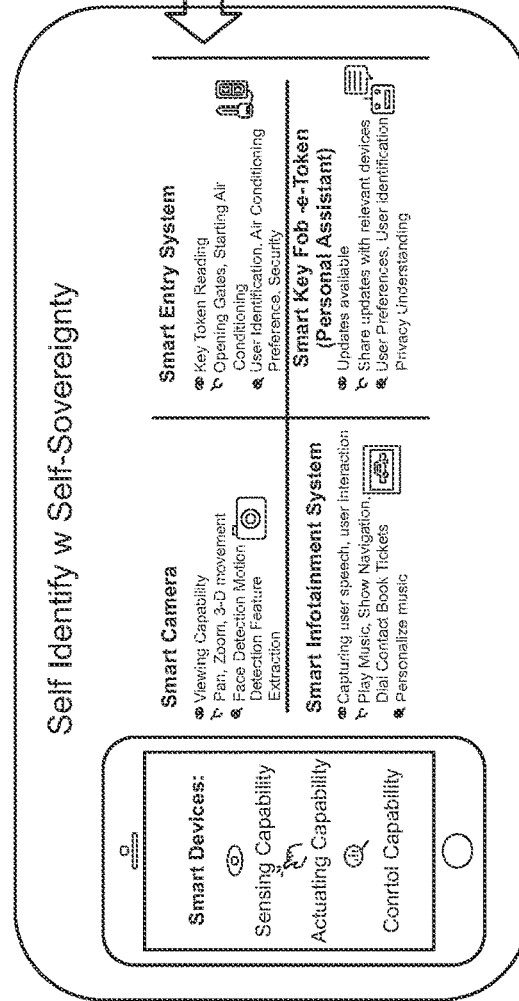
FIG. 41

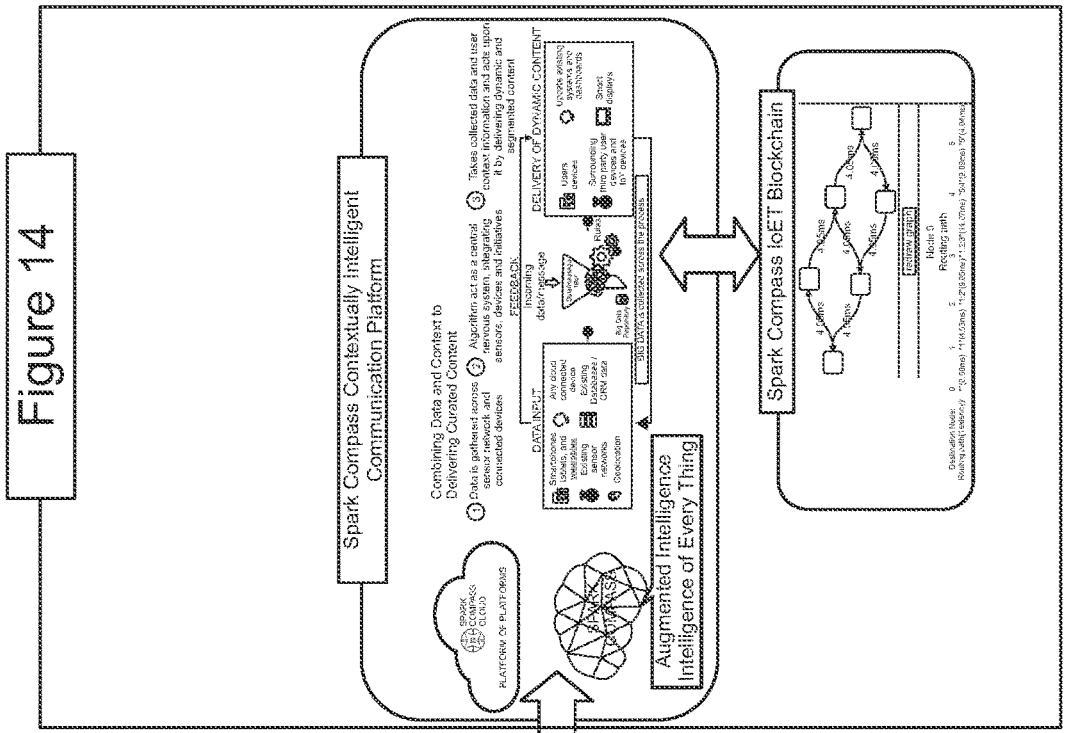
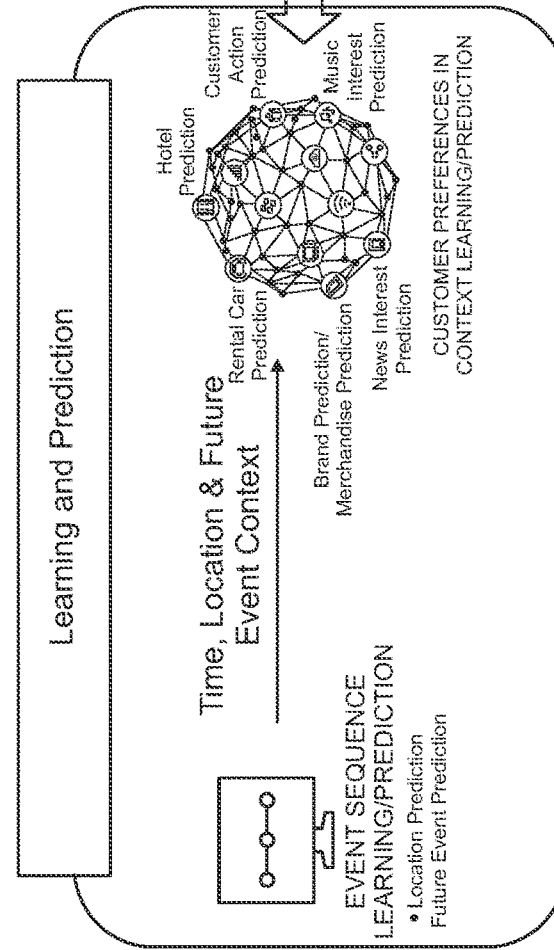
FIG. 49

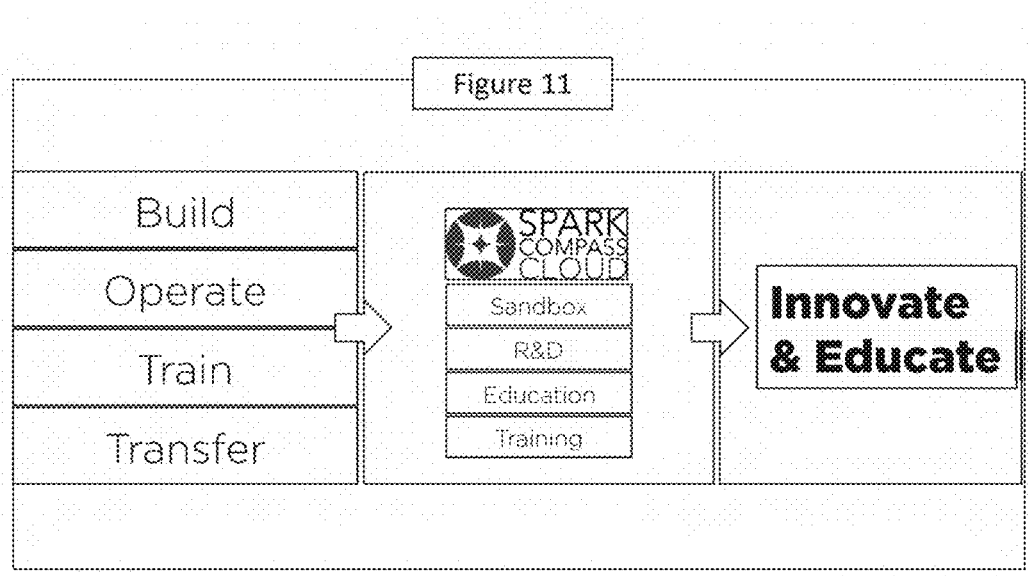
Fig 55.

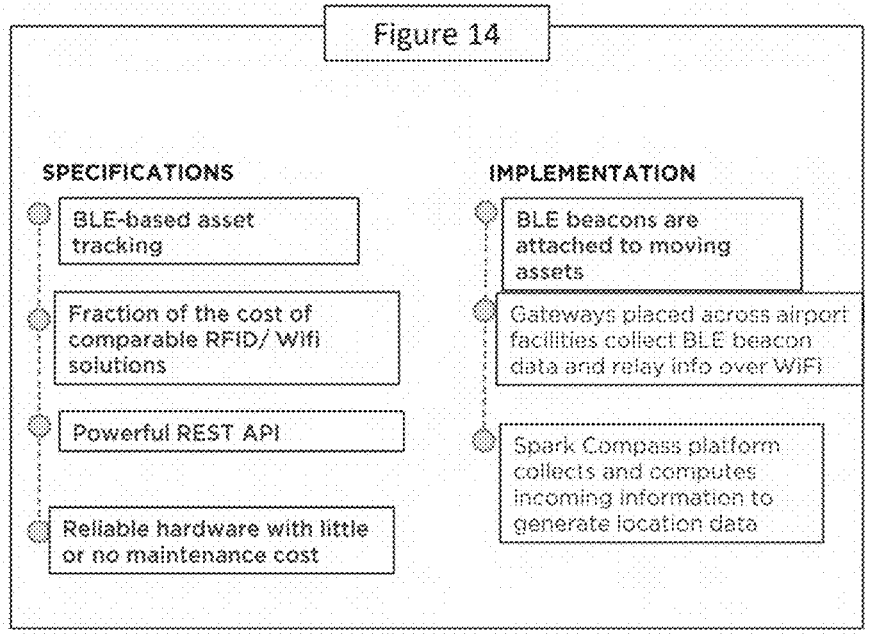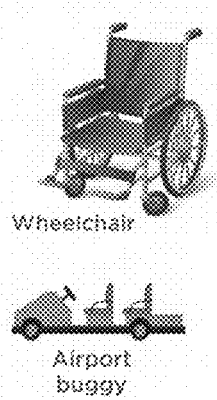
Fig 57.

CONTEXTUAL INTELLIGENCE OF EVERY-THING COMMUNICATION PLATFORM INTEGRATING EDGE COMPUTATION, AUGMENTED INTELLIGENCE AND DISTRIBUTED LEDGER DATA STORAGE NODES AND TOKENS FOR REAL WORLD DATA INTERACTIONS ACROSS INTERNET OF THINGS WITH PAYMENT INTEGRATION

CROSS REFERENCE TO RELATED APPLICATIONS

This application incorporates by reference each of U.S. nonprovisional application Ser. No. 15/052,853, filed 24 Feb. 2016, U.S. nonprovisional application Ser. No. 15/052,859, filed 24 Feb. 2016, U.S. nonprovisional application Ser. No. 15/052,868, filed 24 Feb. 2016, U.S. nonprovisional application Ser. No. 14/433,267, filed 2 Apr. 2015, International application PCT/US13/062504, filed 29 Sep. 2013, U.S. application Ser. No. 14/040,677, filed 28 Sep. 2013, now U.S. Pat. No. 9,338,622, issued 10 May 2016, U.S. provisional application 61/882,593, filed 25 Sep. 2013, U.S. provisional application 61/709,710, filed 4 Oct. 2012, U.S. provisional application 62/324,283, filed 18 Apr. 2016 and U.S. provisional application 62/379,150, filed 24 Aug. 2016.

This application claims the benefit of each of U.S. provisional application 62/379,150, filed 24 Aug. 2016, and U.S. provisional application 62/324,283, filed 18 Apr. 2016; and is a continuation-in-part of U.S. nonprovisional application Ser. No. 15/052,853, filed 24 Feb. 2016, which is a continuation of U.S. nonprovisional application Ser. No. 14/040,677, filed 28 Sep. 2013, now U.S. Pat. No. 9,338,622, issued 10 May 2016, and claims the benefit of each of U.S. provisional application 61/882,593, filed 25 Sep. 2013 and U.S. provisional application 61/709,710, filed 2 Oct. 2012; is a continuation-in-part of U.S. nonprovisional application Ser. No. 15/052,859, filed 24 Feb. 2016, which is a divisional of U.S. nonprovisional application Ser. No. 14/040,677, filed 28 Sep. 2013, now U.S. Pat. No. 9,338,622, issued 10 May 2016, and claims the benefit of each of U.S. provisional application 61/882,593, filed 25 Sep. 2013 and U.S. provisional application 61/709,710, filed 2 Oct. 2012; is a continuation-in-part of U.S. nonprovisional application Ser. No. 15/052,868, filed 24 Feb. 2016, which is a divisional of U.S. nonprovisional application Ser. No. 14/040,677, filed 28 Sep. 2013, now U.S. Pat. No. 9,338,622, issued 10 May 2016, and claims the benefit of each of U.S. provisional application 61/882,593, filed 25 Sep. 2013 and U.S. provisional application 61/709,710, filed 2 Oct. 2012; is a continuation-in-part of U.S. nonprovisional application Ser. No. 14/433,267, filed 2 Apr. 2015, which is a Section 371 application of International application PCT/US13/062504, filed 20 Sep. 2013, which claims the benefit of U.S. provisional application 61/882,593, filed 25 Sep. 2013 and claims the benefit of U.S. provisional application 61/709,710, filed 2 Oct. 2012.

FIELD OF INVENTION

The invention relates generally to interactive, digital electronic networks that leverage on-edge computation capabilities of mobile and connected devices, physical world sensors and other sensors that can determine the context of the users that interact with the system via enabled and activated multi-level control, variable access, multi-user communications of real-time contextually relevant data or information among network-connected devices, and actions based on those communications, as the network-connected devices move from one location to another and/or the data/information flow among those devices change over time, the use of this capabilities to augment these communications with the learned "intelligence" from the use of the system, the storage of the data gathered via the systems, the data gathered from the augmented intelligent communications that are activated and enabled by the system, as well as the results for such communications in a distributed ledger data storage system with its own data storage encryptions, access and distribution of the data in distributed ledgers with smart contracts within the system that can drive further interactions from the stored and retained data back into the sensors, devices and other connected devices in the real world enabling the smart contracts and algorithms in the blockchain system containing the distributed ledgers for future and further review, computation or validation, while enabling the system, parts of the system or dedicated tokens generated within the system to pay for merchandise, gain access to locations, venues or equipment, transfer ownership of assets, gain use or ownership of content, earn privileges or share secure, privileged or private information or data with authorized users.

SUMMARY OF INVENTION

The interactive, electronic networks according to the present disclosure overcome the drawbacks of ineffective data storage and challenge to grant access to, use and leverage the data, by instead accessing the data and the use of the data in efficient and interactive data storage systems that leverage distributed ledgers with data use computations within the data storage such as "smart contracts" in a series of servers that are not limited to one location or one server, also known as "block chain" data storage. By enabling known electronic networks that are providing multi-level control, variable access, multi-user communications of real-time contextually relevant data or information among network-connected devices, and actions based on those communications as the network-connected devices move from one location to another and/or the data/information flow among those devices change over time within a distributed ledger data storage, efficient use of the data can be enabled and activated. Furthermore, by leveraging the known features of the blockchain such as smart contracts, pre-determined interactions and action-event commands can be pre-programed within the data structure, activating "augmented intelligence" to the systems delivering enhanced content, instructions and other communications. The networks and data storage capabilities described herein are intended, preferably, to work in conjunction with and may incorporate features of the contextually intelligent communication platform(s) (CICP(s)) described, for example, in International application PCT/US13/062504, U.S. application Ser. No. 14/040,677, filed 28 Sep. 2013, U.S. provisional application 61/882,593, filed 25 Sep. 2013, and U.S. provisional application 61/709,710, filed 4 Oct. 2012. However, the networks described and augmented intelligent data storage described herein do not depend on or rely uniquely on those CICPs. One aspect of the present disclosure may be referred to as an Intelligence of Every Thing contextual intelligent communication platform (IoETCICP). The IoETCICP is described herein with reference to several preferred embodiments that include delivery of real-time contextually relevant content, instructions, data, offers and experiences based on the benefits of distributed ledger based data storage such as commonly known as "block chains", while using the "smart contract" features of private or public block chain architecture to deliver "augmented intelligent" communications based on the data gathered from sensors and connected things in the real world "internet of Every Thing". Furthermore, gathering and recording real-time performance data to multiple administrators from multiple organizations and various level of access at the same time and store this data in distributed ledgers for further use by the systems and presented to be reviewed and accessed to those that have been granted access via the features of the blockchain architecture. Additionally, the IoETCICP is described herein with reference to several preferred embodiments that include systems to monitor and improve the environment and pollutants in air, water, noise and light, promote and verify a healthy lifestyle, promote and deliver wellness encouragement, verification and reward for healthy behavior while improving medical care, including pre- and post-surgical operation care with verification of medication and activity compliance. In yet another aspect, the IoETCICP is described herein with reference to several preferred embodiments that include combinations of CICPs systems with sensors and devices that combines on-board, on-device computation algorithms with calculation results communicated via aggregation hubs that along with other CICP computing hubs, together communicate with the same common CICP central data gathering and computation site that is optionally integrated into a common interface, preloaded onto numerous connected devices and/or included as a part of an operating system that can enable the interactions of the physical environment or world with the digital environment or world.

In yet another aspect, the IoETCICP is described herein with reference to several preferred embodiments that include a centralized system that functions to identify the location of devices, products and assets within a physical space through use of listening devices, active transmitters, mobile devices, network-connected equipment, including connections through use of, for example, relatively low cost proximity beacons, NFC tags and/or other sensors and effectively retain, store and share the data with those that have permission in efficient and secure manners.

In yet another aspect, the IoETCICP is described herein with reference to several preferred embodiments that include a centralized system that functions to identify the location of devices, products and assets within a physical space through use of listening devices, active transmitters, mobile devices, network-connected equipment, other sensors and equipment to present curated experiences, curated content, dedicated and specific instructions to the user of such connected devices to enhance their actions whether in an augmented reality game or content deliver with a specific game associated with that specific location, game play or user's activity, to an activity to is representative of a pre-recorded action by someone else at another location, to passive activities performed by the user such as riding on a bus—all activities are connected to the MTCICP which presents the curated content to enable the curated experience.

In yet another aspect, the IoETCICP is described herein with reference to several preferred embodiments that include a centralized system that functions to identify the actions of workers, staff, as well as equipment and assets within a physical space through use of listening devices, environment sensors, active transmitters, mobile devices, network-connected equipment, other sensors and equipment to record actions, verify the actions, date stamp and locate the actions with specific data associated with the specific time, users and location at the moment the data is captured, then storing all the collected data within a block in a block chain that is designated and specifically associated with the action, the location, the equipment, the product, the shipment, the facility, the crop, the harvest, the slaughter, the shipment, the packaging, the processing, the transportation or the handling effort that are activated that that very moment—all activities are connected to the IoETCICP which stores the data with all the associated data in a block chain that is forever associated with the activity performed, with the capability to grant access to the data retained to those with approval.

In yet another aspect, the IoETCICP is described herein with reference to several preferred embodiments that include a centralized system that functions to store the data collected in such a fashion that it is transparent yet securely stored with trackability to the originating source of the data with the capability to remove the data associated with specific users on the user's requests should such desire be expressed and communicated.

This data can be used to verify conditions of the product, the handling of the product and whether the origination of the product and subsequent handling, processing, addition or other activity associated with said product is in compliance with safety, handling, certification, processing standards, policies, regulations or laws.

In yet another aspect, the IoETCICP is described herein can leverage the computation and data storage capability of various sensors, devices, equipment from mobile devices, smart city sensors, car keys, automobiles, equipment, devices, audio/TV, cameras, digital signage, wearables, AR/VR/MR googles, embedded devices to become extended edge computing devices connected with the IoETCICP to deliver a networked system of devices where the connected devices perform computations that are relevant to their context and capabilities with the system as a whole interacting as a massive augmented intelligence communication system.

In yet another aspect, the IoETCICP is described herein can leverage the computation and data storage capability of various sensors, devices, equipment from mobile devices, smart city sensors, car keys, automobiles, equipment, devices, audio/TV, cameras, digital signage, wearables, AR/VR/MR googles, embedded devices to become extended edge computing devices connected with the IoETCICP to deliver a networked system of devices where the connected devices store the data gathered by the device on the device, the results of the computations performed by the device, as well as the results of the interactions with other nodes and sensors on the network thereby enabling the individual data storage on each device to becoming data storage nodes in the massive interactive real-world blockchain network described as a the complete IoETCICP.

In yet another embodiment, the data stored in the blockchain can be used to gain access or exchange information or exchange merchandise in a manner similar to a monetary exchange using standard governmental exchanged and issued currency and legal tender such as USA $ or Norwegian Krone. This is also known as crypto currency and is a known business and technology methodology. In this embodiment, the new invention is that the exchange of such data and access, privileges requested and granted can be centered around a "token" that the user granting the access or owner of the merchandise or the content, can accept as a tender for granting the access, transferring ownership of the merchandise or transferring access or right to the content via the token and the blockchain and its smart contracts that will trigger events within the CIPS granting immediate access, transfer the merchandise ownership or granting access to the content, in one transaction between the user and owner. In such instances, the data of the transfer the value exchanged and the content or merchandise transferred is retained in the blockchain and its distributed ledgers, the blockchain smart contracts sends information to the CICP to unlock access, transfer rights or activate content release within the CICP system. When such as transfer, access or activations has occurred, another data set including data such as location, users, technologies, description of the transfer, content and value of the exchange is sent to the blockchain in another data node for future encrypted data storage and access. Future transaction of access, data, ownership and access can follow with reference back to the instance initially described, thereby enabling traceability in the future for those that have been granted access via the typical blockchain data encryption technologies enabled.

In yet another embodiment, a user can have his personal data stored in a blockchain—a "Personal Information Block Chain"—"PIBC" in distributed ledgers with various ledgers holding various data and information, from medical insurance and health records in other's preferences in food, cars, travel, sports teams and other demographic information. As he enters an area with his connected device that is connected to this blockchain via a CICP system that is also active in the area and physical location that he is in, smart contracts in the blockchain can interact with the CICP to activate transfer of knowledge and information from the PIBC to the CICP when and only if the user has granted such access as part of the smart contracts in the various distributed ledgers in the PIBC. When such transfer of data into the CICP is activated, the CICP will via its action-event architecture record such a data transfer. This data transfer is then sent back to the PIBC for future storage in the PIBC. The knowledge transferred can drive results in the real world that are either of value to the end user or not. It can then be recorded in the CIPC as an action event that has a positive or negative result. This result is recorded and retained by the CICP and can then be transmitted and stored in the PIBC. The results of these interactions will be retained and "knowledge" and "preference" in the PIBC and CICP. The future use of this knowledge and known past behavior can enable the CICP and PIBC independently and interactively across on CICP and the PIBC or in future instances across the PIBC and another CICP or multiple CICPs. This future enhanced contextually intelligent communications of data and knowledge, actions and instructions, content and results are the basis for the "Augmented Intelligent Communication"—AIC—system described herein.

In yet another use of the invention, such an AIC system can be used to reward a user of such as system when he is interacting with a connected CICP. In this instance, when the user arrives in a location, facility, enters a piece of equipment or operates an enabled piece of equipment, enters a sports venue, hotel vessel, vehicle, airplane or operates any type of equipment that has been activated or integrated with or connected with such a system. It can also be used when the user is using a communication device that has been enabled, integrated or active with the system. It can also be used when he is in front of a display or monitor or other system that transmits or displays information in video, audio, virtual reality, augmented reality, mixed reality, enhanced reality, is attached, integrated, embedded, attached or implemented to his human body and or mind and or brain and or nervous systems, hearing, seeing, touching, tactile or neurologically. The content, information, instructions, actions or other data set can thereby be presented in any way via current and future methodologies, those possible and available today, those under R&D today and methods yet invented. It is the data transfer and the data storage, the activation of the data and the storage of the actions resulted from the transfer of the data that the invention is referring to. The user is in this instance interacting with the connected world around him via the CICP system that is activated at this very context. Based on the Augmented Intelligence in the CICP, the CICP communicates with the PIBC to detect information and knowledge that is usable to the CICP so that the CICP can understand the background, the preferences, desires, objectives, tasks and the information about the user in this give context. The user can have set parameters for the sharing and distribution of such content and information with smart contracts within his PIBC. The CICP is also connected with other databases of knowledge. These can store information about products, content, food, drinks, tickets, offers, promotions, coupons or content, merchandise, access, products or experiences that are available at the location or of interest to those that are there. When such data is detected by the CICP to be of potential benefit or value to the end user in this specific context, the data can be presented by the master and connected CICP to the user's connected device or other communication devices that are relevant to the context. The CICP can record and retain that such presentations or content delivery was presented to the user at the moment and record this as an action and event, then record and retain this event on the PIBC. This generates a new node in the PIBC with time stamp, who what and where as well as description of the action done. Furthermore, the result of such action—delivery of content, presentation of content, information or offer can be recorded and retained with various levels of responses from yes/no to did not want now, perhaps later, perhaps another location, better price needed etc.—all data points that can be recorded and retained in the PIBC. Thereby the user controls the data recorded and stores this for future value add in the PIBC. This data storage furthers the power of the Augmented Intelligence to drive better future outcomes when the user has future interactions in the context of the CICP or interacts with other CICPs in the future granting this access to his PIBC.

In yet another embodiment, this PIBC can be used to provide further enhancements for the user when AIC occurs. In such as instance, the user enters into a context as described and activates and allows interactions with CICP in control of that context. As such interactions are part of the CICP system, each action is control, recorded and retained. A value can thereby be assessed to the granting of such access to the user's PIBC. The user can then earn a reward, a token, a discount or additional products, content or information, privileged or status based on this granted access to data. Once this process is established and repeated, the end user can earn or collect value every time he grants others access to his PIBC. This "Earned Reoccurring Income" process is part of the value to the end user—as well as those that have products or merchandise to offer, access to grant or content or information to share. When connected with such an AIC system, the data delivery will become increasingly beneficial to the end user and those presenting it. The user will only accept and be served content and offers that are relevant to him at the location, and those that have offers, products, access or content can present to those that have a proven past behavior that is likely to deliver a transaction, close of tender, access or transfer of ownership.

Furthermore, this system can be used by the end user to earn an income from the sharing of his private and personal data stored on his secure PIBC. This capability of the user to exchange data to earn a token for such transfer in an AIC system as described, or via any type of traditional payment transaction or monetary systems used by banks and merchants to handle electronic money transfers, ticket holder for access, content owners for displaying, unlocking and or distributing their content can be rewarded to the user. Such rewards can become tokens themselves, namely "Earn Reoccurring Income Coins"—ERICS.

Furthermore such exchange of data can enable and active new methods of interactions where multiple parties benefits by activating and using ERICs as tenders. One such embodiment may be when a user enters a sports stadium during an event. The stadium has an AIC enabled CICP and the user activates his PIBC stating that he is willing to let the stadium CICP activate and connect with his PIBC. This can be manual or automatic based on the context intelligence of both systems. In this instance, the CICP and the PIBC uses ERIC tokens to grant the user preferred access. The PIBC is activated and alerts the CICP that the user is now on the premises. As he is on the premised, his connected device is receiving personalized content offers to his favorite food and drink based on his PIBC. The delivery of these earns him a few ERICKs and if he accepts, he can use his stored ERICS to pay, while earning ERICS for accepting the offer and storing the knowledge of the transaction. If he allows the provider to store the transaction with his information as well, he may earn more ERICS in exchange for this transaction of knowledge. As digital screens presents offers, he can be presented an opportunity to acknowledge that he saw the message, consumed the messaging in exchange for some ERICS, in this instance, his connected device will know he is in the context of the digital display when the content was displayed, and his connected device can present an offer to earn ERICS if he acknowledges that he consumed the branding message.

The possibilities to create value around data usage using such AIC system can extend to processes such as productions of assembled products, generation and distribution of energy, production, harvest, transportation and processing of food, distribution of knowledge in education, creative content such as movies and music, instructions to work force, staff, security and services and can enhance the communications between humans and machines, humans and implants in the human body and machines to machines.

The integration of a value assigned for the data stored, the data used, the date exchanged, the behavior performed, the outcomes and results drive, can be a benefit to those that need to deliver more relevant products and services to those that can benefit, while providing benefit to those that are now able to own and share their data to their own data regardless of where such data is stored. The benefit of the blockchain is that the data can be decentralized, secured, accessible when needed and encrypted so that it is safe. The invention thereby enables end users to use the data, benefit from the enhanced results from the usage of the data and can earn benefits from the usage of the data. The invention is creating a master system of CICPs, IoETCICP, PIBC and leverages AIC to drive better outcomes regardless of the communication protocols, the connected devices, data storage or current limitations of any such devices.

Further value of the content created by the end user can be proved by the operator of the CICPs, IoETCICP and/or PIBC systems to reward the user for content, comments, photos, videos, commentary, experiences that the end user is capturing at the location and sharing with the operator. In exchange for the sharing of such "crowd sourced", "crowd created" and/or "crowd captured" experiences to other users, simultaneously or later, the CICPs, IoETCICP and/or PIBC can compensate the originator for such privilege. This can be in form of traditional money, in tokens, in access, in content, in privileges or in ERICs. Such users may also be granted free access paid for by the CICPs, IoETCICP or PIBC to enable such crowd data. Data and experiences can be standard selfie photos, photos, or videos, blog commentary, social media commentary, streaming or other media content distribution, VR selfie, VR interviews and other future enabled immersive experiences. Should there be a restriction on such content capture and distribution by the owner or operator of the event, the venue, the team, the league, the management or representation of the actors, members, athletes or others, the CICPs, IoETCICP and/or PIBC can provide compensation for the distribution rights enabling the partner to earn additional income.

A small or large enterprise can benefit from enhanced business operations, a education entity can deliver better knowledge, a city can deliver better services and a central government can enhance employability, environment, data distribution, knowledge transfer, raw material extraction, processing, distribution and sales, improve security, distribute energy efficiently, ensure water is clean and distributed while measuring the environment. New levels of education can lead to new jobs, and better knowledge of performance in current jobs can improve efficiencies and bottom line profits. This is achieved by using the IoETCICP to store data, compare outcomes today to those yesterday, use AIC to deliver instructions for better outcomes tomorrow, repeat the measurement and validation of improvement until such improvement is recorded and retained, and then use this for the AIC delivery of instructions the next moment after this is achieved.

The value of the use of the IoETCICP across a complete business enterprise can be illustrated by the use of the invention to track produce from seed to consumption by humans. While many aspects of the process management and the logistics tracking is well known and established by numerous entities even large governing bodies, the invention is a complimentary solution that can be integrated and work alongside such system. The objective of the system is to create data integration and capture, actions and information that is captured along the logistics process in such as fashion that it can be displayed, made available checked and verified at any step in the process. One such embodiment can be a rice farm in Thailand. This farm has a collection of "smart farm sensors" that can measure soil quality and moisture content, hyper local weather, air and water quality, presence or lack thereof of pesticides as an overview of some of the capabilities of such sensors today. These sensors can be solar powered and placed across the farm and communicate with the IoETCICP via cell coverage, 5G or low power wide area networks such as SIGFOX. These growing conditions from seeding to time for harvest, combined with hyper local weather data gathered from connected weather stations across the farm is collected, recorded and stored via the IoETCICP. The farming staff can be equipped with connected wearable devices that have GPS and motion capture capabilities. These can locate each staff member and capture swing data when he is harvesting the rice such as how many swings an hour, force and speed. The date for harvest has been determined. The staff is dispatched with instructions on where to start based on hyper local weather data and growing condition using the AIC components of the IoETCICP. This moment starts a Produce Information BlockChain (PIBC). The growing data from seeding up to this moment is stored in the block chain. The data from the staff and their performance, hyper weather conditions and their exact locations are also presented into the block chain. Once the rice has been cut and gathered, it is presented for processing. This is another data point where the equipment has a fixed latitude & longitudinal location and has a data output verifying the process. This is another data point communicated to the IoETCICP with data results of action, time and location stored in the blockchain. As the rice is packaged, the packaging will be identified via a NFC tag, QR code RFID tag, bar code, or other visual or electronic tag that gives the product package an identifier. This identifier can be used and tagged via a connected device by the operator of the process or by the equipment itself. Either way or both ways, this is another data point communicated to the IoETCICP with data results of action, time and location stored in the blockchain. As the package with the rice is transported, sensors may be on the transportation devices from trucks to containers, to ships to trucks. Each sensor can either gather data and transmit all the time to the IoETCICP, or gather and store data constantly and transmit only when in range or during certain intervals or during anomalies or when data are outside of an accepted range or any combinations thereof. This is another data point communicated to the IoETCICP with data results of action, time and location stored in the blockchain. The sensors can also be connected devices such as mobile phones that records location and driver patterns, and since location is known, local weather data can also be captured if of interest. This is another data point communicated to the IoETCICP with data results of action, time and location stored in the blockchain. As the product moves through the process, the data can be accessed and verified by authorized personnel. Inspectors can access the produce and do their quality and rating tests. Importers and exporters, brokers, buyers and distributers can transfer ownership and transfer funds or tokens to accommodate this. Authorities or sellers can block further access to data if in violation or non-performance. All are data points communicated to the IoETCICP with data results of the actions, time and location stored in the blockchain. As the produce goes through the process all authorized parties can have access to all data, or only data that they have been specifically granted access to. At the very end, a consumer of the rice in a sushi restaurant in San Diego can easily access a mark, NFC, image, QR code or other identifier to see, learn and verify the origin of the rice, the way it was grown, harvested, shipped and prepared by connecting his device to the CICP system at the restaurant that has AIC based on the data provided by the parties that have access to the IoETCICP. He can even earn ERICs while eating by accepting an offer to buy a Saki that was produce in the neighboring village and distributed the same manner.

Yet embodiment of the invention enables enhanced real-world experiences to travel with the user as he or she moves around in daily life, work, travel and pleasure. In this instance, a Contextually Intelligent Ambient Audio Tracker S—CIAATS—leverage at CICP and the user's PIBC data-based and AIC to deliver music and audio that is relevant to the user as she moves around and performs tasks in her daily life. In this instance, the user has a connected device or wearable of some sorts that is connected with a CICP and her PIBC. A separate and dedicated CICP with dedicated CIAATS algorithms or a dedicated CIAATS computation algorithm has been placed on the controlling CICP. This CIAATS algorithm gathers contextual information about the user such as user's location and activity, time of day, day of week as well as the mood of the user, what she has just completed as well as what she is predictably likely to do next or the knowledge of what she is about to do from her calendars. The contextual information will change as she moves from context to context, from time of day and as her mood and desires change during the day. From waking up to breakfast, social interactions in the morning, commuting to work, performing work, breaks and lunch at work, commute home, exercise and dinner, social interactions in evening, lovemaking and sleep, to travel routines to entertainment events, education, preparation for medical care, receiving care, post operation recovery, tending to children or adult parents, mediation to faith, from safety and security, play and exercise, contests to competitions, eating, dieting, working, relaxing—all aspects of life will be detected by the CICP via the connected device. As she performs these daily tasks and routines, she will be interacting with other CICPs as well as described before. The CIAATS algorithms will understand her context and present music choices that are relevant to her context and based on her preferences as retained by the PIBC. Similar to the music score in a feature movie, background music in a TV show or TV ad, the audio tracts in a video game, the audio presented to her via the CIAATS will be relevant to her context. When waking up, it can be moody and soft, but slowly increasing in the beat to an upbeat and happy mode. When exercising it can be based on her pulse and the "orange heart rate zone" for optional exercise. At work, it can compliment her profession; during commute home it can be relaxing. It doesn't have to be music; it can be a combination of pleasant and soothing sounds. This is a field well established from music in movies, to music in retail stores and hotels, to stadiums and health spas. The CIAATS will present the audio track that is predictively most relevant to the context based on her past preferences.

Furthermore, the music and content presented by the CIAATS can be a combination of current and past artists, DJs and combination of pop, classic or music scores. It can also be based on Augmented Intelligent Music Creation—AIMC—algorithms that are creating mathematically generated soundscapes based on the user's context. As she is going through her day, from waking up to going to sleep, even during sleep this AIMC will deliver the right curated content at the right time and place on the right device via the associated and connected devices and controlling CICPS. She can earn ERICS for listening to sponsored content, advertisement or participated in curated content immersive experiences that are presented by any entity that desires the delivery of the curated immersive content at the time and place. The AIMC will enable these messages to be delivered when it is appropriate for her and when she can earn the most ERICS for her participation of the consumption of the content. This system is enhancing the CICP with Augmented Intelligence, Artificial Intelligence and Contextual Intelligence and Machine Learning to understand the context and AIMC the delivery environment to deliver the curated content, earning the highest return for the sponsors of these deliveries. By delivering these experiences via the AIMC the participating sponsors will maximize their investment in content delivery as it is delivered at the right time and place with the highest likelihood of notice by the user unlike any other advertising medium that has a difficult time verifying delivery of the content. Their investment in the content delivery can also be included in the master blockchain controlling and or integrated with the system.

Yet another embodiment of the invention is where the solution can further the immersive auditory messages and curated content delivered via the AIMC into additional sensors and real-world devices delivering immersive experiences based on a "Sensorized Environment Knowledge and Sensing Enablement"—SENSE. This system is enhancing the CICP with Augmented Intelligence, Artificial Intelligence and Contextual Intelligence and Machine Learning to understand the context and SENSE the environment to deliver the curated content, earning the highest return for the sponsors of these deliveries. Similar to the AIMC, as she is going through her day, from waking up to going to sleep, even during sleep this SENSE solution will deliver the right curated content at the right time and place on the right device via the associated and connected devices and controlling CICPS. She can earn ERICS for consuming sponsored content, participate in activities, interact with advertisement or participate in curated content immersive experiences that are presented by any entity that desires the delivery of the curated immersive content at the time and place. The SENSE system will enable these messages to be delivered when it is appropriate for her and when she can earn the most ERICS for her participation of the consumption of the content. By delivering these experiences via the SENSE the participating sponsors will maximize their investment in content delivery as it is delivered at the right time and place with the highest likelihood of notice by the user unlike any other advertising medium that has a difficult time verifying delivery of the content. Their investment in the content delivery can also be included in the master blockchain controlling and or integrated with the system.

Yet another embodiment of the invention is to enhance the logistic verification, testing, certification and tracking of origin of goods, products, farm products, assembled items, parts or even animals. The platform enables data entry at each step of the assembly, growth, harvest, maintenance, breeding, growth or other ways of enhancing a product through its growth, assembly and subsequent processing and shipment. One such example can be the use of a CICP with a customized PIBC where it is an Asset Information Blockchain—AIBC. Data associated with the asset is collected via various devices that are connected to the CICP; alternatively data is collected via other means and manually imported into the CICP, for future storage in the AIBC associated with the asset. This can be data transfers from other data bases, or manual input from hand completed logs such as manually recorded weight data for cattle. Continuing on the use case for tracking of cattle, the invention can be used to track cattle semen from moment of processing such as focusing on female offspring's vs male gender, tracking such batch from processing to insemination with the associated CICP as record and data gathering system, with asset tracking into an AIBC. Once a calf is born, it can be tagged and identified via a RFID tag as commonly used in countries such as Uruguay where the country's entire life stock has RFID tags identifying each individual cattle. In such instance, the RFID can become the unique identifier that correspond data associated with the specific cow into the CICP and subsequent storage in the AIBC. Additional data relevant to the cattle, its conditions and environment that is relevant to its context such as weather, food and food composition, fertilizers used in the ranch, if it is free range, activity tracking, location data as well as any growth data, medical care, vaccines, injections, care and weight gathered directly via connected sensors, manually entered or gathered from other associated data sources, all can be collected and aggregated via the CICP with select data that is relevant to the specific cow entered into its AIBC. As the animal is shipped or processed to slaughter further data along the process can be entered such as temperature in shipping containers, movement, humidity, cow "exhaust gas" levels etc. —all can be gathered in sensors that aggregates common data across a herd, but can be processed and stored for each individual as appropriate via the CICP, with the relevant data stored in the AIBC. At each step of the process post slaughter, each component of the carcass can be associated with the AIBC via tagging, NFC tags, Barcode, QR Code or AR w IR. As the product goes from process to shipping to presentation to final consumer in a retail store or serves as a part of a prepared meal in a restaurant, the appropriate and authorized person can have access to the public aspects of the AIBC via devices that are allowed access via connection to the master controls of the CICP. An end user can thereby verify the origin of the food she is about to consumer or prepare while shopping in a retailer or sitting down to order a steak. Likewise a certification agency that verifies aspects or grades the quality of the product can have access to the data and when needed and or required, add its grading or stamp of approval to the CICP and thereafter for storage and safe keeping with associated with the product directly via the AIBC. Payments, tenders, change of ownerships, equity or other distribution parts can also be leveraged, recorded, activated and captured within the AIBC. The CICP connected to the smart contracts and commands within the AIBC can unlock, record, retain, and transmit documents, verifications, certificates or other aspects related to the processing of the product.

Furthermore, an additional feature of the utility of the invention, can enable a person or entity to purchase a product or order or retain rights before its assembly. In the case of the cattle, a family may purchase the rights to a calf the moment it is born. It can participate and/or fund the feeding, the raising, the care, the slaughter and subsequent processing of the cattle until its is process and shipped to their home in parts or whole, at one time or in phases based on user's demands. In such as instance, the cattle's AIBC becomes under control of the user—the owner—via his or her connected device that is controlling the CICP and subsequent AIBC for the specific cattle. These examples can progress to any assembled product, any product that is grown, raised, farmed, mined, harvested, fished, captured.

The processes associated with the AIBC can also be used for tokenization within the blockchain. Each token can have a monetary value, meaning something of value can be exchange as is customary in a traditional monetary transaction. This can be transfer of ownership, access or rights to usage or rights to consume. It can also be used to exchange a currency for the rights to see or have access to data. Furthermore, it can also be used to identify a value for adding data to the AIBC. Each interaction between the CICP and the AIBC can also be identified, recorded, retained and captured and value for each such interaction can be assigned a value related to the token and/or traditional monetary currency. The way, the whole process is validated, verified, recorded, captured and retained and can be used for future or real time monetization or tokenization.

Furthermore, a method for programming the IoETCICP in a simple to explain high level overview architecture is presented and described as an enhanced If This, Then That methodology, hereafter referred to as the enhanced Intelligence of Every Thing Programing Protocol IoETPP. This simple protocol describes the following programming protocol "If This Then That" also known as "ITTT", and enhance the process to provide a simple feedback loop to deliver real world augmented intelligence in the use and programming of the data as follows; If "This", then "That", then detect if "That" is better than "This", repeat, if "That"

is not better than "This", try something "Else", if "Else" is better than "This" repeat, if not try another solution until that is better than "this" while retaining the actions and outcomes of every "this", "then", "that", "if" and "else" and recording each data set in the distributed ledger system, IoETCICP and the core CICP control system.

As shown within the invention, the integration of multiple blockchains is envisioned. This assumes interoperability between the blockchain. This can be described as "An interoperable blockchain architecture is a composition of distinguishable blockchain systems, each representing a distributed data ledger, where transaction execution may span multiple blockchain systems, and where data recorded in one blockchain is reachable and verifiable by another possibly foreign transaction in a semantically compatible manner." The invention leverages these feature by integrating a single common CICP system and associated communication devices to it, or a series of connected CICPs, a series of not integrated CICPs, a series of MTCICPS, SHCICPS or IoETCICPS or any combination thereof. These CICPS thereby provide a common "back-bone" and connectivity with "survivability" and "sovereignty" similar to, and model upon, the internet infrastructure and original design.

These interoperational blockchains can be of various designs and architecture, or common and the same, various versions of the same core architecture or various "generations" of the same code.

The common data integration occurs on the CICP side with the identity of the data source being one of the identifiable and selection able fields determining which blockchain to use for data storage.

In certain cases, data will be captured that is relevant to multiple blockchains. In such instances, the Augmented Intelligence in the individual collecting CICP will determine where the data should be stored.

Conversely, data stored in these interoperational blockchains can be used to exchange, share, transfer or otherwise use data across the various interoperational blockchains.

In such instances, the various CICPs will act as "gateways" and operate under common "protocols" to enable, facilitate and activate the data transmission, creating an operational protocol and standard for communication. This can be compared to the TCP protocols used for internet communications. Such communications can also be under a common "language" or "protocol" such as, named as "interledger protocol"—"ILP" which can also be used to interact and communicate with the various CICP thereby creating a common communication protocol from IoT sensors, contextually intelligent communication platforms and multiple interoperational blockchains.

In yet another embodiment, the integrated advanced data storage blockchains, the data stored, the smart contracts, the token and any other commands or content can be used collectively or individually or in combinations to drive commands, instructions, data or content to the various CICPs as described in previous patents. These commands and interactions can drive delivery of curated content or instructions across the multitude of installations where CICPs are used to enhance end user journeys, operations, security and safety, to monetize or grant access, to distribute content or privileges. These CICPs may operate in stadiums, across sports leagues or sports events, smart city installations, law enforcement, public services, health care and ambulatory services, airport, seaports and bus or train stations, across hotels, venues, casinos, university campuses, retail, shopping malls, development zones, farms, power plants or oil rigs, ships, airplanes, inside trucks, cars, or trains or trolleys, across any and all professions from manual labor to R&D in labs, education and medical care, sports performance or work performance, used to monitor, govern, lead, manage, or promote or sell, marketing or advertising. There is virtually no place, effort, environment, context, activity or job that will not benefit from a connected and integrated CICP with an intelligent data storage blockchain system as described in this invention. Today's CICPs and blockchains will evolve, and this invention is not dependent upon any specific program, programming methodology, storage system, communication systems or any specific communication device, sensor or communication methodology currently available or not yet invented or deployed.

Specific embodiments, examples, features, aspects, and advantages of the present disclosure will become better understood with regards to the following description, appended claims and accompanying drawings.

BRIEF DESCRIPTION OF THE DRAWINGS

The foregoing aspects and the attendant aspects of the present disclosure will become more readily appreciated by reference to the following detailed description, when taken in conjunction with the accompanying drawings, wherein:

FIG. 8 illustrates how the data such as information about the events, actions, communications, instructions etc. delivered in FIG. 7 is stored in an additional, supported, integrated or within the original distributed ledger platform, aka blockchain.

FIG. 33 is an infographic depicting a contextually intelligent communication platform integrated with internet of things showing how the combined platform delivers Augmented Intelligence to EveryThing.

FIG. 40 is an infographic showing the integration of the various CICPS and blockchains such as those defined in FIG. 14 integrated with various cognitive units such as smart card and associated information gathering sources.

FIG. 41 is an infographic showing the integration of the various CICPS and blockchains such as those defined in FIG. 14 integrated with various self identity and self sovereignty enabled data sources and information gathering sources.

FIG. 49 is an infographic showing the solution described in FIG. 14 in use for teaching, learning and predictive data analysis.

FIG. 55 is a schematic overview of the BOTT—Build Operate Train and Transfer business model used to further innovation and education using a system as defined in FIG. 14.

FIG. 57 is a schematic describing high level actions within a system as defined in FIG. 14 in use across a venue such as an airport and in use to track assets such as wheel chairs and airport buggies.

Figure 1:
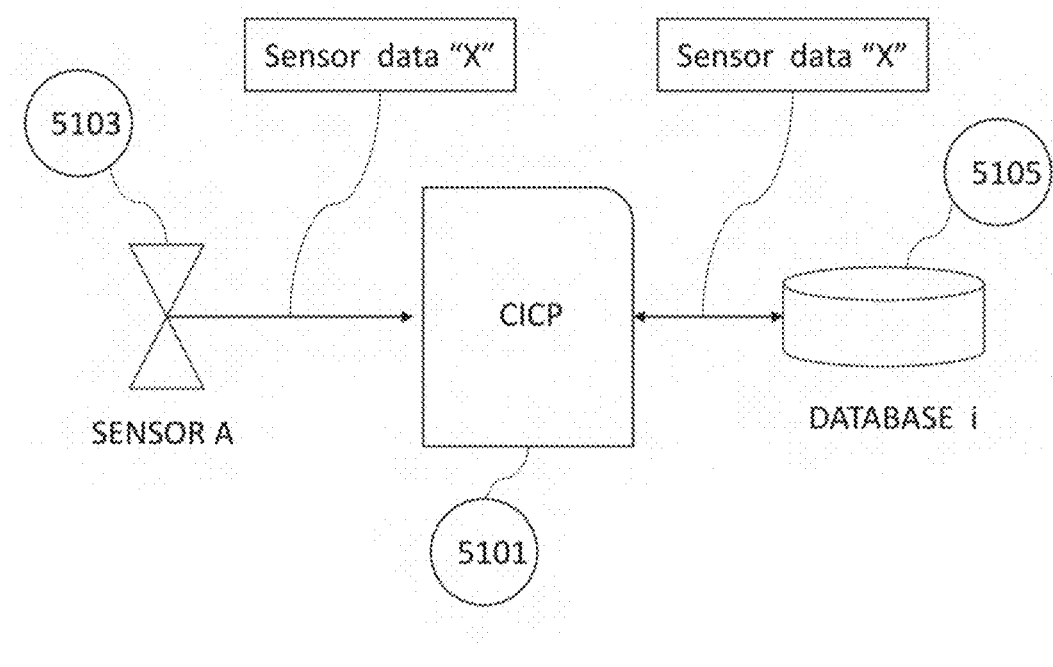
FIG. 1 is a schematic overview of a IoETCICP system with a sensor gathering data, sending this to the CICP and the CICP storing the data in a database.

Reference symbols or names are used in the Figures to indicate certain components, aspects or features shown

DETAILED DESCRIPTION OF INVENTION

In accordance with embodiments described herein interactive, electronic networks, in the form of computer-implemented, enterprise applications or platforms according to the present disclosure will be described in detail. The embodiments herein are presented in a systems level description. Specific examples of code have been written, select installations have been deployed, tested and verified, and other specific code can be written by persons of ordinary skill in these fields of technologies and that would enable operation of the inventions described herein. Techniques and commercially available applications for generation of such specific computer-implemented code are well-known and the capability to write such code is well within the level of skill of ordinary coders who work in this field of technology.

In its most general sense, the present invention is a computer-implemented enterprise application or platform configured to provide functionality as further described. Embodiments of the application or platform are preferably intended to work in conjunction with the systems and processes described in International application PCT/US13/062504, U.S. application Ser. No. 14/040,677, filed 28 Sep. 2013, now U.S. Pat. No. 9,338,622 issued May 10, 2016, U.S. provisional application 61/882,593, filed 25 Sep. 2013, U.S. provisional application 61/709,710, filed 4 Oct. 2012, U.S. provisional application 62/324,283, filed 18 Apr. 2016, and U.S. provisional application 62/379,150, filed 24 Aug. 2016, (the subject matter of which is individually and collectively referred to as contextually intelligent communication platform(s) or CICP(s)), and each of which is incorporated herein by reference. The presently described embodiments do not depend or rely on the CICP, but preferably include one or more aspects, components and/or features of the CICP incorporated by reference herein.

The presently described embodiments are directed to CICPs that have a communication link to transmit relevant and important data sets into a connected and integrated block chain, which preferably is a distributed ledger blockchain with smart contracts, Know Your Customer (KYC) and Anti Money Laundry (AML) compliance and Smart Contract (SC) capabilities, with the capability to execute commands based on these SC's in and these commands are integrated with the CICP. Standard and off the shelves blockchains can also be integrated for data storage.

Also, the blockchain is preferably used to store relevant and important data in such as fashion that it can be accessed by approved parties at future times The data stored in the blockchain can be amended as time goes by with additional data relevant to the blockchain from the original CICP and devices and sensors integrated with it in future interactions.

The SCs within the blockchain can send commands to the original CICP and it can then send appropriate computed commands to those devices connected with it.

In future and other use cases, the blockchain can be integrated with other blockchains which will gather data and this data are then stored in the blockchain.

In future and other use cases, the SCs within the blockchain can the interact with other CICPs and those devices associated and integrated with it.

In future and other use cases, multiple CICPs can be integrated with the blockchain and data retained within it.

In future and other use cases, the SCs within the blockchain can the interact with multiple other CICPs and those devices associated and integrated with it.

The blockchain can also be connected with a multitude of different CICPS such as SHCICPs, IoEVCICP and MTCICP with the associated devices and integrated devices for each.

The blockchain's SCs can also be connected with a multitude of different CICPS such as SHCICPs, IoEVCICP and MTCICP with the associated devices and integrated devices for each.

The blockchain can enable tokenized across all elements.

These tokens can be used to conduct, verify and compensate for services and transfer of ownership of goods or properties or content, grant access or otherwise exchange information typically performed as monetary transactions.

The integrated blockchain and the various CICPs can leverage edge computation across the network of connected and integrated devices.

Each connected device can be programmed with a version of the SCs in the main and associated blockchain to facilitate efficient data transmissions.

Each of these edge computation devices that has a data storage capability can be a node in the blockchain for distributed data storage on each connected edge device with data storage and connectivity capabilities.

The multiple layers of control and multiple types of access control within and spanning the multiple layers are advantageous aspects of the present application, and enable to capability of sending the data to the correct or right data storage node on the blockchain.

Multiple algorithms can be created and integrated with the various CICPS and Blockchain. These can deliver contextual intelligence, augmented intelligence, artificial intelligence, machine learning, self-learning and other programmatic systems such as the auditory intelligence "Sound Scape" platform "AMIS" described or the advanced sensor intelligence systems named "SENSE" where all of these components together with the edge devices, communication devices, cloud and on device data storage within and beyond the blockchains, the on-device edge computation combined with the aggregated computation capability of the entire system drive towards the "singularity" envisioned by numerous AI researches, futurists, professors, educators and authors.

With reference to FIGS. 1 through 8, preferred embodiments of the interactive sensor data gathering CICP solutions with data storage across multiple data bases that can be shared across multiple distributed ledgers, aka "blockchains".

As can be seen in FIG. 1, a CICP, 5101 is connected with a Sensor A, 5103 and receives data from it. This sensor data is stored in Database 5105.

Figure 2:
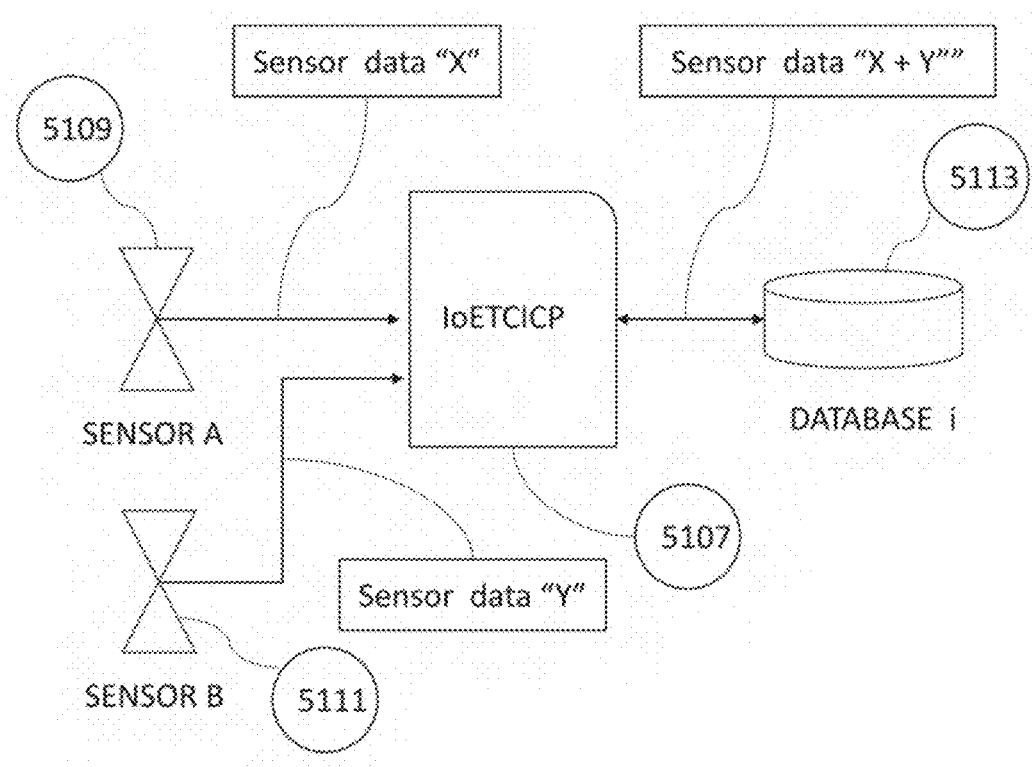
FIG. 2 is a schematic overview the of the FIG. 1 IoETCICP system with additional sensor.

FIG. 2 depicts a system where there is a CICP, 5107 that is connected with multiple Sensors, 5109 and 5111. These sensors transmit data to the CICP, namely "Sensor data"Y"" and "Sensor Data "X"". The CICP transmits this data to the database, 5113.

Figure 3:
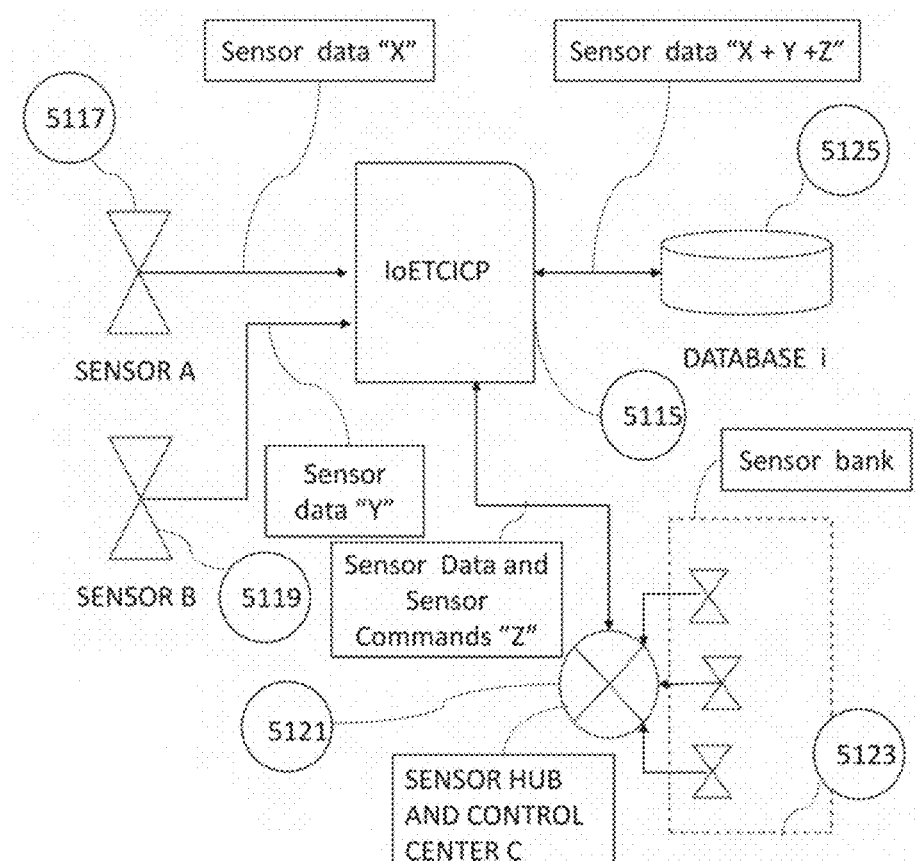
FIG. 3 is a schematic overview of the FIG. 2 IoETCICP system connected to a Sensor Hub with numerous sensors connected to the IoETCICP with the FIG. 4 is a schematic overview FIG. 3 IoETCICP system connected to and communicating in a bi-directional manner with a mobile device.

FIG. 3 depicts a system where a IoETCICP, 5115, is connected to 2 sensors, 5117 and 5119 and a Sensor Hub and Control Center, 5121 which is connected with a Sensor bank 5123. The IoETCICP collects the data from Sensors 5117 and 5119, and stores this in database 5125. The IoETCICP sends controls and commands to the Sensor hub 5121 which controls the various sensors in the sensor bank 5123. All data, commands, resulting data captured and all actions and events after the commands and actions, events and results thereafter—all data is collected via the IoETCICP and stored in the Database 5125.

Figure 4:
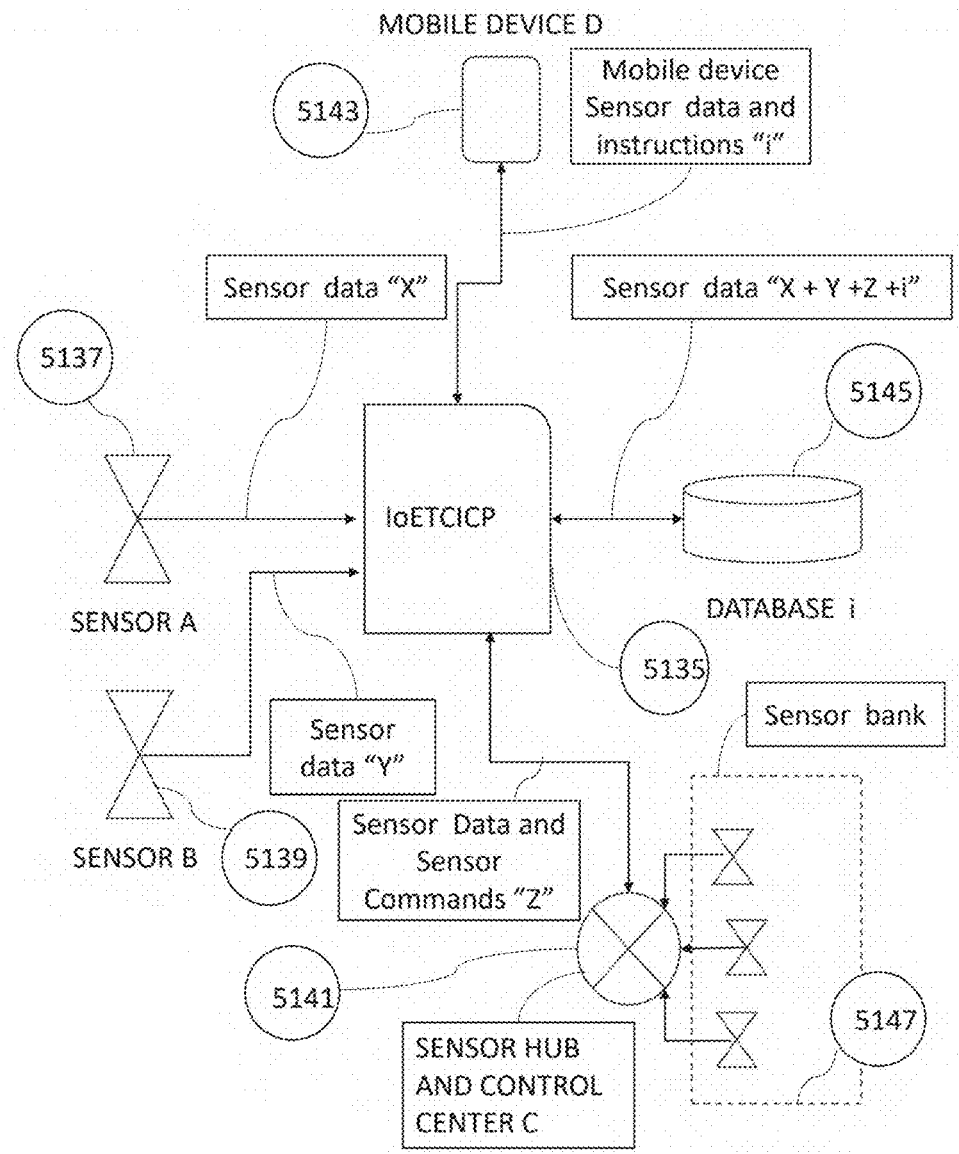

FIG. 4 depicts the system described in FIG. 3 with an added component, the mobile device 5143 which is in bi-directional communication with the IoETCICP 5135.

Figure 5:
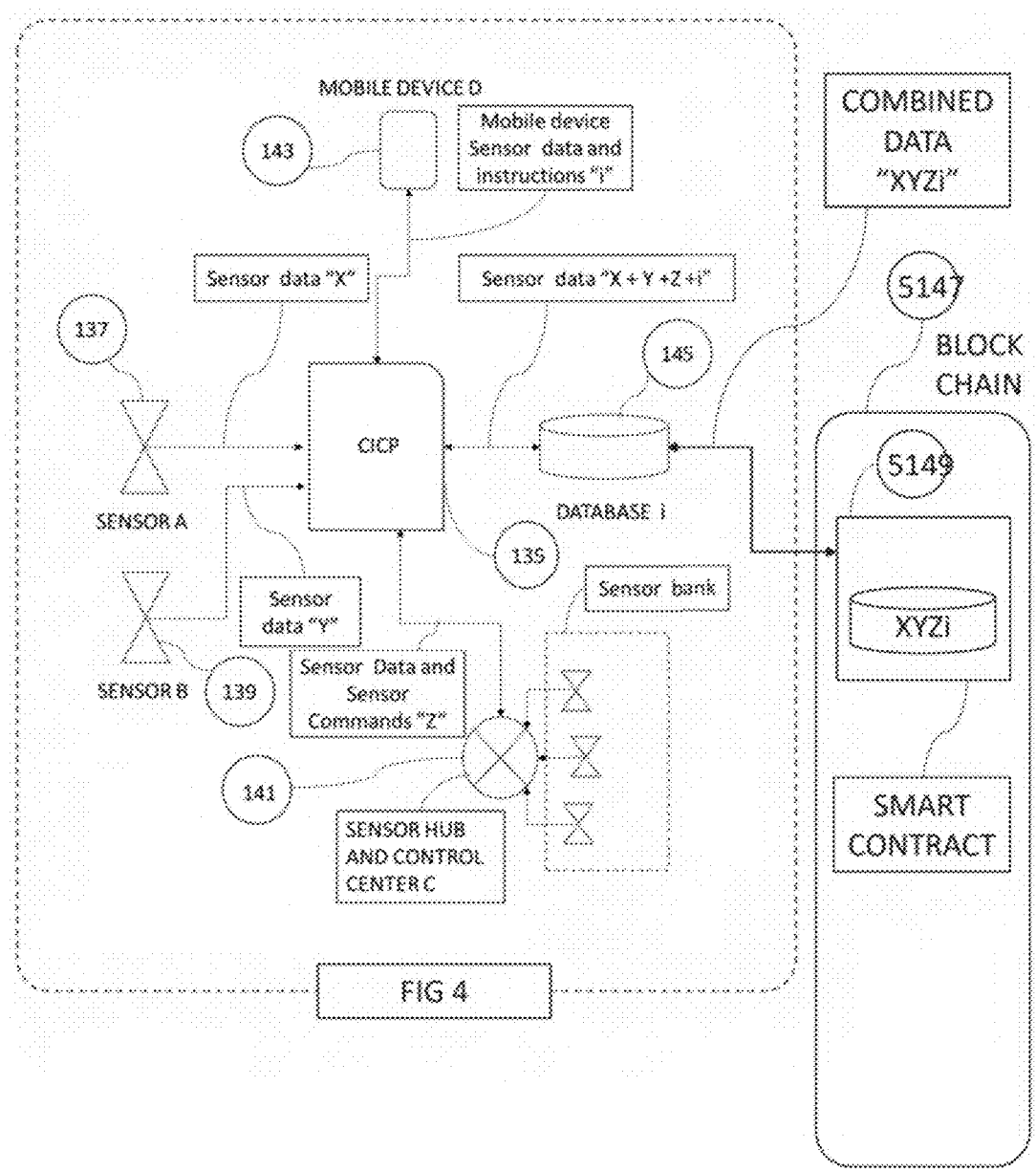
FIG. 5 is a schematic overview of the FIG. 4 IoETCICP system connected and communication in bi-directional fashion with a blockchain data storage and distributed ledger system including Smart Contract algorithms in the block chain.

FIG. 5 depicts the system described in FIG. 4 with data storage added in a Blockchain—5147 with individual node 5149 that contains a smart contract with collected sensor data shown as "ZWYZi" stored in the blockchain node.

Figure 6:
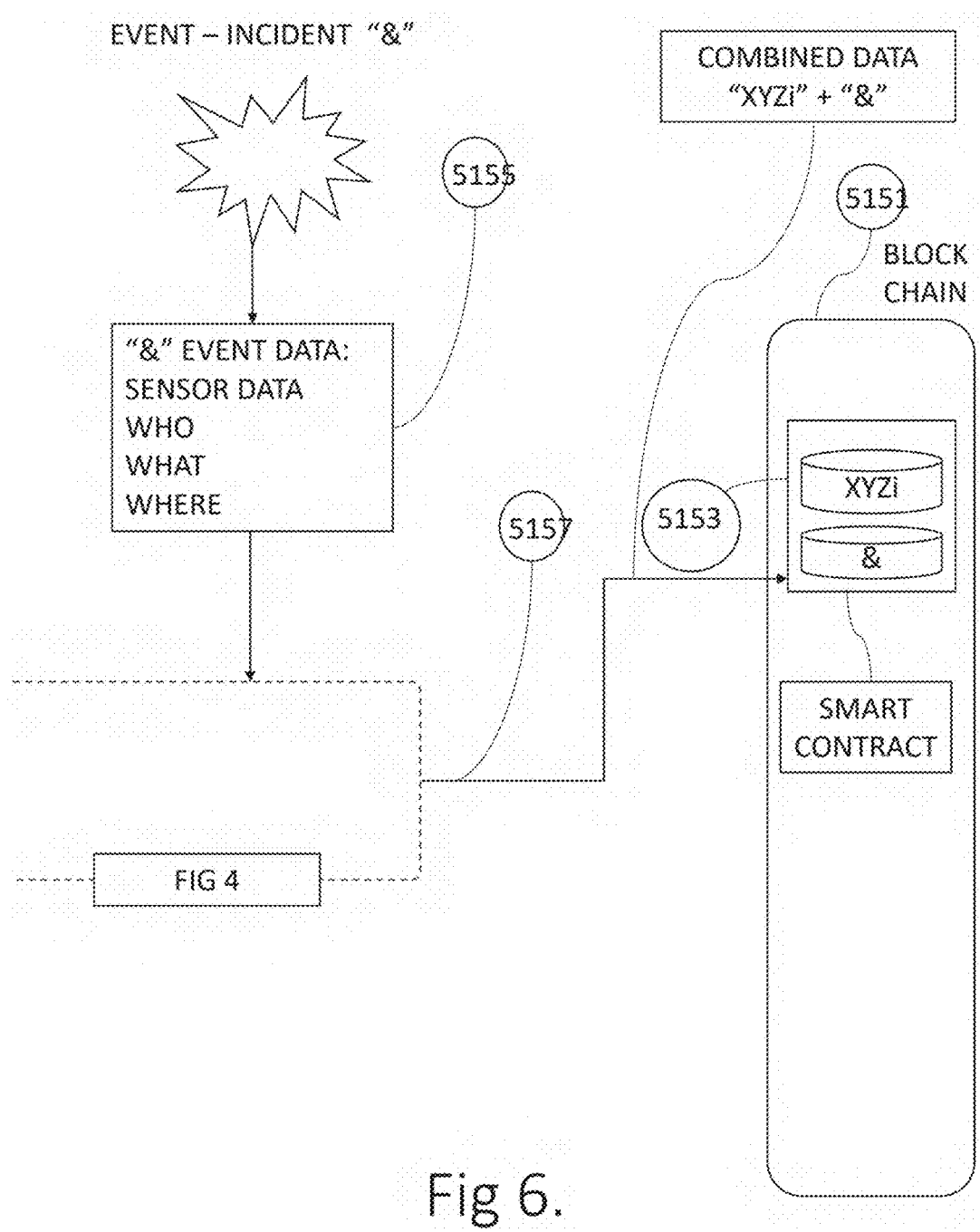
FIG. 6 illustrates how an incident or event is detected by sensors and this event creates data that is communicated to the FIG. 4 IoETCICP and stored in a Blockchain data storage system.

FIG. 6 depicts a solution where the system depicted in FIG. 5 has an added sensor that can detect an event "Incident "&"", 5155, and record and retain data associated with it with in the blockchain 5151 and in the smart contract. The "incident" can be an event, an action, a movement, an NFC tap, a proximity beacon sync, a QR code read, a manual trigger, an automatic trigger, a sensor tripping a range, an alarm sounding, a vision recognition system, an AR target recognition, a facial recognition trigger or any other action that is recorded and retained.

Figure 7:
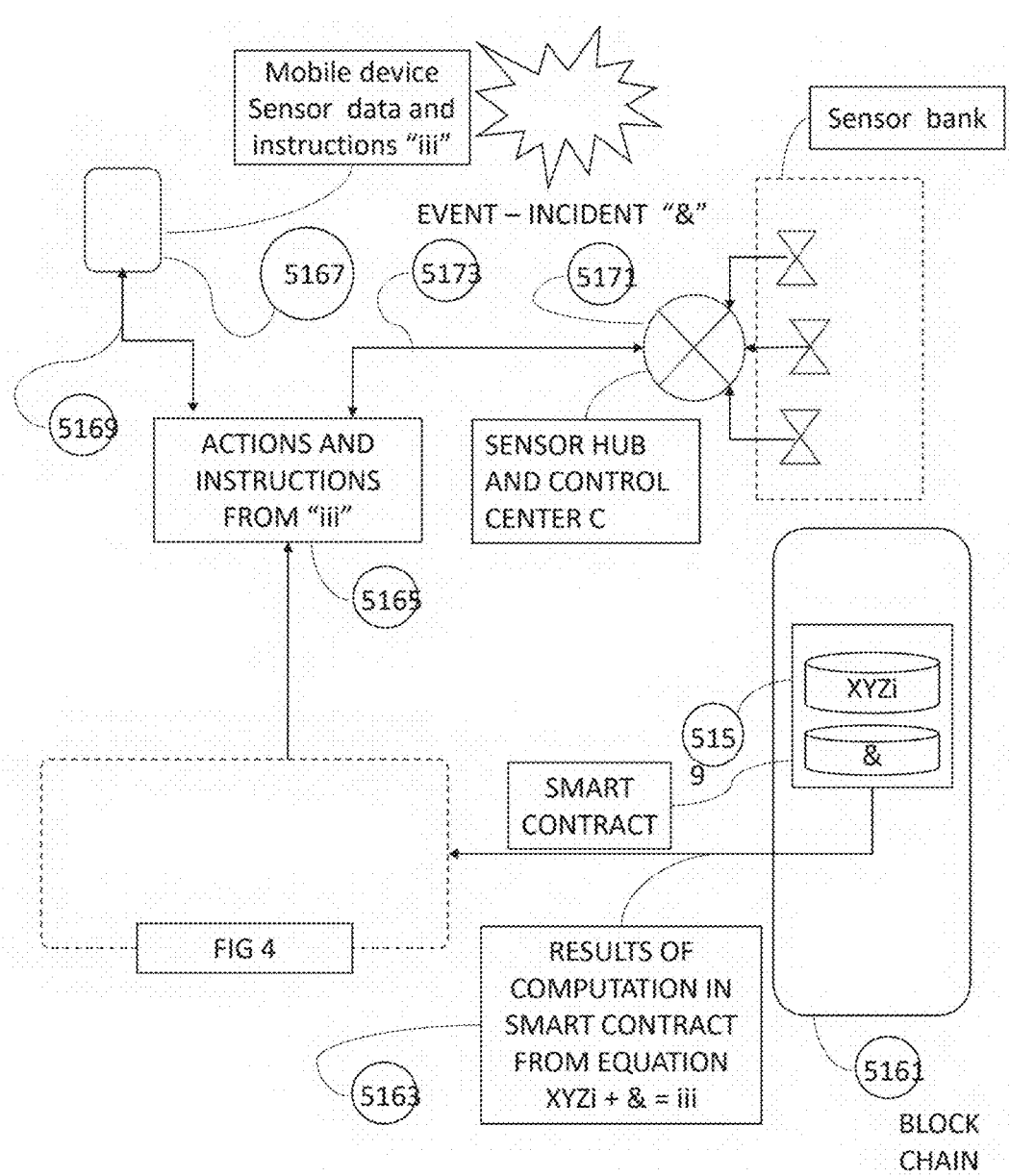
FIG. 7 illustrates how an incident or event is detected by sensors and this event creates data that is communicated to the FIG. 4 IoETCICP and stored in a Blockchain data storage system as illustrated in FIG. 6, and then the computation performed by smart contracts within the data nodes in the blockchain data storage system is used to send instructions to sensor system.

FIG. 7 depicts solution like the one depicted in FIG. 6 connected with a system like the one depicted in FIG. 4 with a blockchain, 5161, with smart contracts that control system depicted in FIG. 4.

FIG. 8 depicts the solution depicted in FIG. 7 with a distributed ledger blockchain—5171—with multiple nodes within it.

Figure 9:
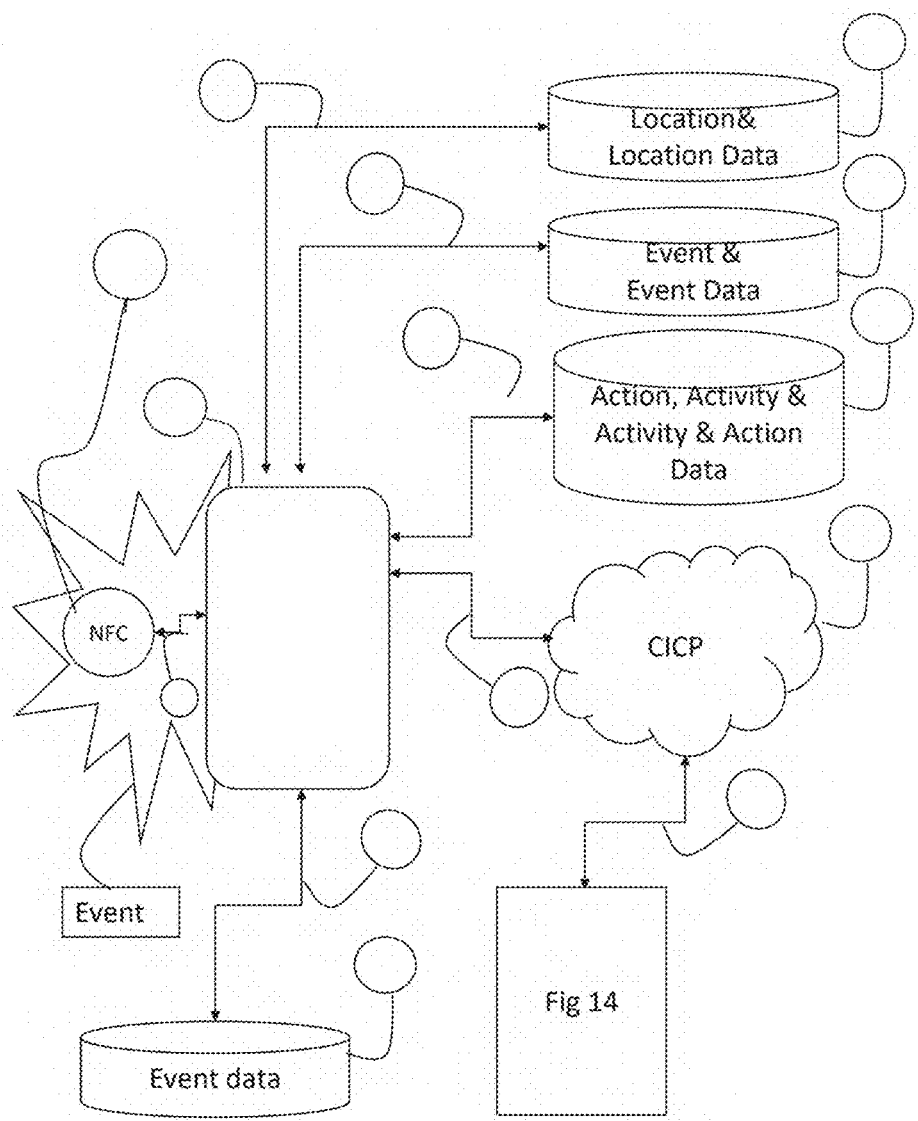
FIG. 9 illustrates how the data gathered from the event is communicated to a communication device that is connected via a CICP and various knowledge data about the event and the context around the event.
Figure 14:
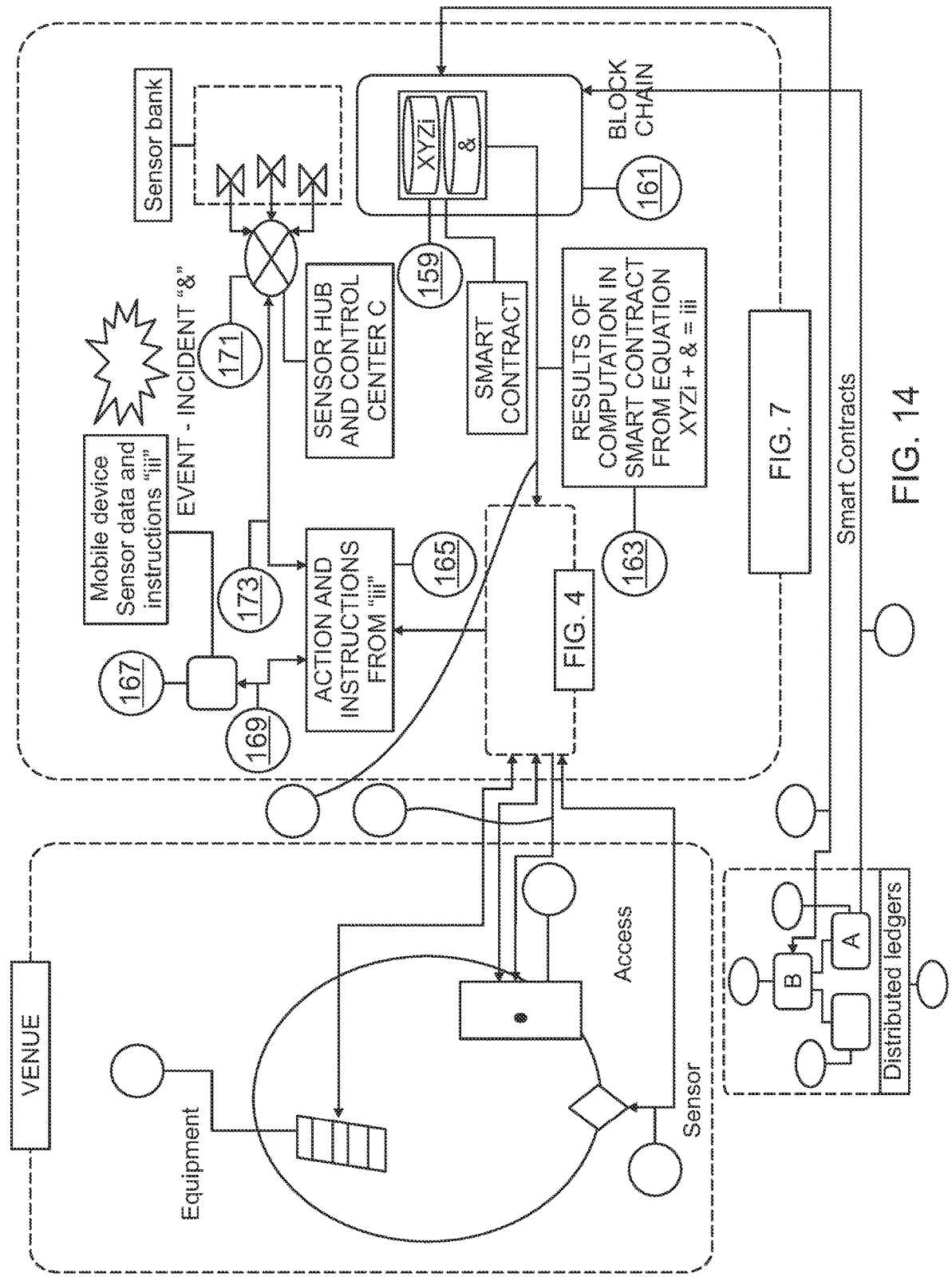
FIG. 14 is a schematic representation of the system shown in FIG. 13 with data storage in a distributed ledger system, aka blockchain with an added communication link back to the system to deliver information, instructions, commands or other communications based on the output from algorithmic calculations within the blockchain, aka smart contracts.

With reference to FIG. 9, an instance, event and action can be recorded via a NFC tap on a mobile communication device with data captured based on that moment and it's context with the data stored in a blockchain platform as presented in FIG. 14.

Figure 10:
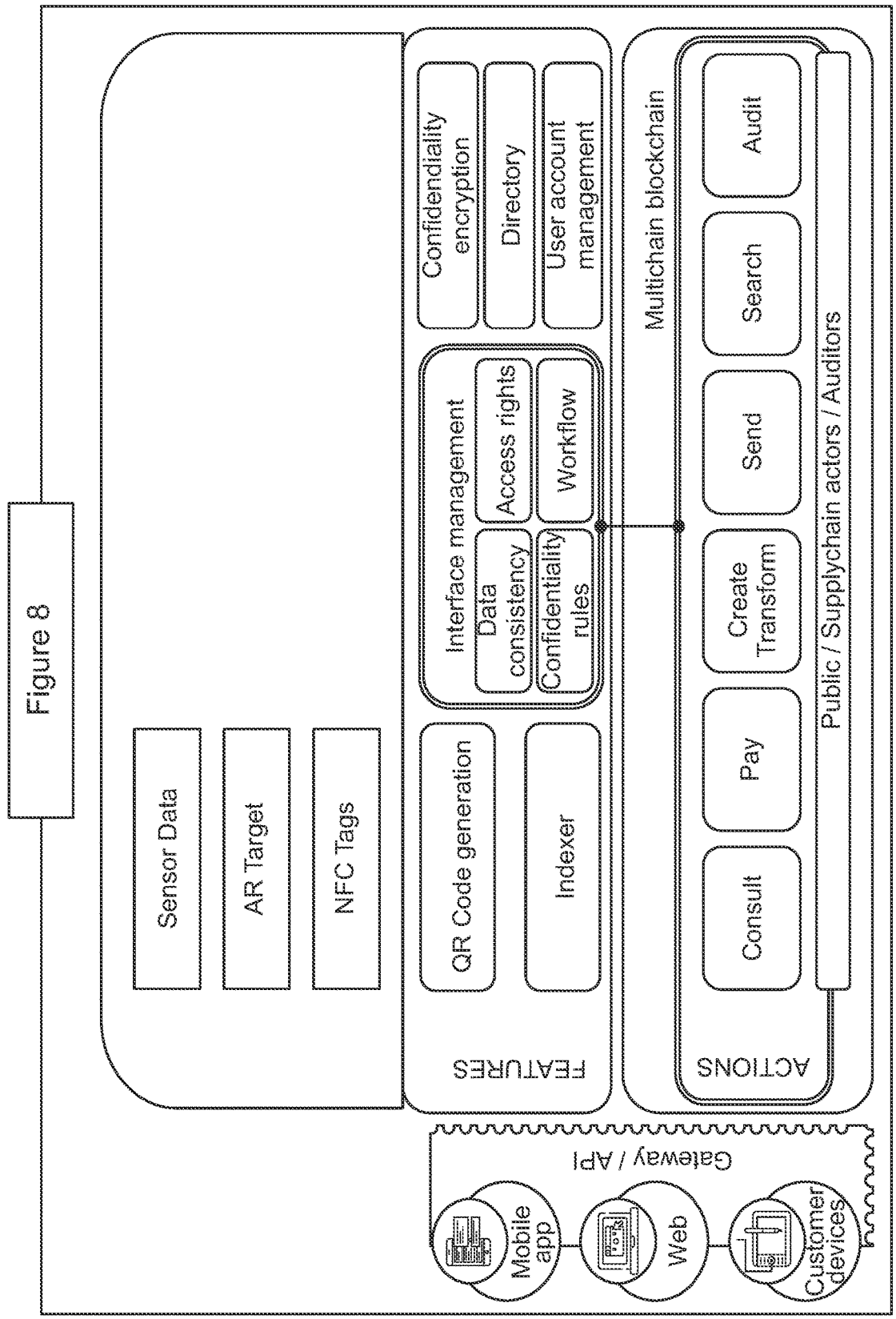
FIG. 10 is an infographic overview of various levels of actions within a blockchain, the various interfaces, sensors as well as gateways and API interfaces.

With reference to FIG. 10, multiple chains, gateways, sensor data and sensor data capture methods are shows as integrated parts, components, features, modules and interfaces of a systems such as the one presented in FIG. 8. This can be included as a high level architect across all and any of the systems described herein, but none are dependent upon this as the only architecture.

Figure 11:
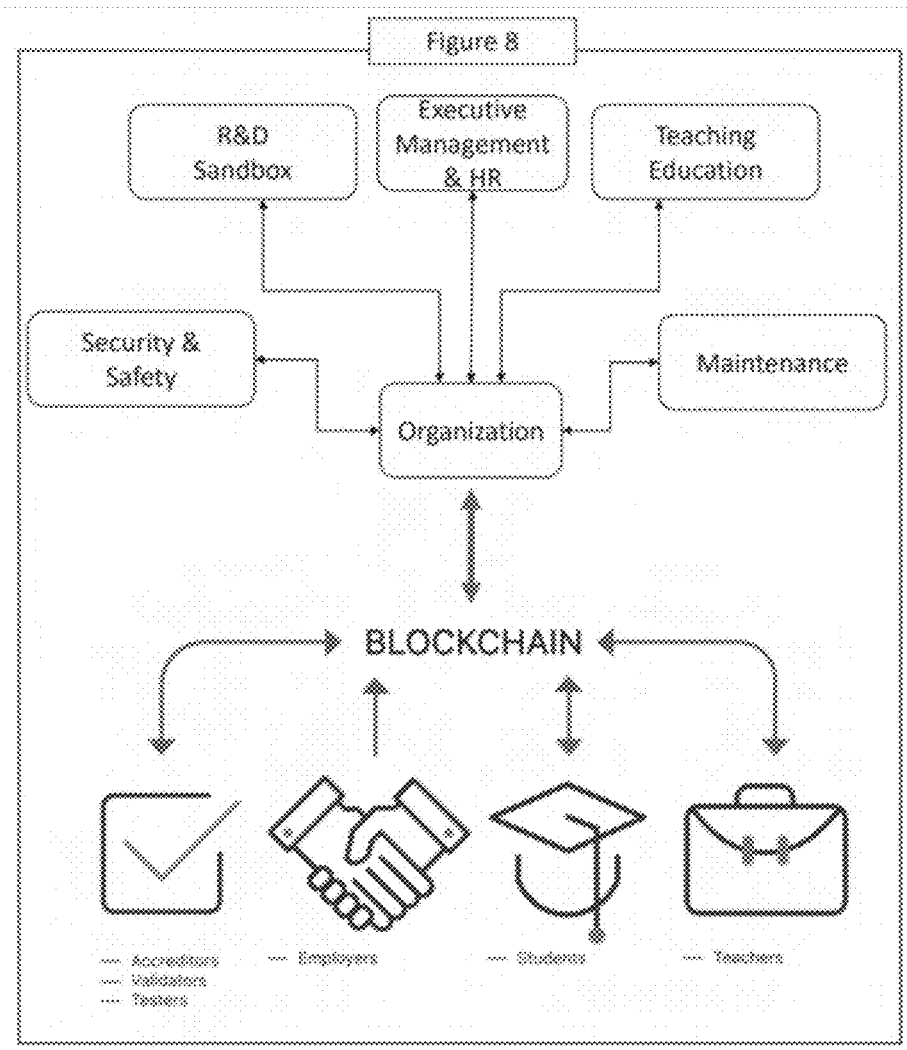
FIG. 11 depicts a schematic on how a block chain solution created for education, employers is integrated into a system used by management, educators, for R&D and operations.

With reference to FIG. 11, a blockchain such as the one presented in FIG. 8 can be used for education, the management of the students and those that educate them, those that test the student and the results of such tests.

Figure 12:
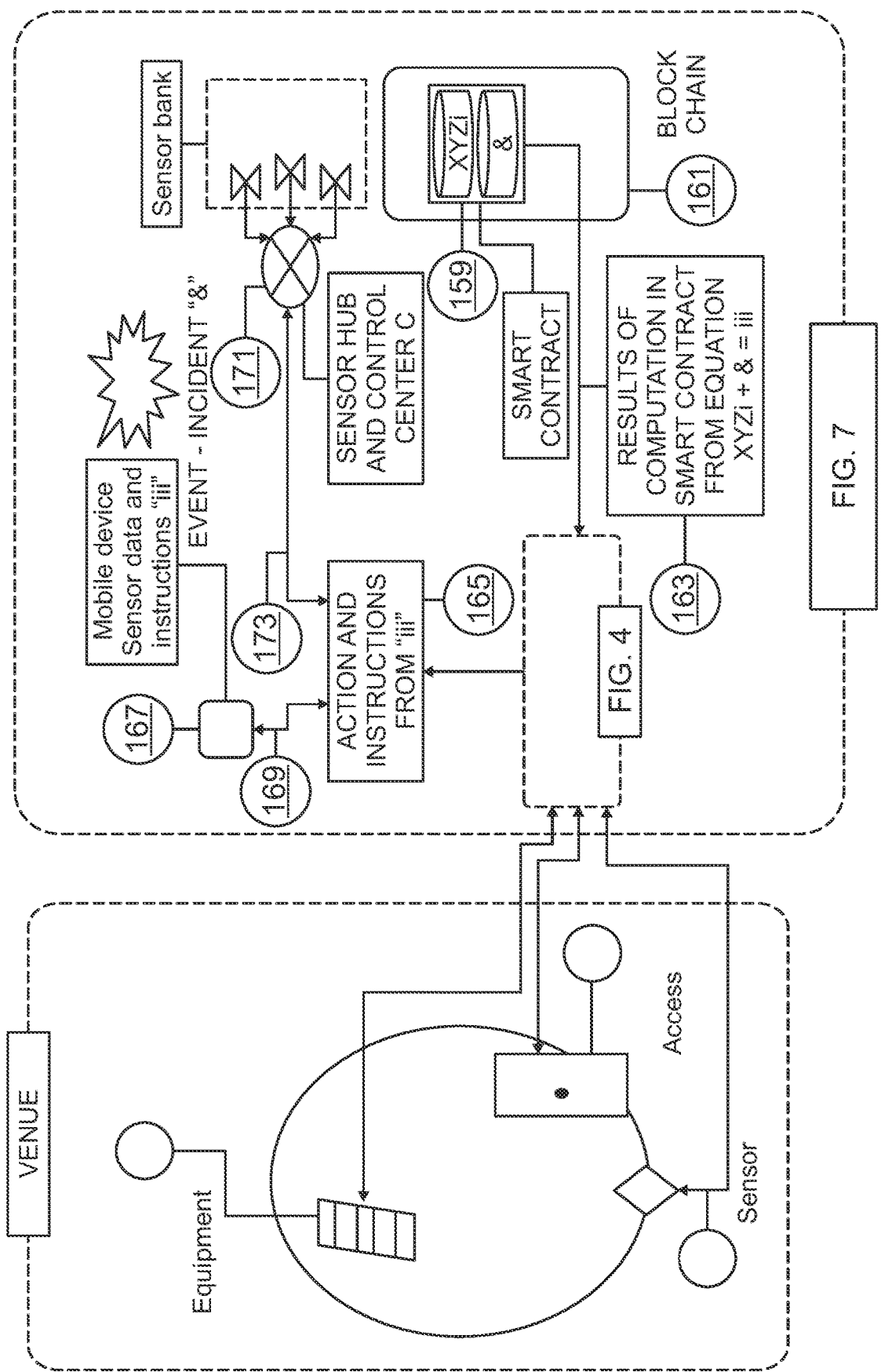
FIG. 12 is a schematic representation of the system shown in FIG. 7 where it interacts with a venue where various equipment, sensors and controlled actuators such as door locks are integrated.

With reference to FIG. 12, the solution presented in FIG. 7 can be integrated with various connected sensors, equipment and devices that can enable access. The data and instructions come from a CICP solution that is connected with a connected block chain and data storage and interactions as described in FIG. 7.

Figure 13:
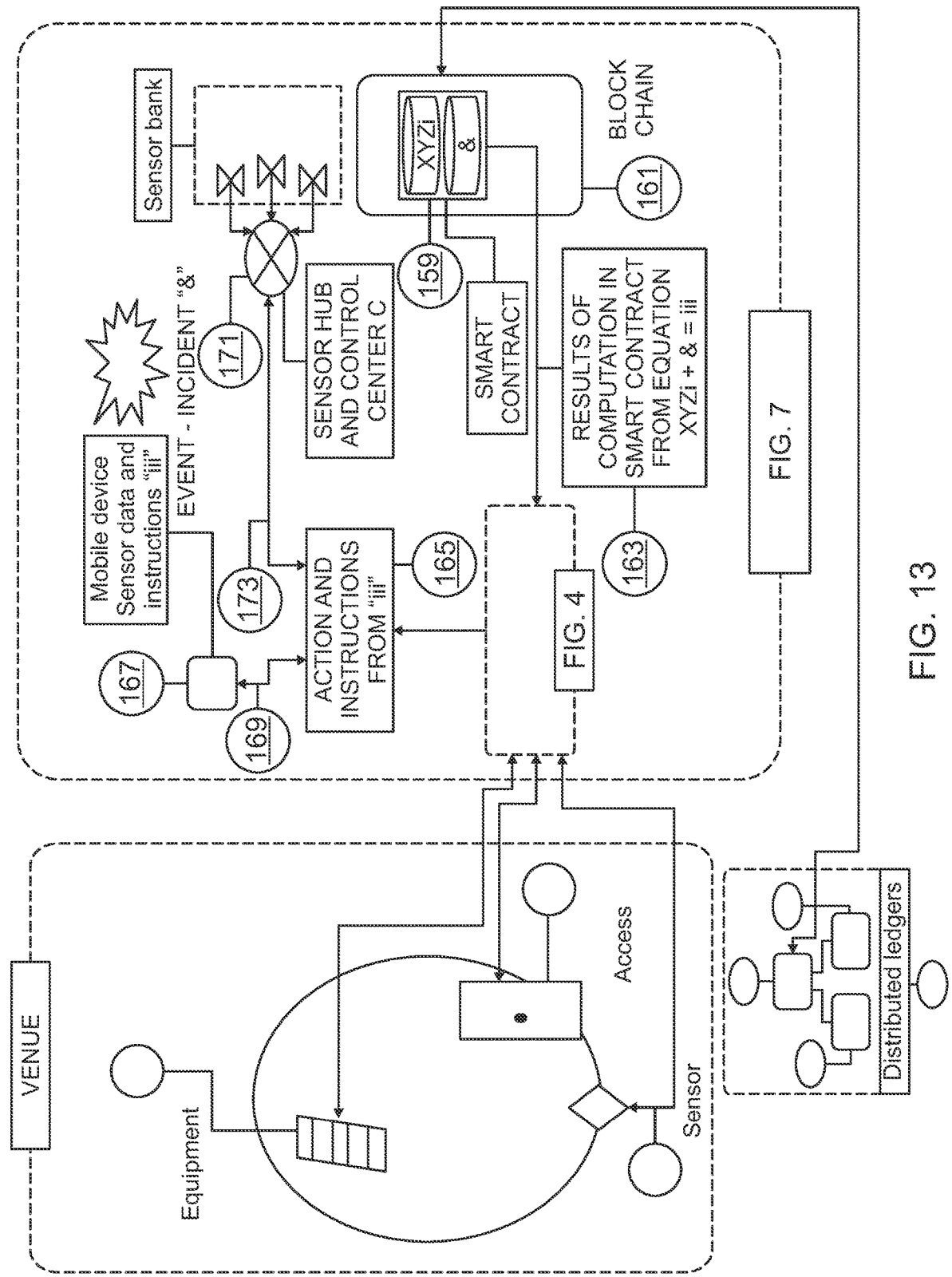
FIG. 13 is a schematic representation of the system shown in FIG. 12 with data storage in a distributed ledger system, aka blockchain.

FIG. 13 depicts the solution described in FIG. 12 with a distributed ledger data storage and associated data storage nodes integrated.

FIG. 14 depicts the system with smart contract included in the distributed ledgers and nodes, one with an output only, "A" and one with bi-directional capabilities—i.e. sending commands and results of computation within the smart contract and receiving and capturing input and feedback from outbound instructions.

Figure 15:
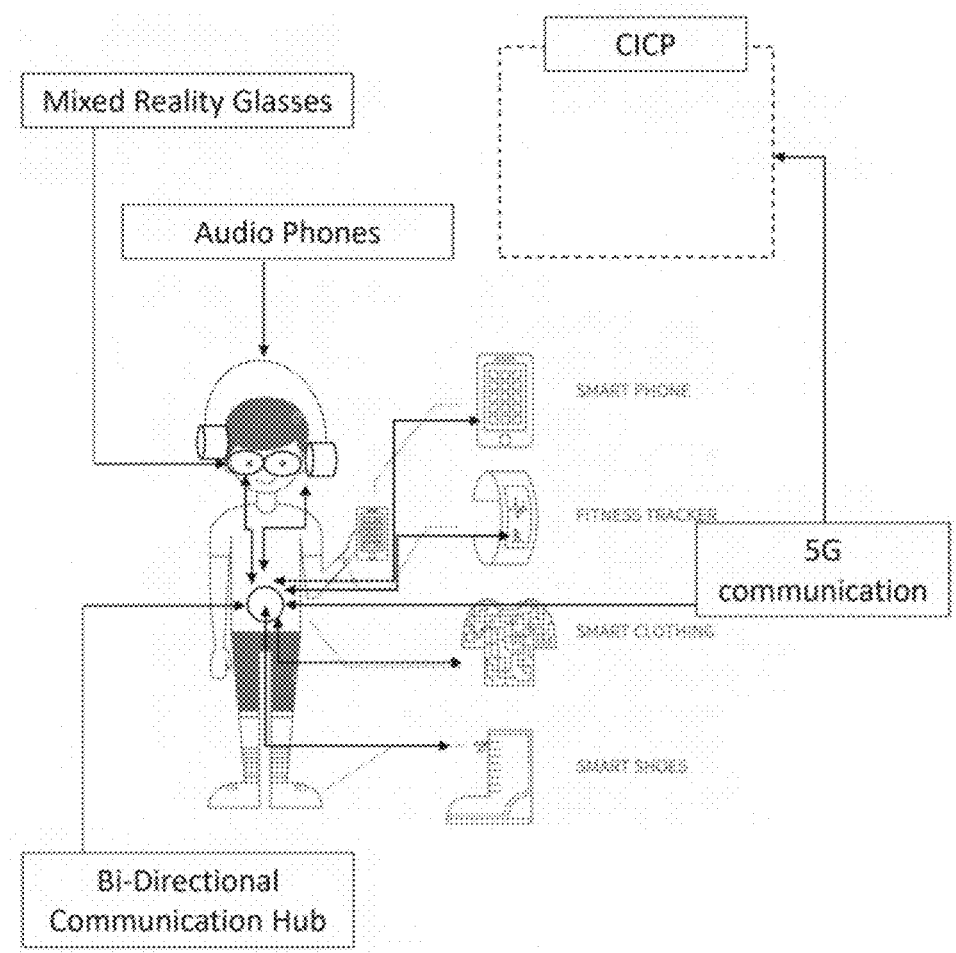
FIG. 15 is a schematic representation of a person who is wearing a series of connected devices and sensors within a series of connected devices, some that are connected via various communication hubs and connected via high speed communication such as 5G and noted as such to a complete system as shown in FIG. 8.

FIG. 15 depicts a person wearing assorted clothing and wearables that individually are communicating with a central communication hub which communicates with a CICP with high speed communication such as 5G.

Figure 16:
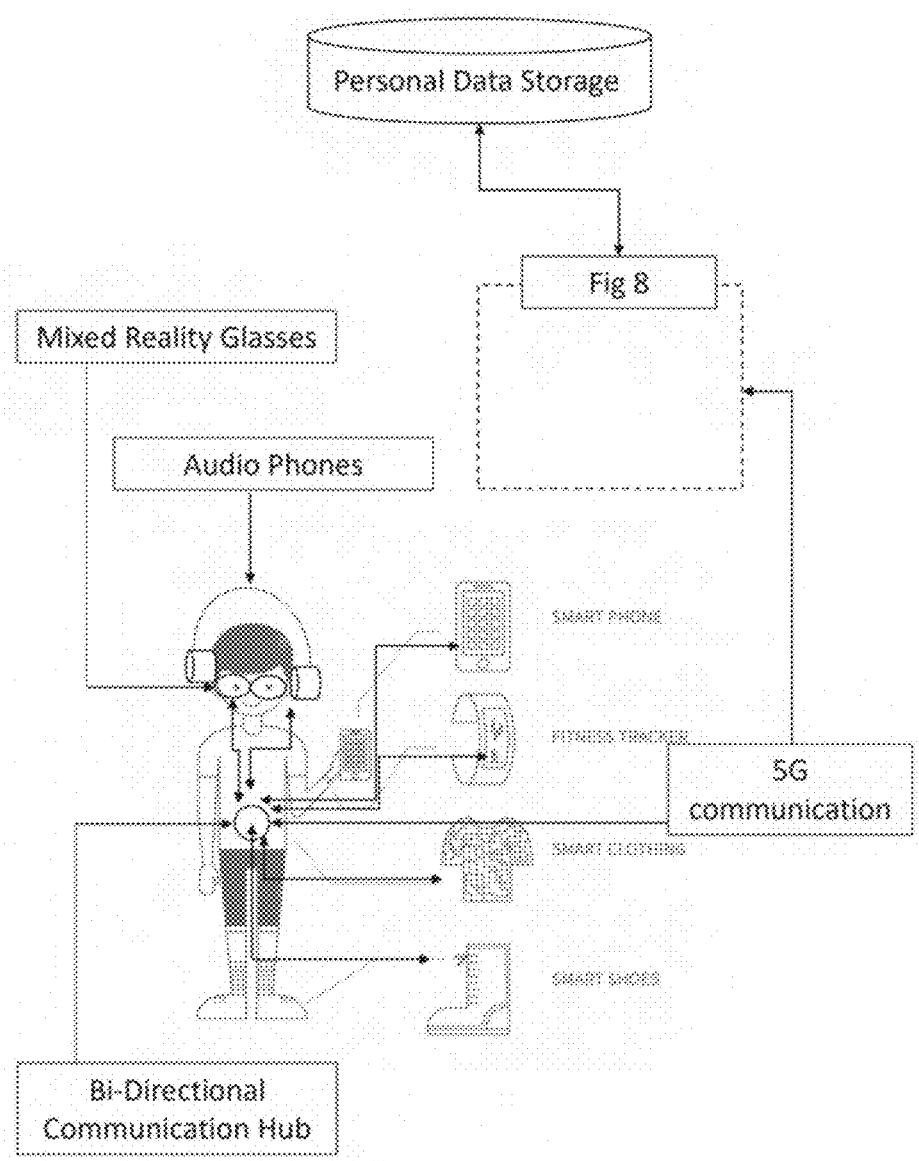
FIG. 16 is a schematic representation of a person who is wearing a series of connected devices and sensors within a series of connected devices, some that are connected via various communication hubs and connected via high speed communication such as 5G and noted as such to a complete system as shown in FIG. 8 with a defined data repository defined as "Personal Data Storage".
Figure 17:
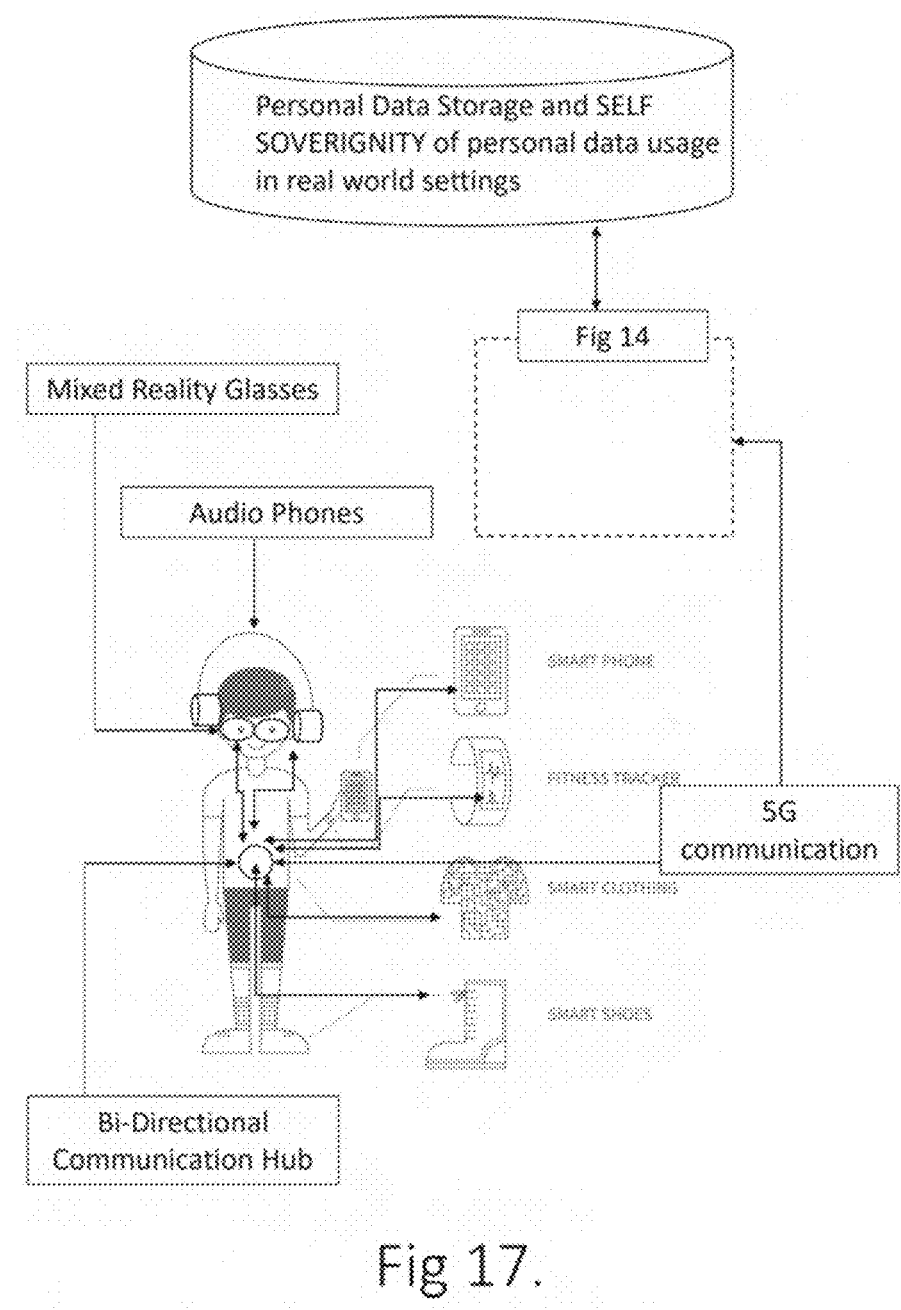
FIG. 17 is a schematic representation of is a schematic representation of a person who is wearing a series of connected devices and sensors within a series of connected devices, some that are connected via various communication hubs and connected via high speed communication such as 5G and noted as such to a complete system as shown in FIG. 8 with a control of the data within his personal data storage enabling "Self Sovereignty" of his personal data.

FIG. 16 depicts the person in FIG. 15 connected with a CICP and solution as depicted in FIG. 8 that has a dedicated personal data storage capability. FIG. 17 depicts the solution depicted in FIG. 16 with Personal Data Storage and SELF SOVEREIGNTY of personal data usage in real world settings.

FIG. 16 is a schematic representation of a person who is wearing a series of connected devices and sensors within a series of connected devices, some that are connected via various communication hubs and connected via high speed communication such as 5G and noted as such to a complete system as shown in FIG. 8 with a defined data repository defined as "Personal Data Storage".

FIG. 17 is a schematic representation of is a schematic representation of a person who is wearing a series of connected devices and sensors within a series of connected devices, some that are connected via various communication hubs and connected via high speed communication such as 5G and noted as such to a complete system as shown in FIG. 8 with a control of the data within his personal data storage enabling "Self Sovereignty" of his personal data.

Figure 18:
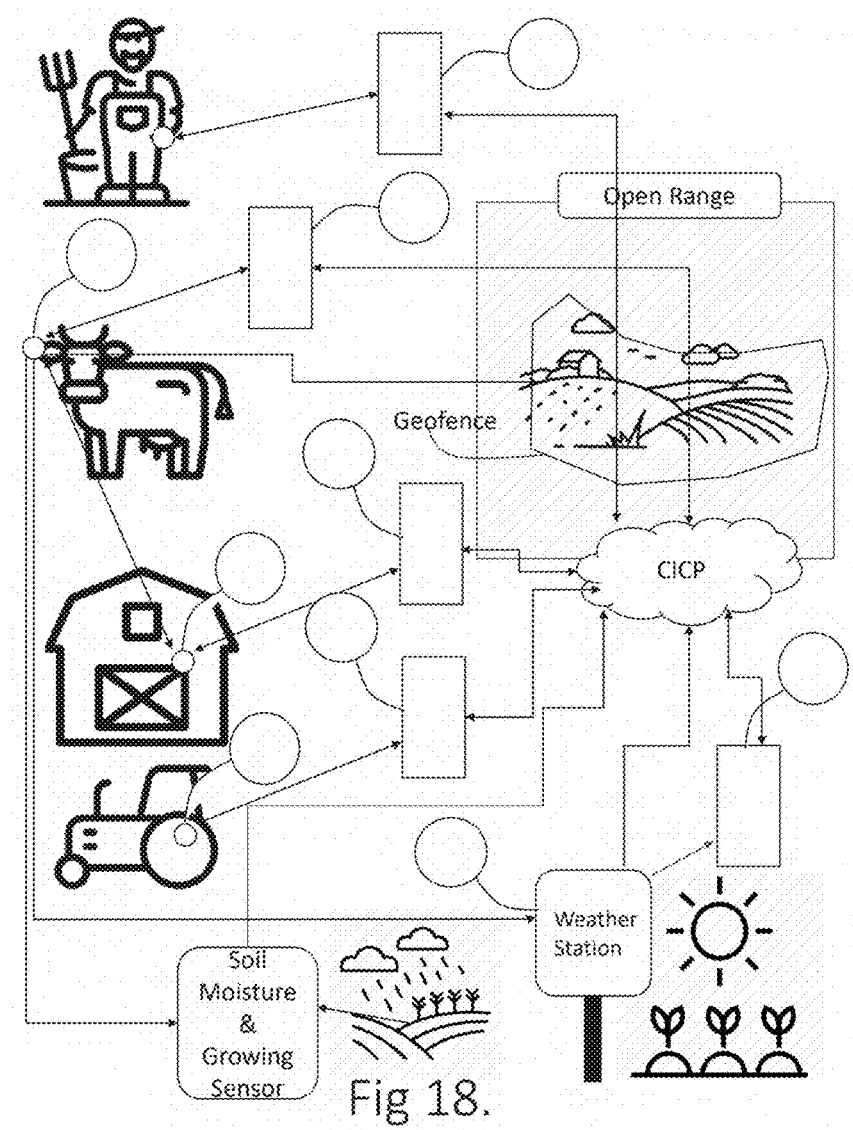
FIG. 18 is a schematic overview of a farm, the animals at the farm, the structures on the farm, the human workers and farmers there, with sensors on all as well as within and across the fields with local weather and growing conditions captured via sensors—all of which are connected via various communication protocols and methods via a variety of dedicated communication devices or standard mobile phones—to a common CICP.

FIG. 18 is a schematic overview of a farm, the animals at the farm, the structures on the farm, the human workers and farmers there, with sensors on all as well as within and across the fields with local weather and growing conditions captured via sensors—all of which are connected via various communication protocols and methods via a variety of dedicated communication devices or standard mobile phones—to a common CICP. These communication nodes can be sensors with communication protocols enabling direct communication with the CICP or near field or close range communication with a mobile devices such as a phone that can capture the on-boarded sensor data and transmit to the CICP, or enable a connections and communications as a hub. The sensors can be data gathering only, they can have on-board data storage capability or even on-board computation processors to enable edge-computing and can also be integrated with mechanical or electro-mechanical control solutions that can do commands such as "open", "close", "on", "off" or any other commands.

Figure 19:
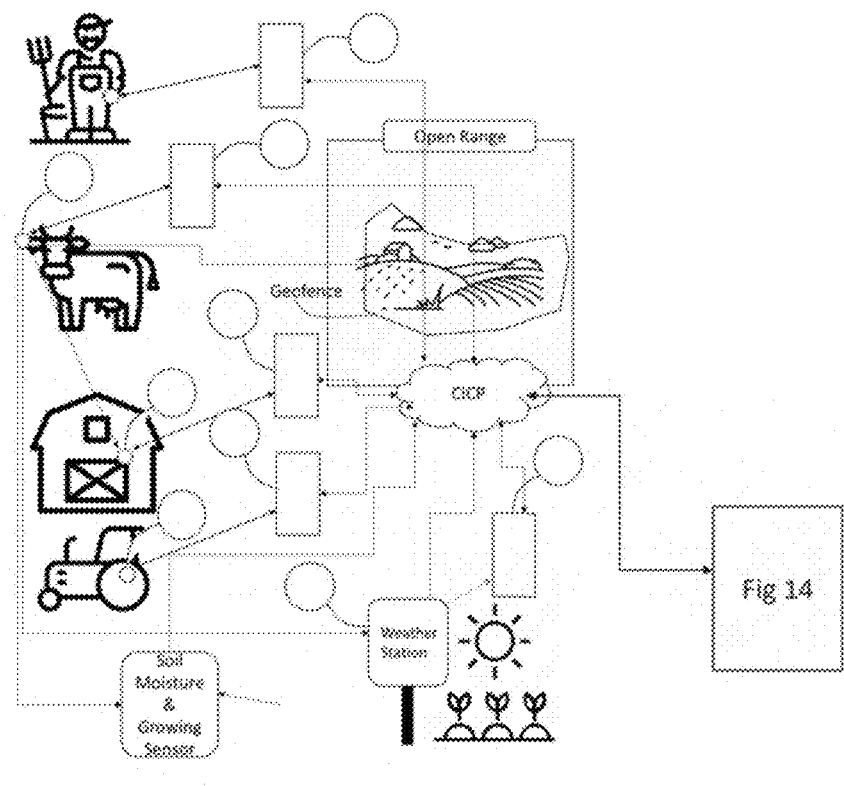
FIG. 19 depicts the same farm and its connected sensors and communication devices communicating via the CICP to a system as presented within FIG. 14 with all the features defined therein.

FIG. 19 depicts the same farm and its connected sensors and communication devices communicating via the CICP to a system as presented within FIG. 14 with all the features defined therein.

Figure 20:
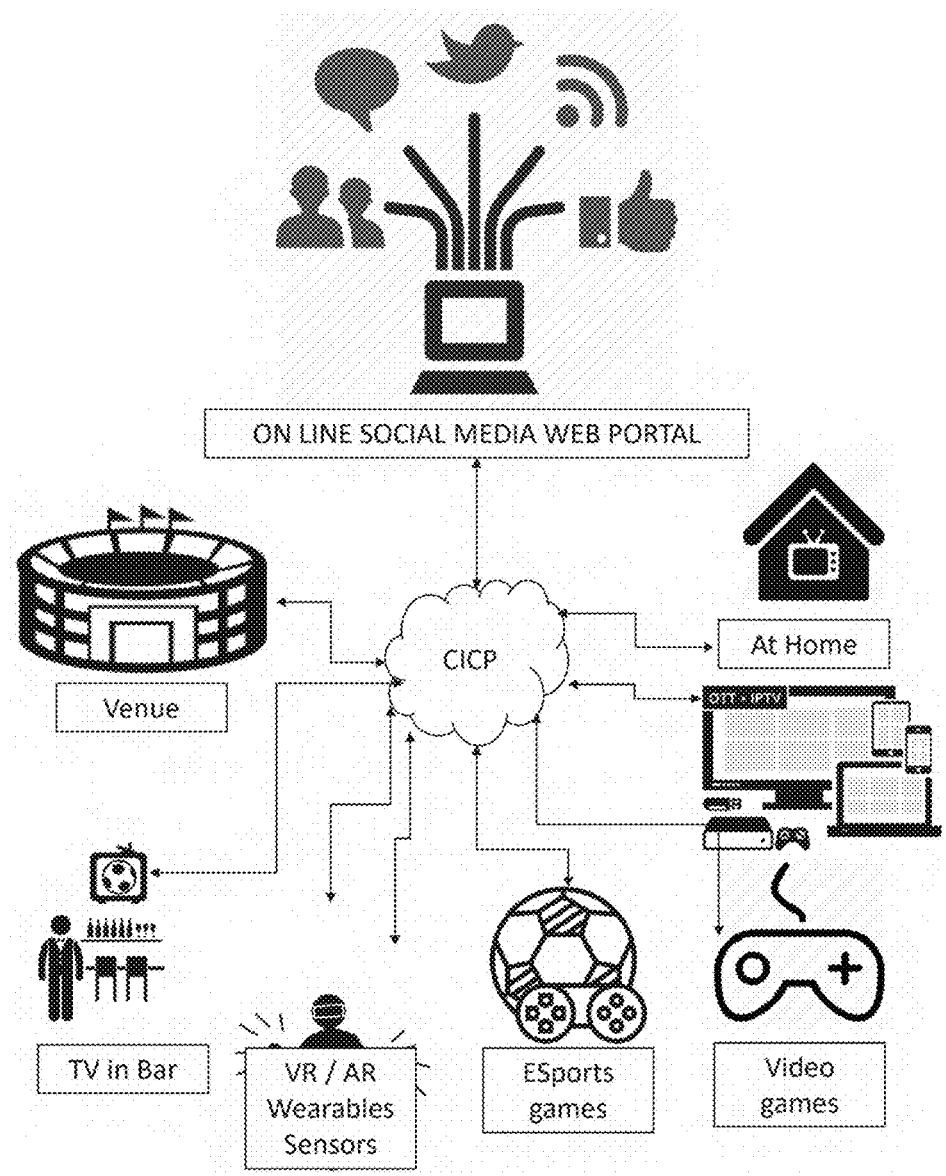
FIG. 20 depicts a CICP that is communicating via and with Social Media through standard web interfaces, as well as with sensors systems and sensors at any combination of a venue, or venues, a bar or bars, a player or multiple players using VR and or wearing sensors, an e-game player, an e-game team or an e-game league, a video game console or multiple consoles of same or various brands, at a TV, monitor, mobile phone, tablet, laptop, TV or game console that is displaying linear content OTT (over the top) or via traditional broadcast to a home or multiple homes.

FIG. 20 depicts a CICP that is communicating via and with Social Media through standard web interfaces, as well as with sensors systems and sensors at any combination of a venue, or venues, a bar or bars, a player or multiple players using VR and or wearing sensors, an e-game player, an e-game team or an e-game league, a video game console or multiple consoles of same or various brands, at a TV, monitor, mobile phone, tablet, laptop, TV or game console that is displaying linear content OTT (over the top) or via traditional broadcast to a home or multiple homes.

Figure 21:
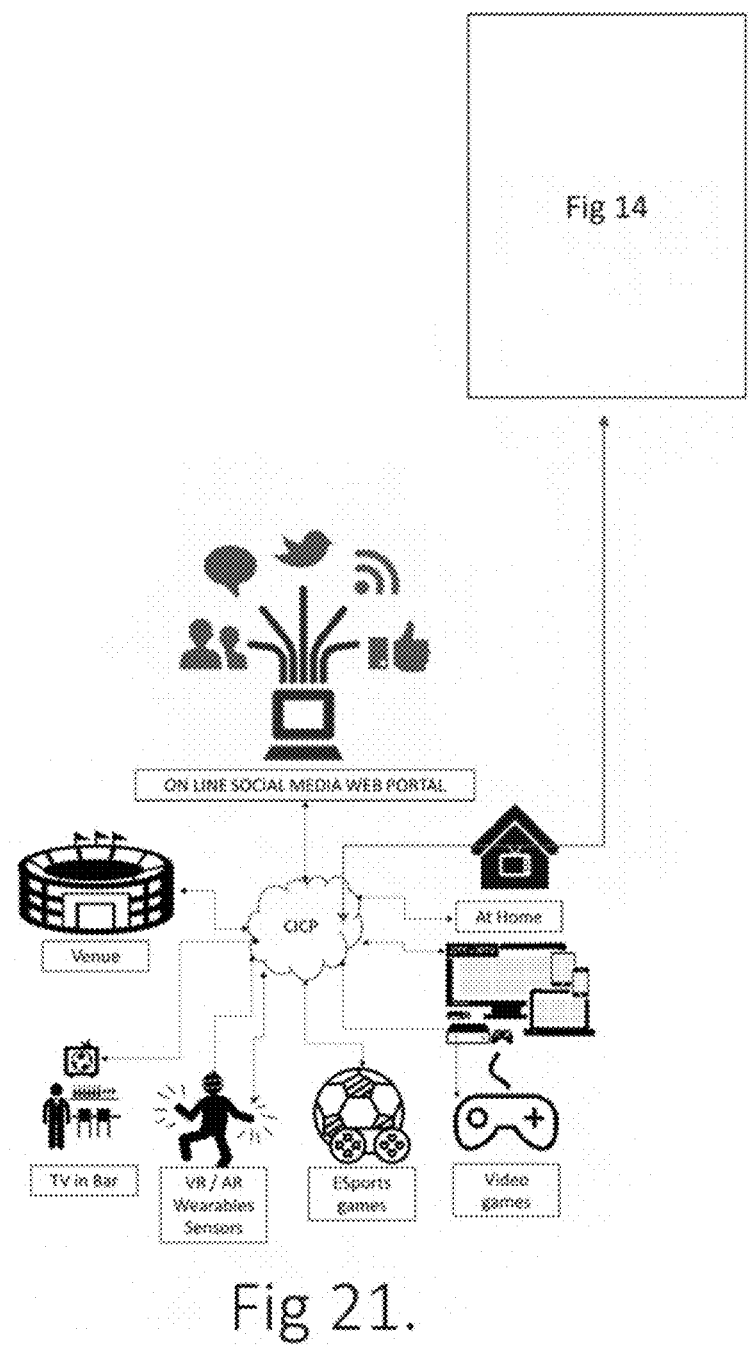
FIG. 21 depicts the system in FIG. 20 connected to and communicating via the CICP to a system as presented within FIG. 14 with all the features defined therein.

FIG. 21 depicts the system in FIG. 20 connected to and communicating via the CICP to a system as presented within FIG. 14 with all the features defined therein.

Figure 22:
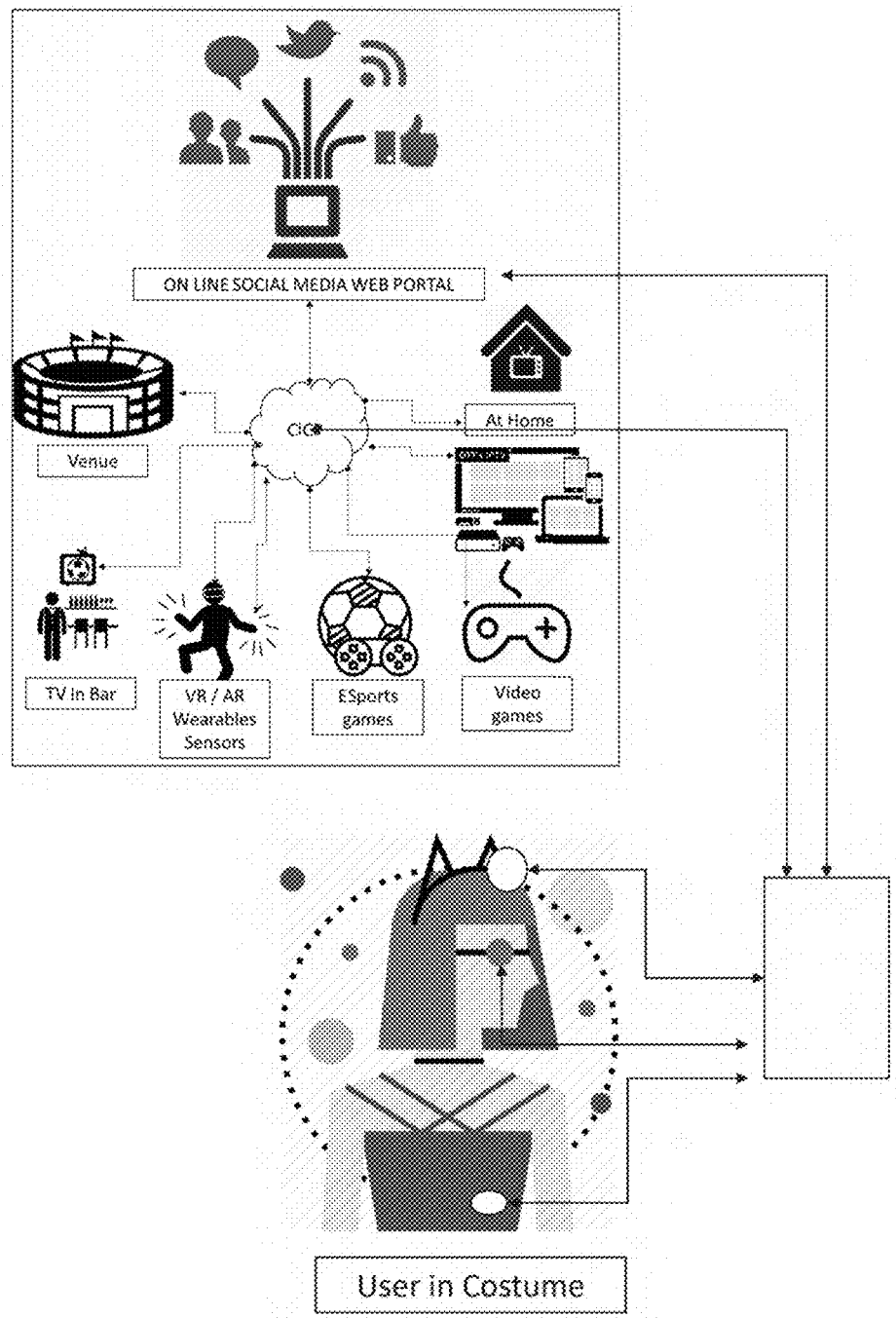
FIG. 22 depicts a person that is wearing a series of connected products such as a costume, uniform, sports equipment or other wearables that are connected with a communication device such as a mobile phone that is connected with the system depicted in FIG. 21.

FIG. 22 depicts a person that is wearing a series of connected products such as a costume, uniform, sports equipment or other wearables that are connected with a communication device such as a mobile phone that is connected with the system depicted in FIG. 21.

Figure 23:
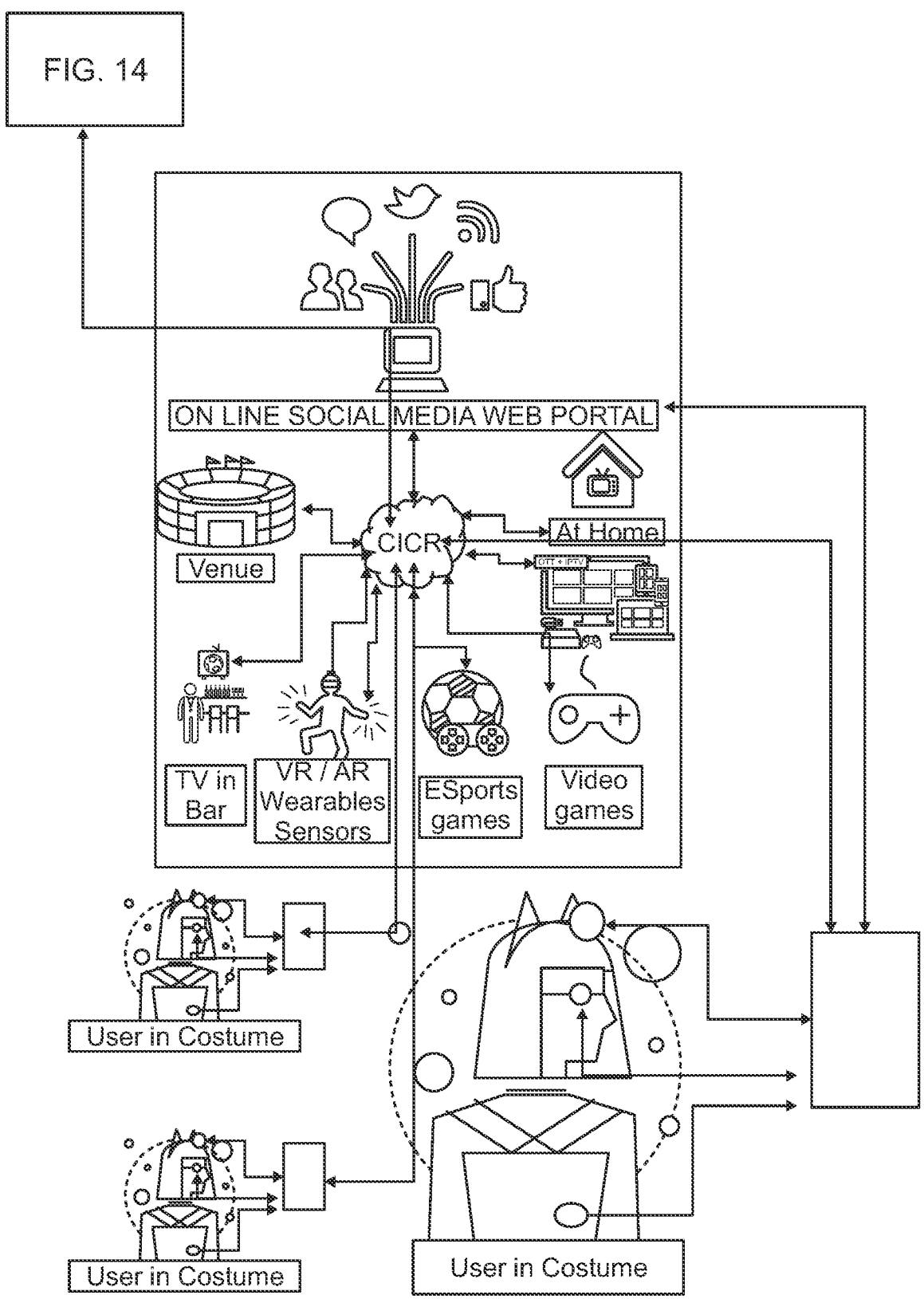
FIG. 23 depicts the same person as in FIG. 22 with additional persons with connected wearables that are communicating via the same CICP to the system defined in FIG. 14.

FIG. 23 depicts the same person as in FIG. 22 with additional persons with connected wearables that are communicating via the same CICP to the system defined in FIG. 14.

Figure 24:
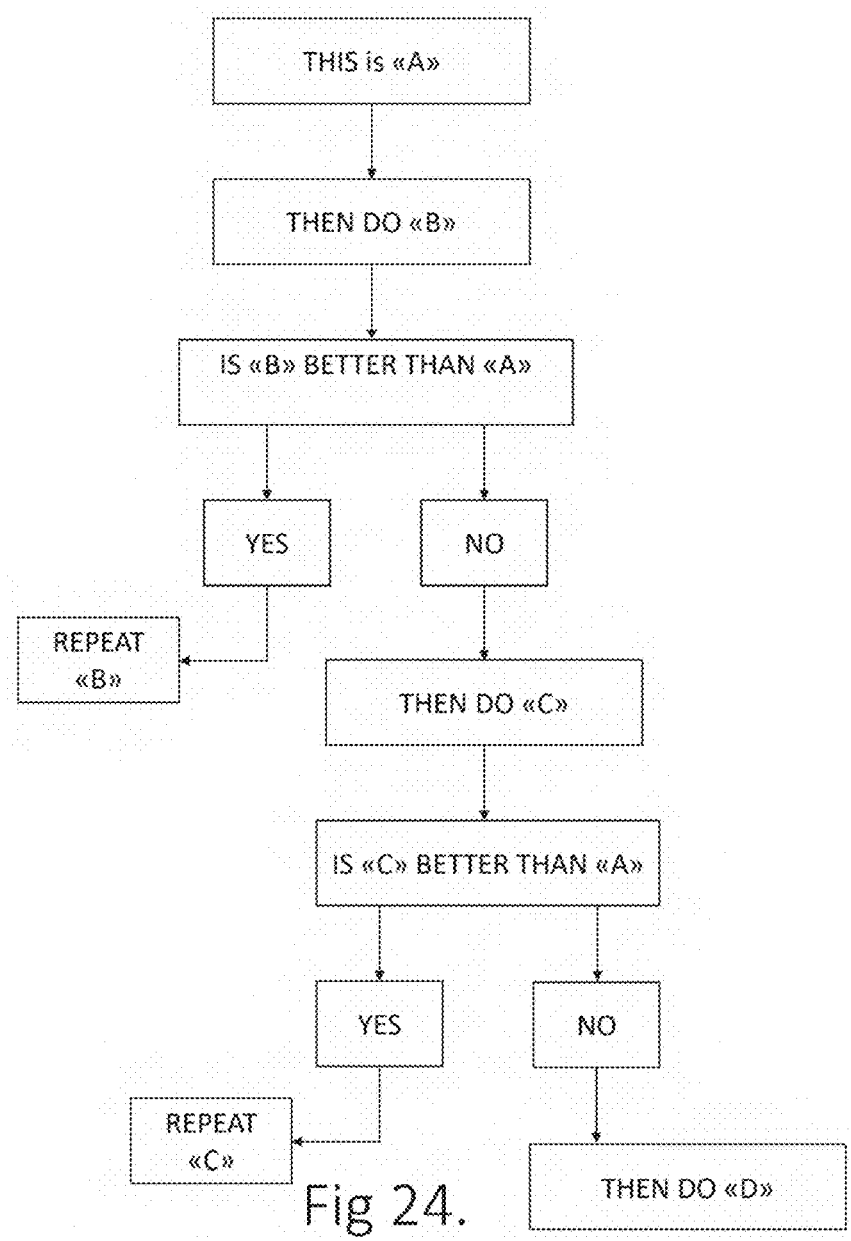
FIG. 24 depict the decision tree used to drive better outcomes by learning from various options presented delivering a learning and self improving system of advancing intelligently based decisions.

FIG. 24 depict the decision tree used to drive better outcomes by learning from various options presented delivering a learning and self improving system of advancing intelligently based decisions.

Figure 25:
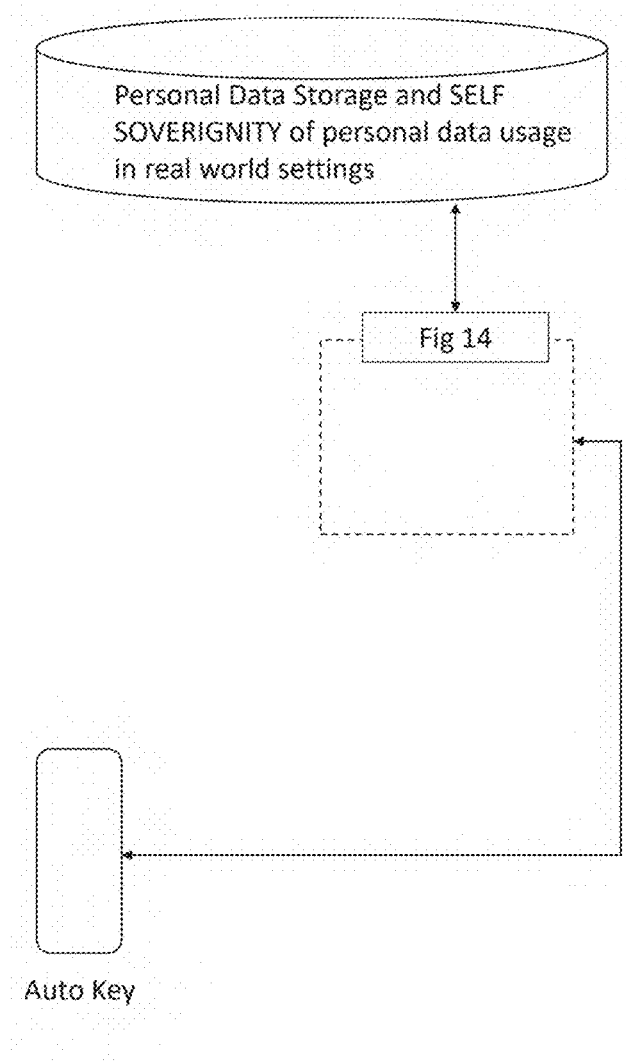
FIG. 25 depicts a schematic of a connected auto key that is communication with a system as defined with FIG. 14 and the self sovereignty as defined in FIG. 17

FIG. 25 depicts a schematic of a connected auto key that is communication with a system as defined with FIG. 14 and the self sovereignty as defined in FIG. 17

Figure 26:
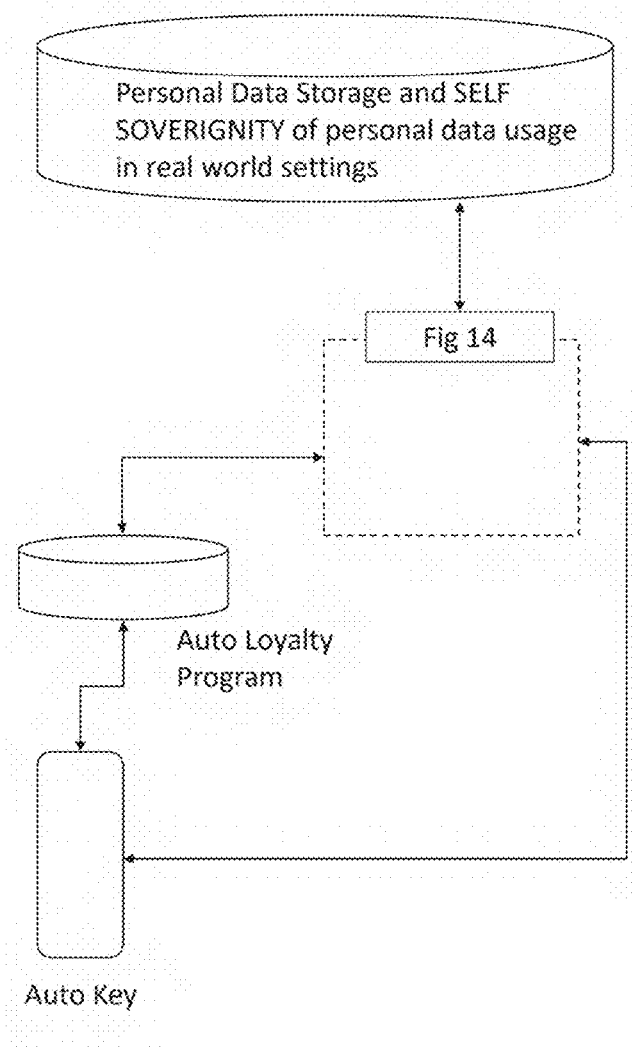
FIG. 26 depicts the key in FIG. 25 connected with a loyalty data system such as a "auto loyalty program".

FIG. 26 depicts the key in FIG. 25 connected with a loyalty data system such as a "auto loyalty program".

Figure 27:
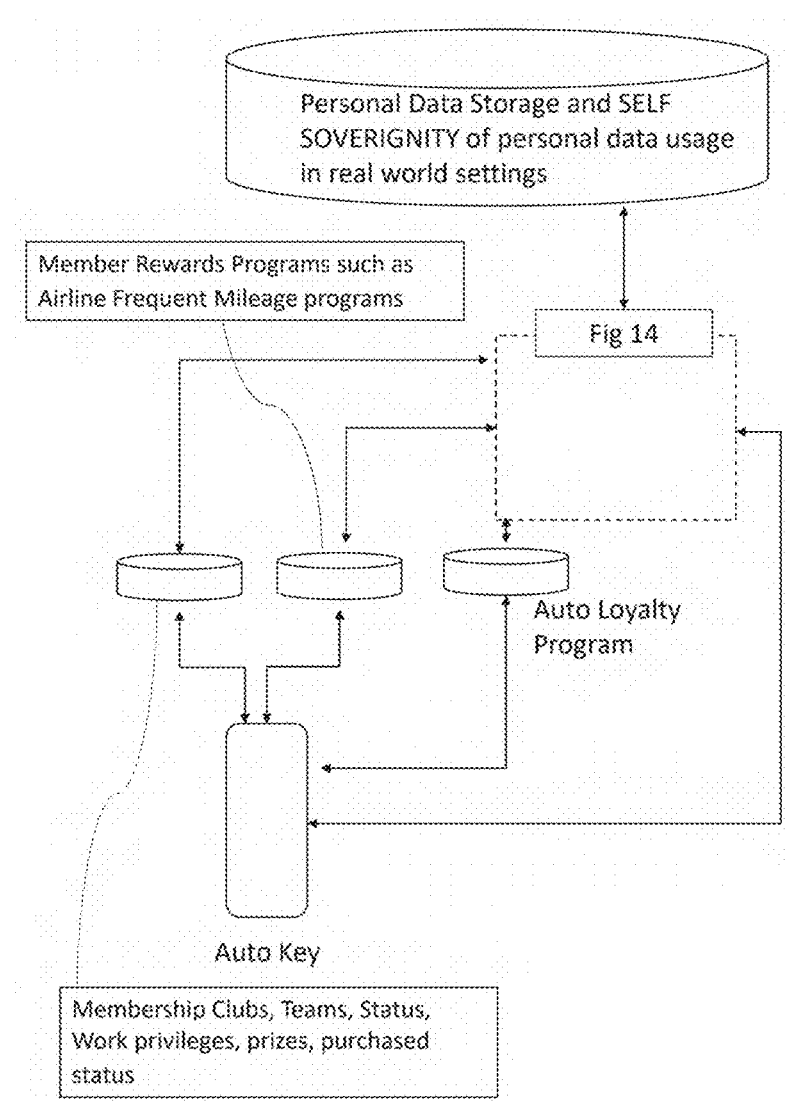
FIG. 27 depicts the same key in FIG. 26 connected with various additional loyalty, rewards and membership programs.

FIG. 27 depicts the same key in FIG. 26 connected with various additional loyalty, rewards and membership programs.

Figure 28:
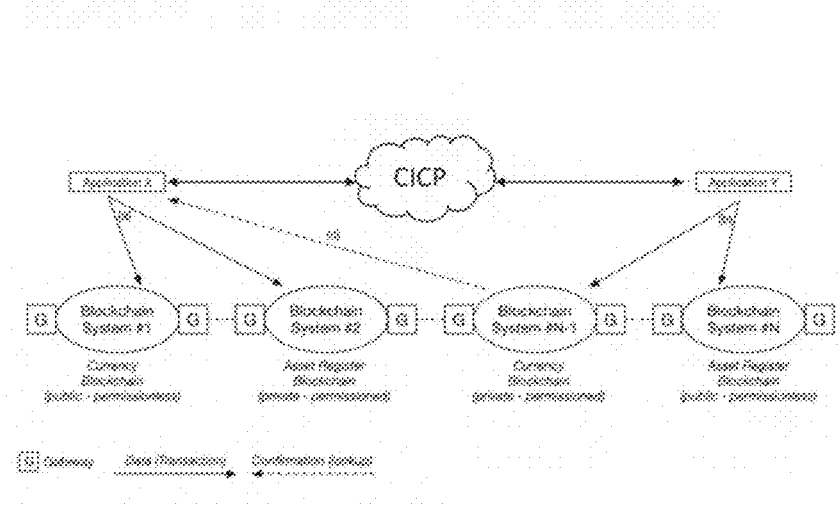
FIG. 28 is a schematic overview of various blockchain systems and their integrated and associated applications can be interoperative via a common CICP

FIG. 28 is a schematic overview of various blockchain systems and their integrated and associated applications can be interoperative via a common CICP. Multiple types of blockchain systems support the completion of a bi-directional transaction between two applications, involving computational resources across blockchain systems where some maybe operated (or owned) by different entities. In FIG. 28 applications X and Y are each employing different blockchain systems relating to currency/payments and asset ownership. Each blockchain system implements a different semantic logic and each operates under a different permissioning regime. When application X seeks to interact with foreign application Y, each may not have sufficient privileges to read from the permissioned blockchain where their previous transactions have been confirmed. Thus, when application X wishes to transfer (to Y) asset "ownership" (e.g. land deed) currently in blockchain system No. 1 (permissioned), application Y has no way to validate the ownership of the asset. This is because the foreign application Y does not have authorization to read from the ledger in blockchain system No. 1. This problem is further compounded in the case of smart contracts that incorporate parts of the business logic of the applications: The minimal assumption for interoperable blockchain systems with regards to the notion of transaction units. In other words, what is the "datagram" equivalent of transactions—namely the transaction unit that is semantically understandable (processable) by multiple different blockchain systems.
•Degrees of permissionability: Currently the permissionless/permissioned distinction refers to the degree to which users can participate in the system. Interoperability across permissioned blockchains poses additional questions with regards to how data recorded on the ledger can be referenced (referred to or "pointed to") by transactions in a foreign domain (i.e. another blockchain system). Degrees of anonymity: There are at least two (2) degrees of anonymity that is relevant to blockchain systems. The first pertains to the anonymity (i.e. identity-anonymity) of the users and the second to that of the nodes participating in processing transactions (e.g. nodes participating in a given consensus instance). Combinations are possible, such as where a permissioned system may require all consensus nodes to be strongly authenticated and identified, but allows for end-users to remain permission-less (and even unidentified/unauthenticated) and such as system is presented as the common CICP.

Figure 29:
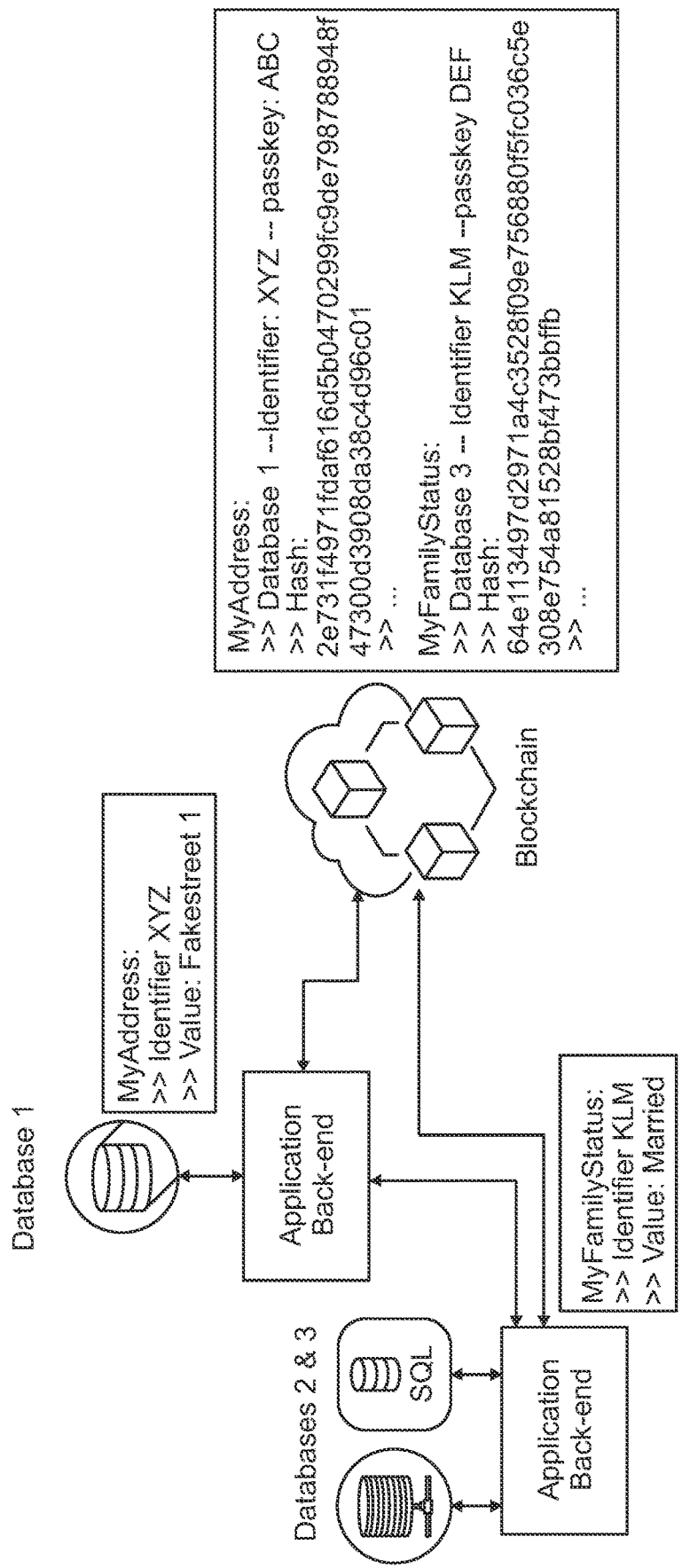
FIG. 29 is a schematic overview of various integrations of applications and application back-end systems within a blockchain system
Figure 30:
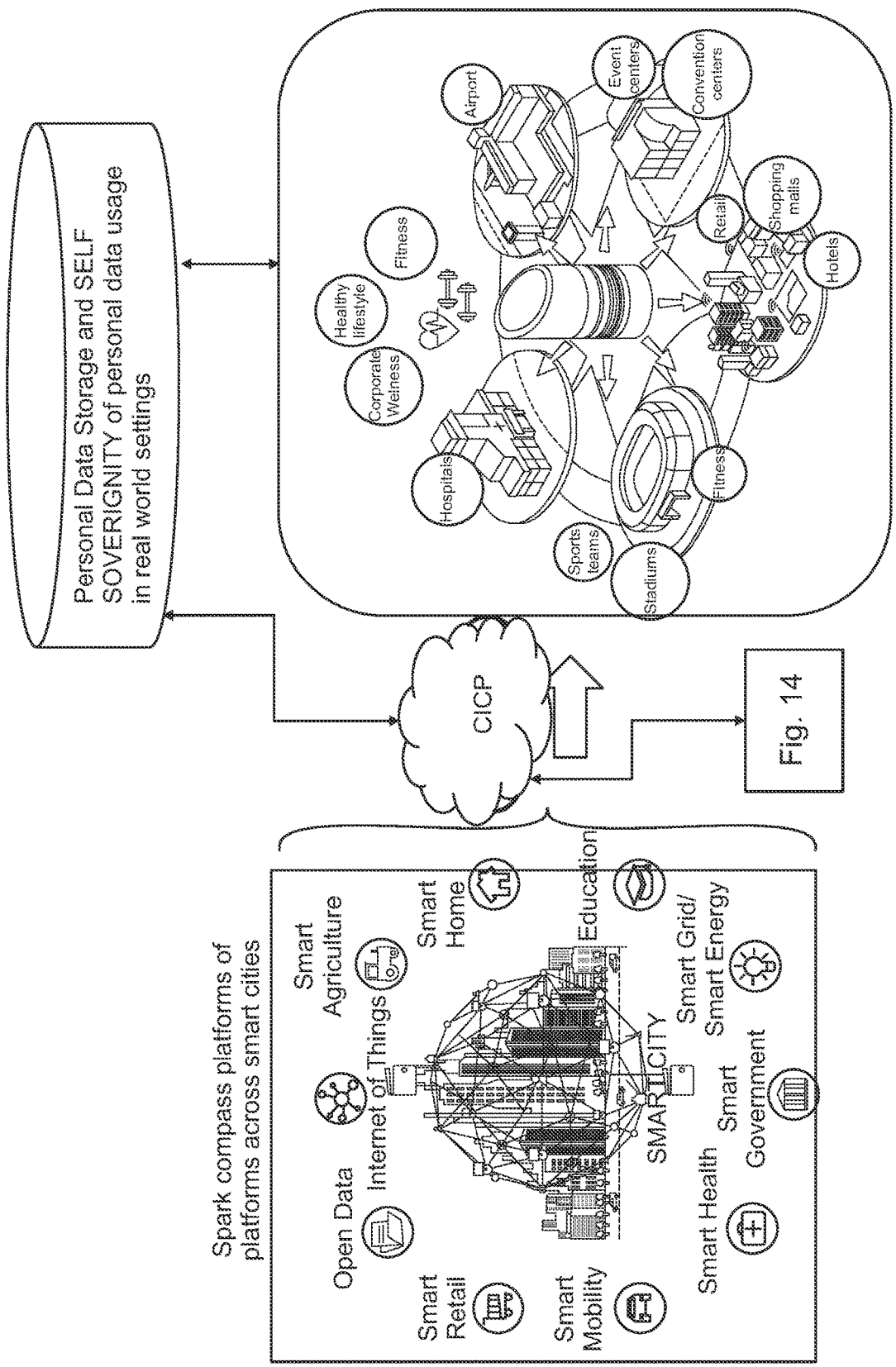
FIG. 30 is an infographic representation of a smart city connected with a CICP and a system as defined in FIG. 14 delivering data experiences and controls into an intelligent city with constituent's ability to "self sovereignty" of their data across the city and various use cases they encounter during their life there.

FIG. 29 is a schematic overview of various integrations of applications and application back-end systems within a blockchain system FIG. 30 is an infographic representation of a smart city connected with a CICP and a system as defined in FIG. 14 delivering data experiences and controls into an intelligent city with constituent's ability to "self sovereignty" of their data across the city and various use cases they encounter during their life there.

Figure 31:
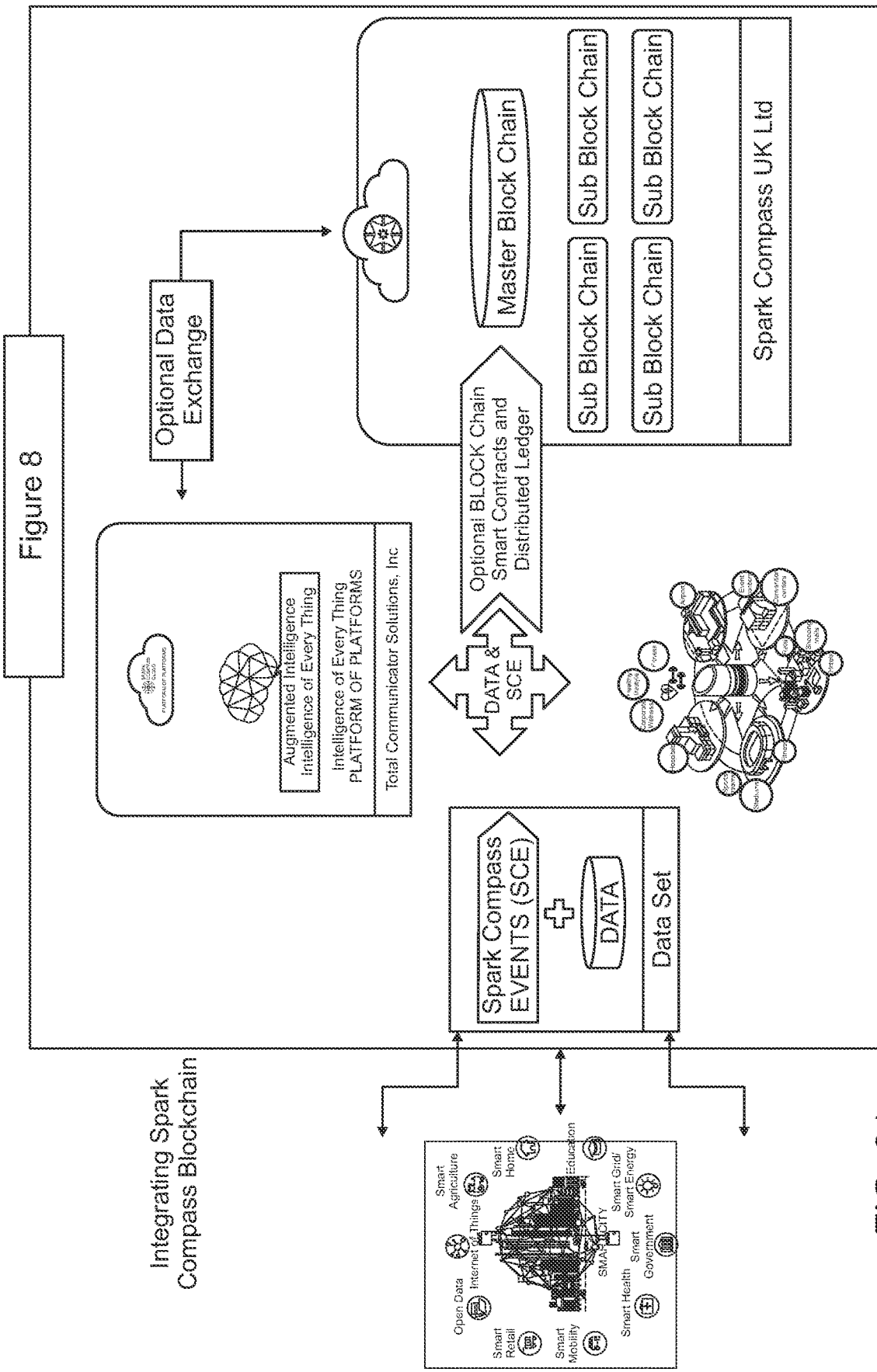
FIG. 31 is an infographic depicting an intelligent Smart City installation.

FIG. 31 is an infographic depicting an intelligent Smart City installation where solutions, use cases, areas of influence, end users, installations, equipment, buildings and any assorted services such as utility, law enforcement, communication, transportation, sanitation, water, health, electricity, lighting or other city delivered services and any connected device as connected with a cloud based CICP that is connected with a system as described in FIG. 14 and can enable Self Sovereignty of the date captured for the constituents, visitors, travelers, staff, service providers or others within the city that are interacting with the CICPs and or the system depicted in FIG. 14.

Figure 32:
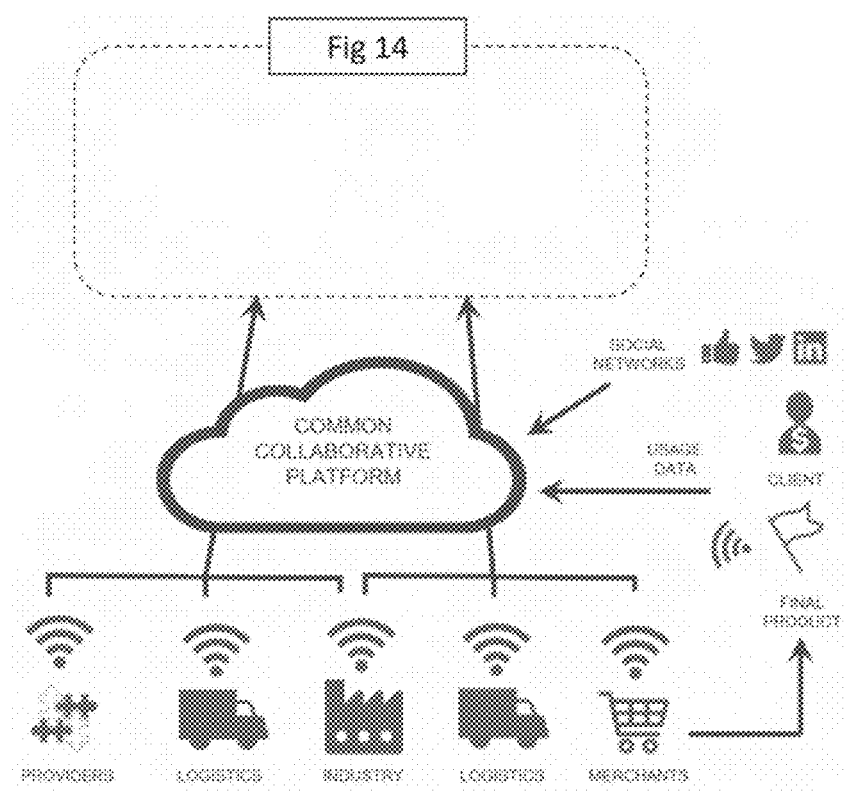
FIG. 32 is an infographic depicting a common collaborative platform across product providers, logistics, shipping and retail, data share, social media and data controls and capture via a system as defined in FIG. 8.

FIG. 32 is an infographic depicting a common collaborative platform across product providers, logistics, shipping and retail, data share, social media and data controls and capture via a system as defined in FIG. 8.

FIG. 33 is an infographic depicting a contextually intelligent communication platform integrated with internet of things showing how the combined platform delivers Augmented Intelligence to EveryThing and how these can be integrated with the solution as depicted in FIG. 14.

Figure 34:
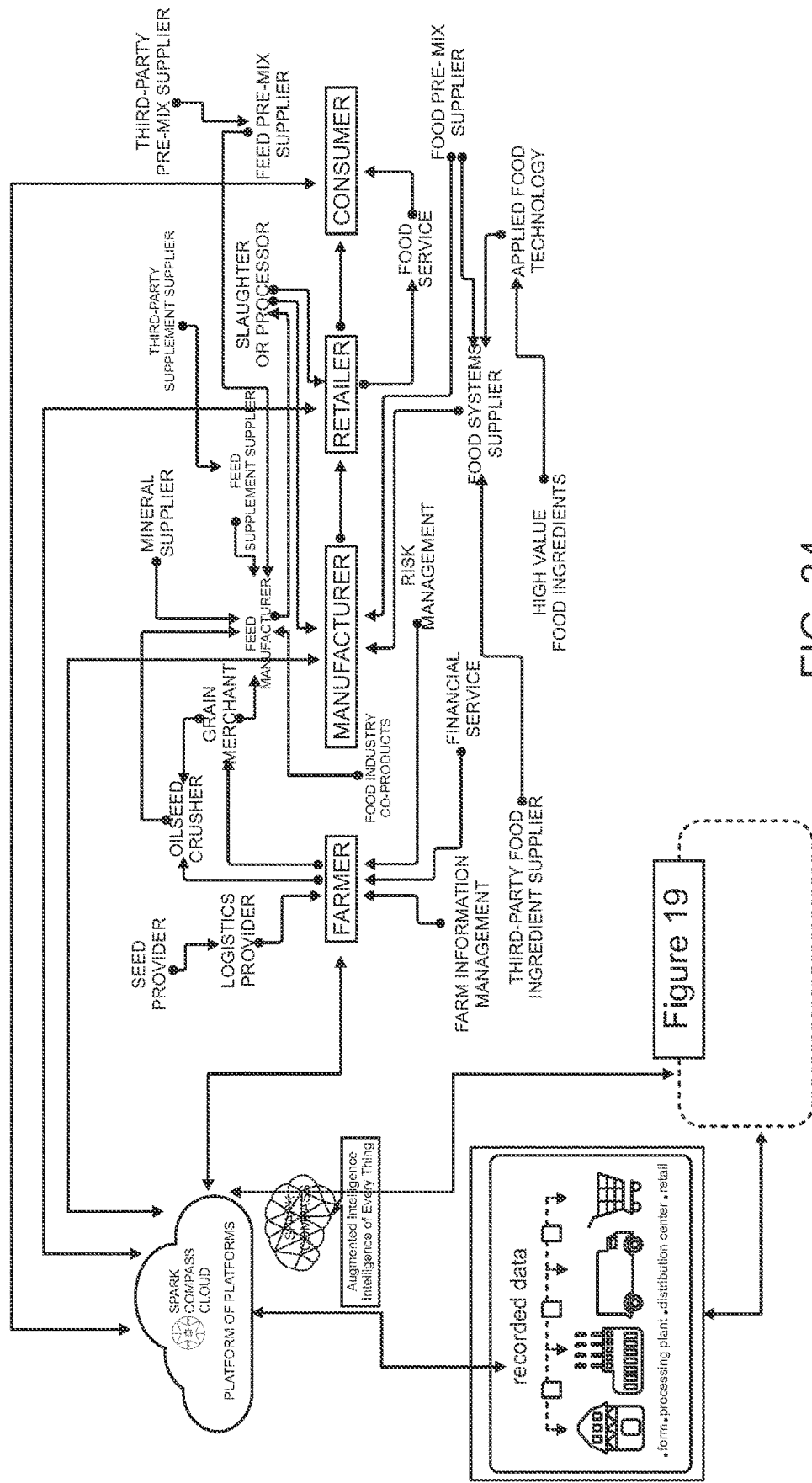
FIG. 34 is an infographic showing the interactions in the logistics process "From Farm to Table" where each step and node is captured and retained by the system.

FIG. 34 is an infographic showing the interactions in the logistics process "From Farm to Table" where each step and node is captured and retained by the system and how this can be integrated with a solution such as the one depicted in FIG. 19.

Figure 35:
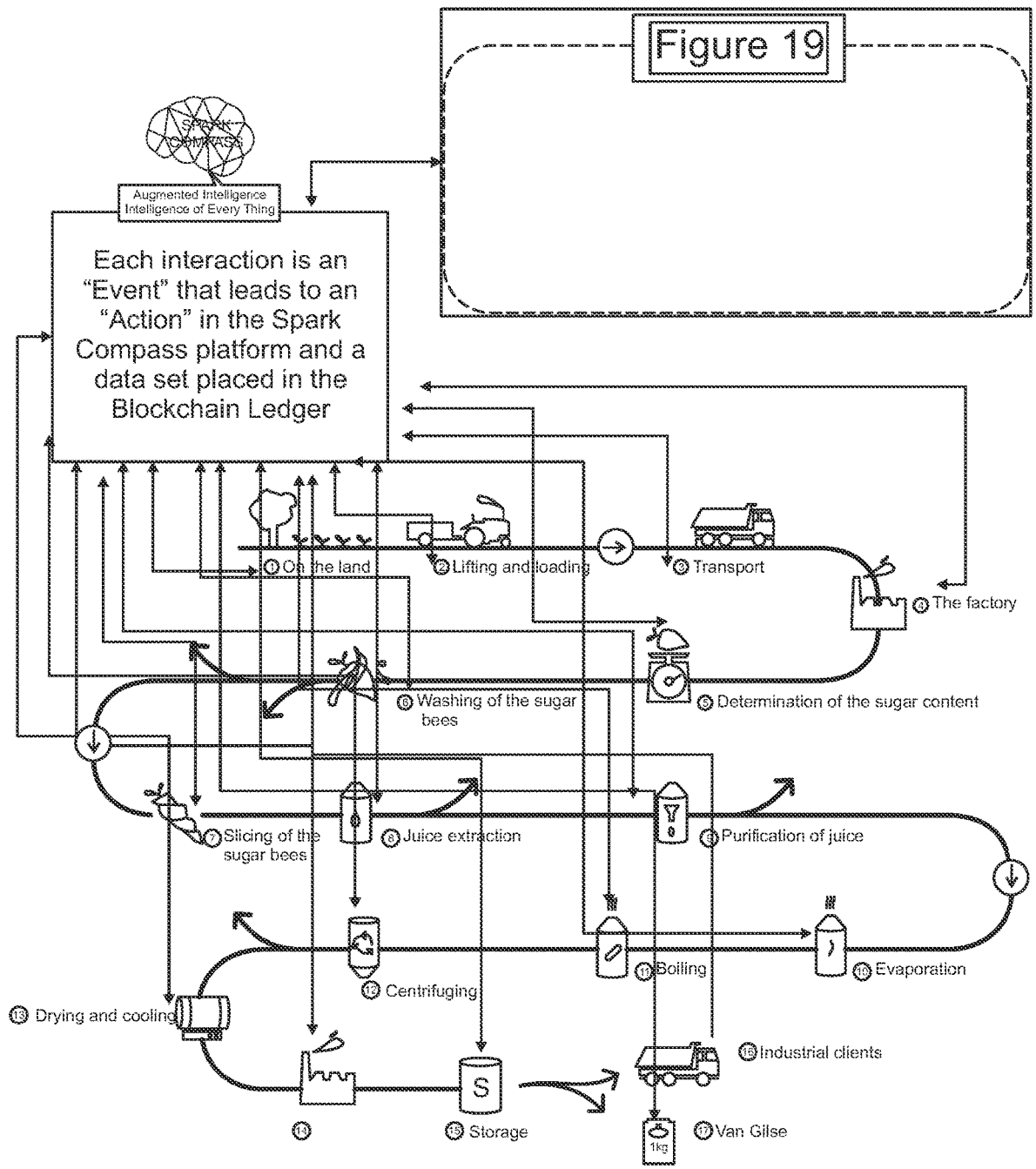
FIG. 35 is an infographic representation of the typical processes and steps in the logistic chain and where communication back from the systems can be enabled and activated next step in the logistic process.

FIG. 35 is an infographic representation of the typical processes and steps in the logistic chain and where communication back from the systems can be enabled and activated next step in the logistic process and how this can be integrated with a solution such as the one depicted in FIG. 19.

Figure 36:
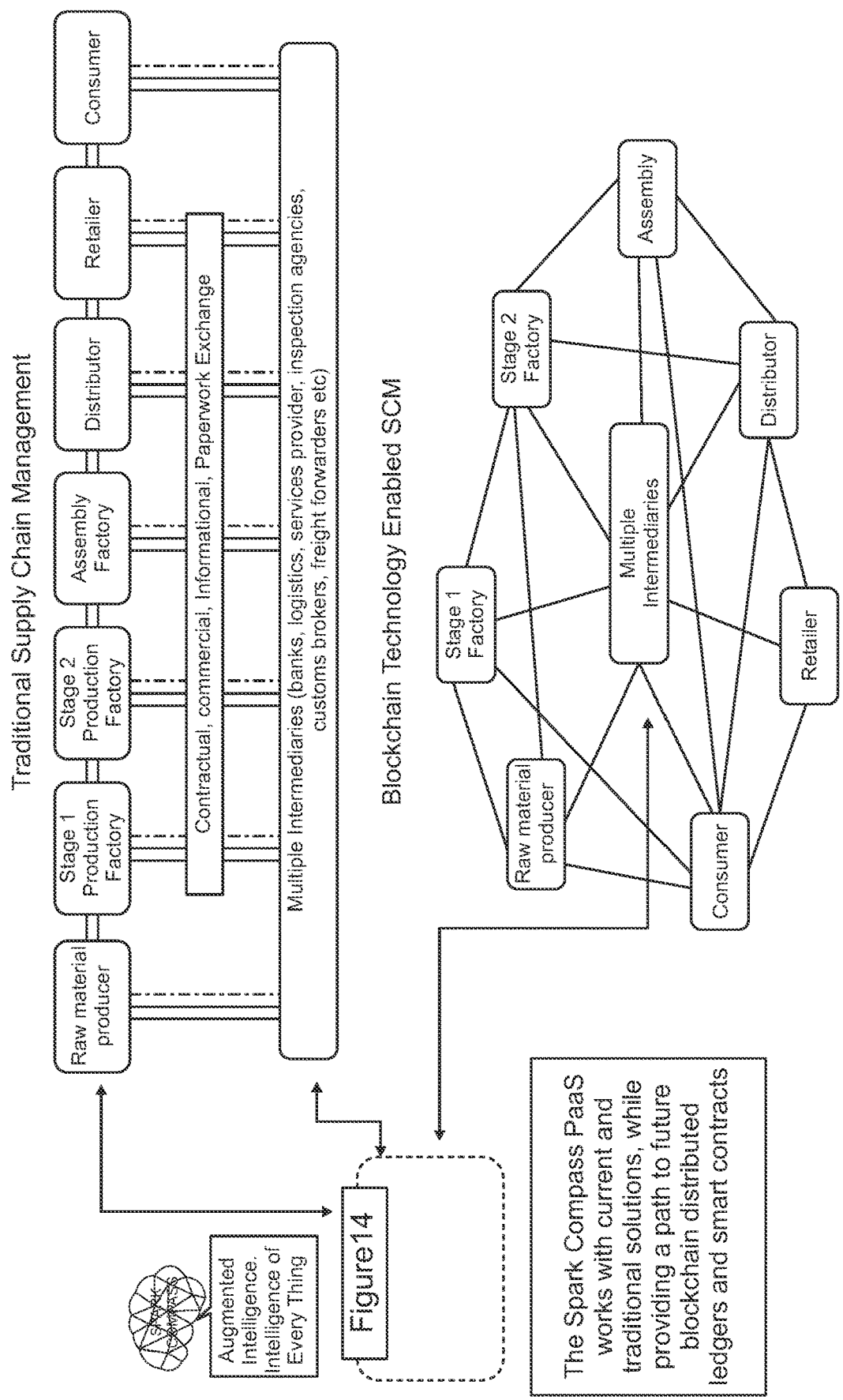
FIG. 36 depicts the difference between traditional supply channel management and the system described within this invention.

FIG. 36 depicts the difference between traditional supply channel management and the system described within this invention.

Figure 37:
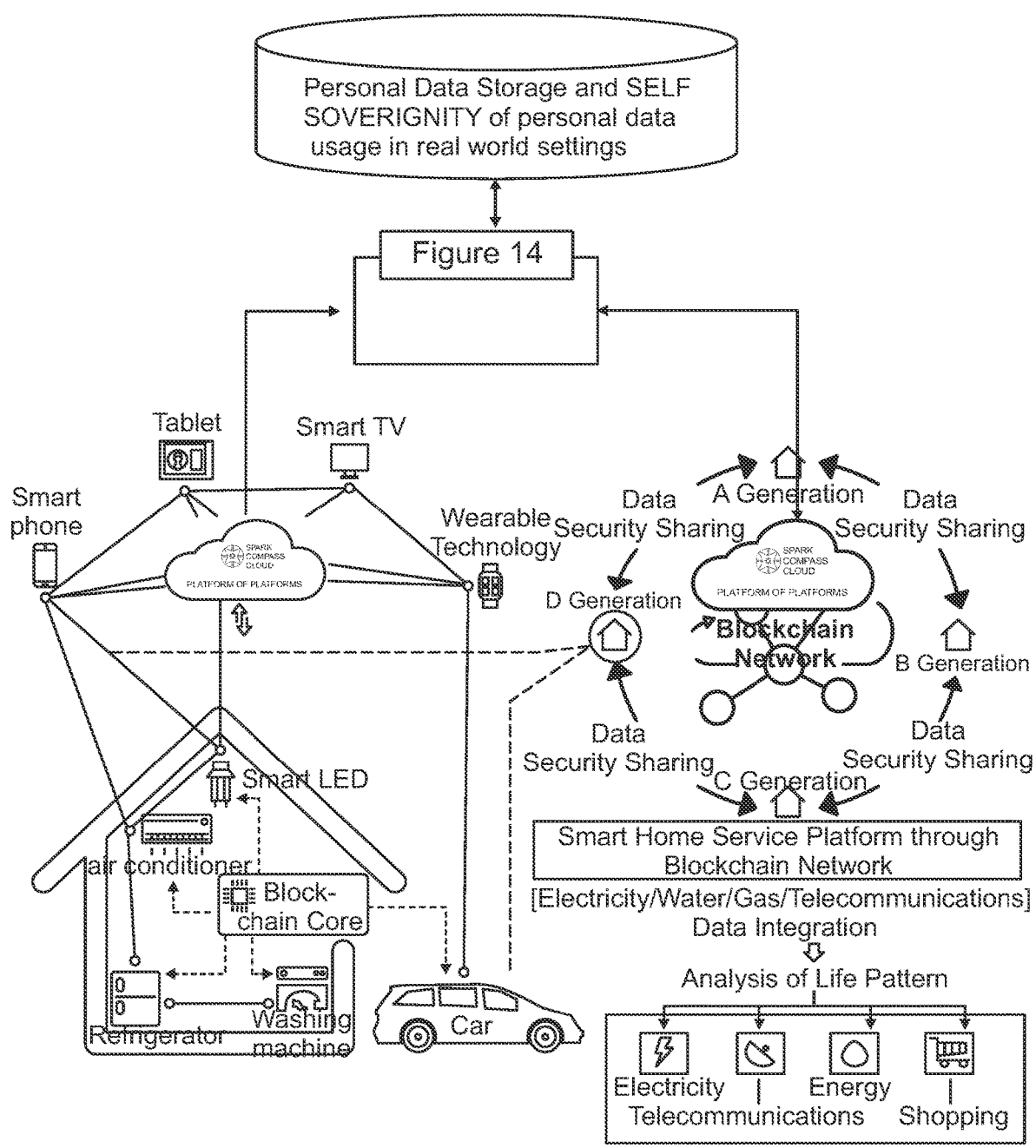
FIG. 37 is an infographic depicting a smart home connected with a blockchain and the data capture and personal data there and beyond into a blockchain network connected via a platform of platforms in FIG. 14.

FIG. 37 is an infographic depicting a smart home connected with a blockchain and the data capture and personal data there and beyond into a blockchain network connected via a platform of platforms in FIG. 14.

Figure 38:
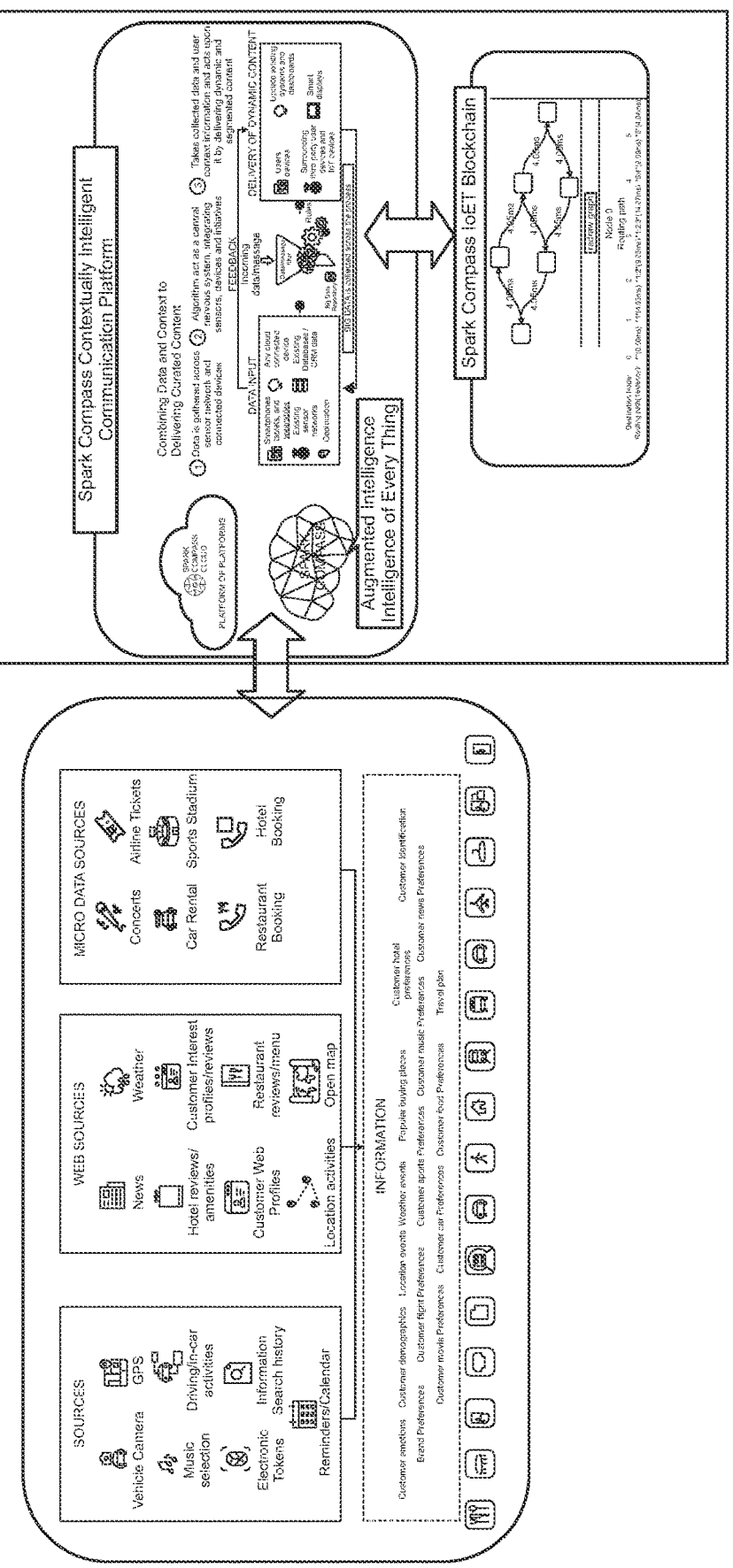
FIG. 38 is an infographic showing the integration of the various CICPS and blockchains such as those defined in FIG. 14 integrated with various data sources and information gathering sources.

FIG. 38 is an infographic showing the integration of the various CICPS and blockchains such as those defined in FIG. 14 integrated with various data sources and information gathering sources.

Figure 39:
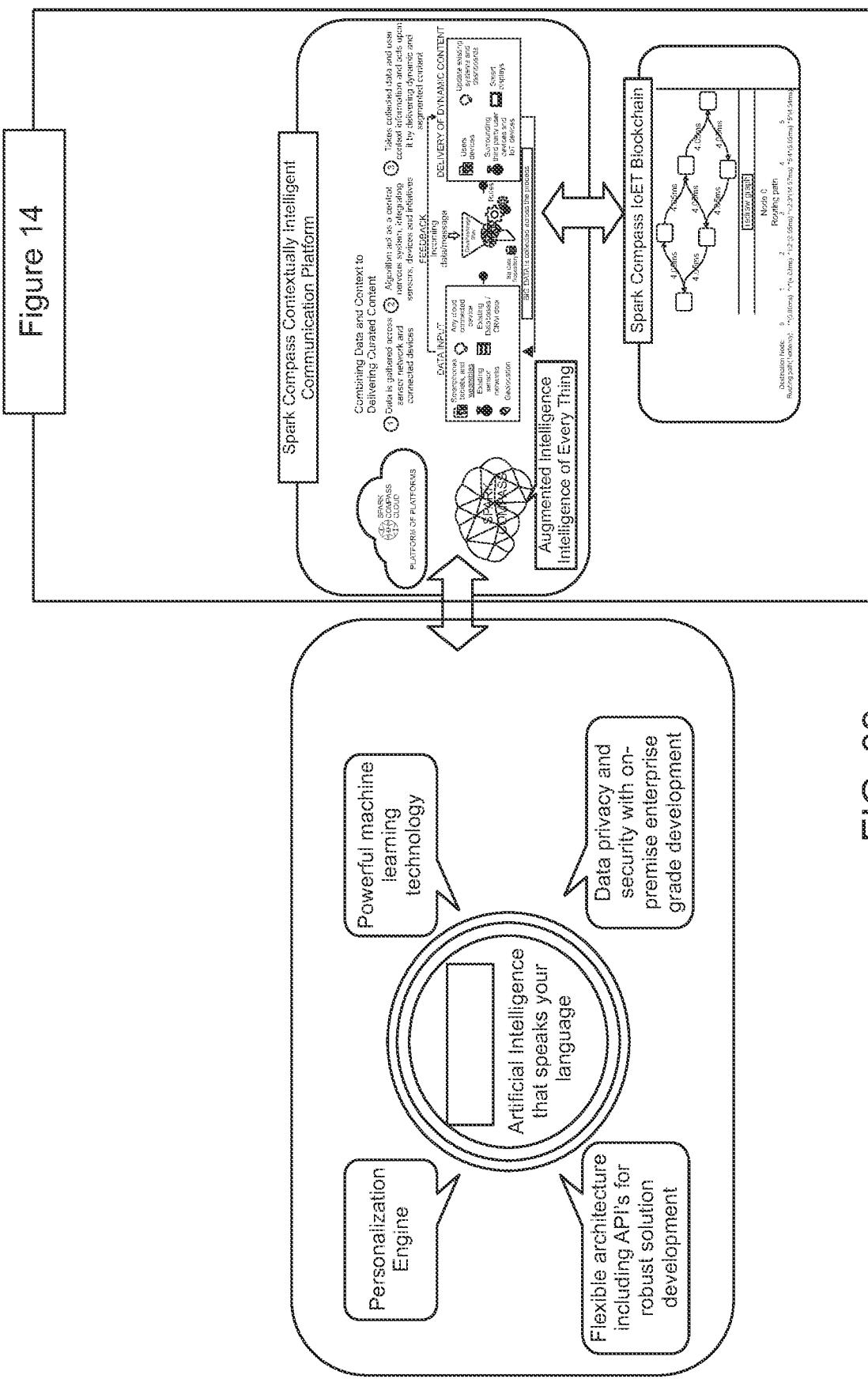
FIG. 39 is an infographic showing the integration of the various CICPS and blockchains such as those defined in FIG. 14 integrated with various artificial intelligence, personalization and other data and information gathering sources.

FIG. 39 is an infographic showing the integration of the various CICPS and blockchains such as those defined in FIG. 14 integrated with various artificial intelligence, personalization and other data and information gathering sources.

FIG. 40 is an infographic showing the integration of the various CICPS and blockchains such as those defined in FIG. 14 integrated with various cognitive units such as smart card and associated information gathering sources.

FIG. 41 is an infographic showing the integration of the various CICPS and blockchains such as those defined in FIG. 14 integrated with various self identity and self sovereignty enabled data sources and information gathering sources.

Figure 42:
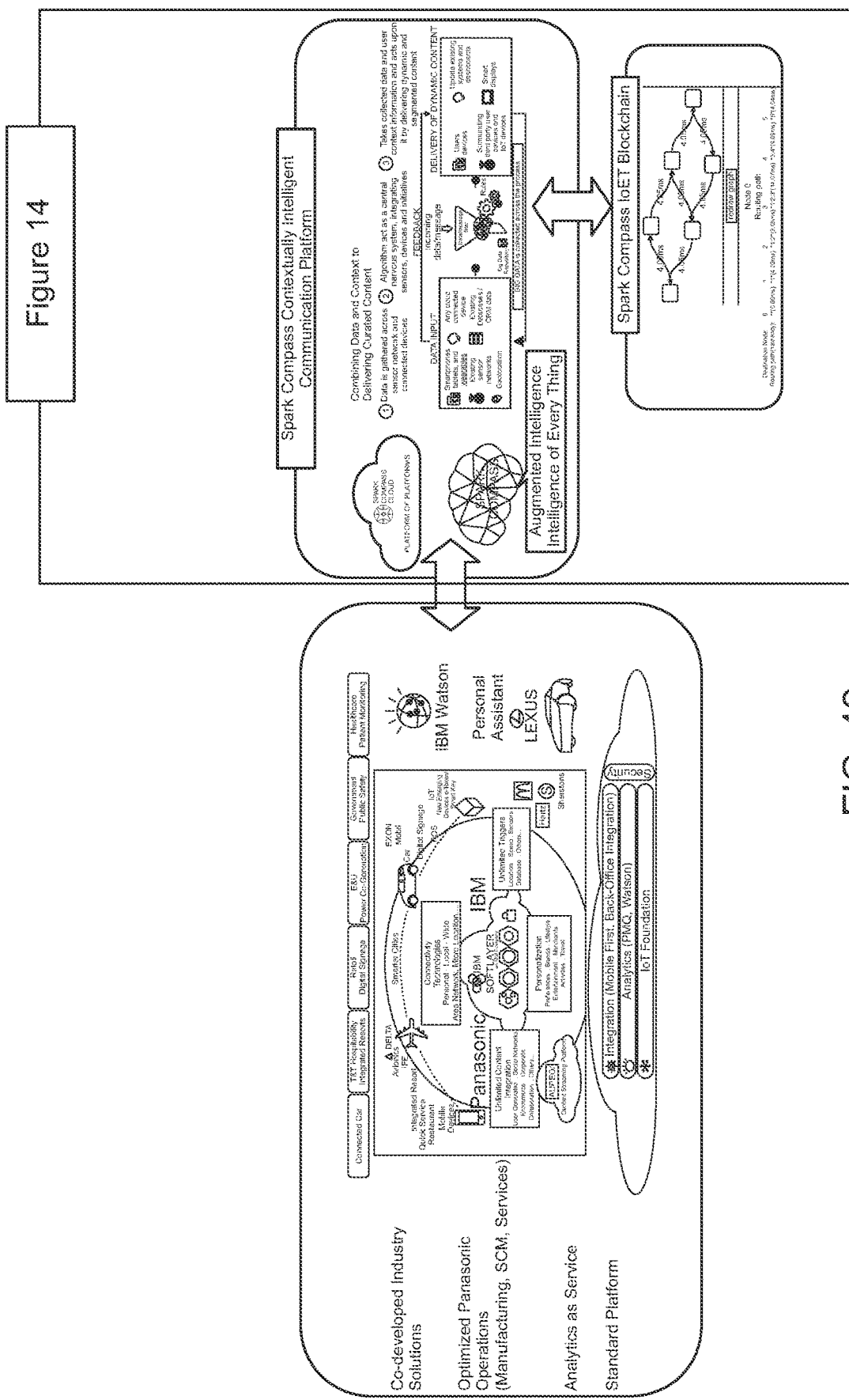
FIG. 42 is an infographic showing the integration of the various CICPS and blockchains such as those defined in FIG. 14 integrated with various use cases, third party companies and solutions, data sources and information gathering sources associated with a traveler as he travels.

FIG. 42 is an infographic showing the integration of the various CICPS and blockchains such as those defined in FIG. 14 integrated with various use cases, third party companies and solutions, data sources and information gathering sources associated with a traveler as he travels.

Figure 43:
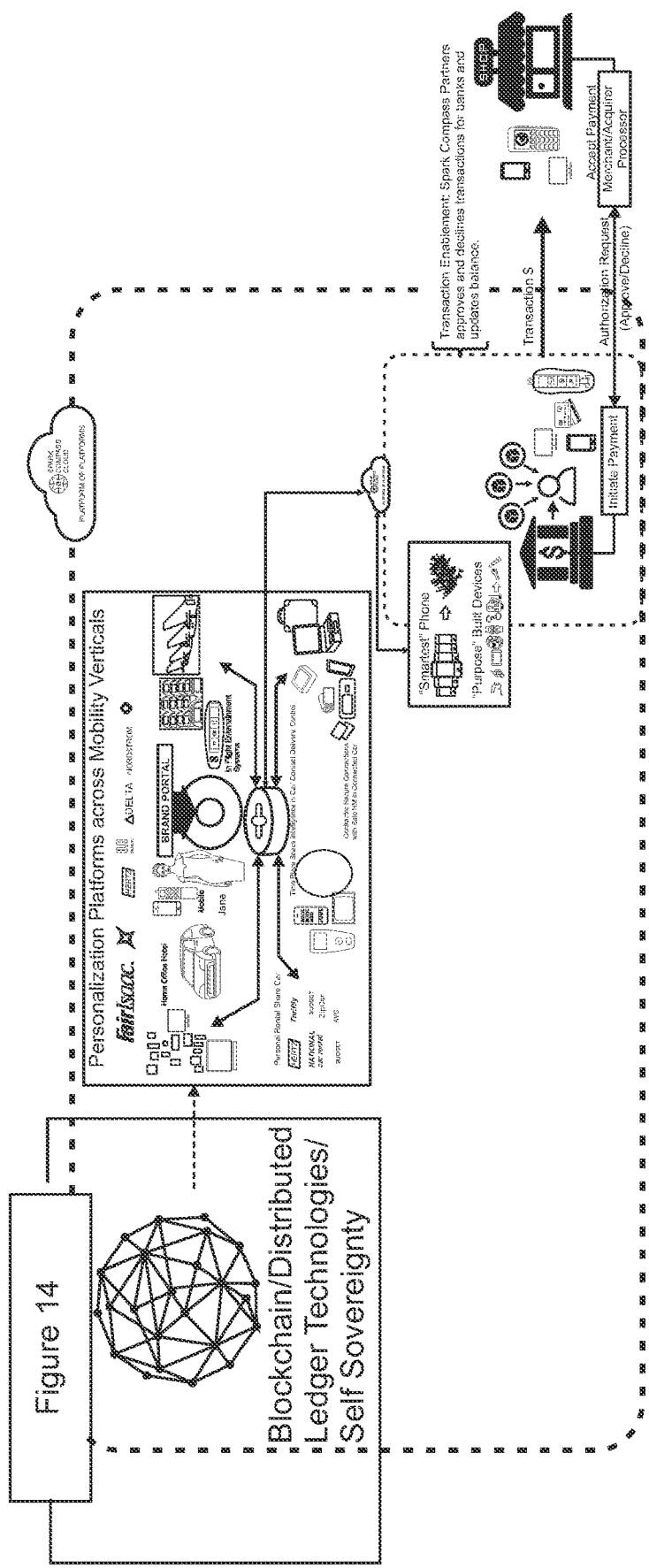
FIG. 43 is an infographic showing the integration of the various CICPS and blockchains such as those defined in FIG. 14 integrated with various use cases, third party companies and solutions, data sources and information gathering sources associated with a traveler as he travels as shown in FIG. 42 with an integrated payment.

FIG. 43 is an infographic showing the integration of the various CICPS and blockchains such as those defined in FIG. 14 integrated with various use cases, third party companies and solutions, data sources and information gathering sources associated with a traveler as he travels as shown in FIG. 42 with an integrated payment.

Figure 44:
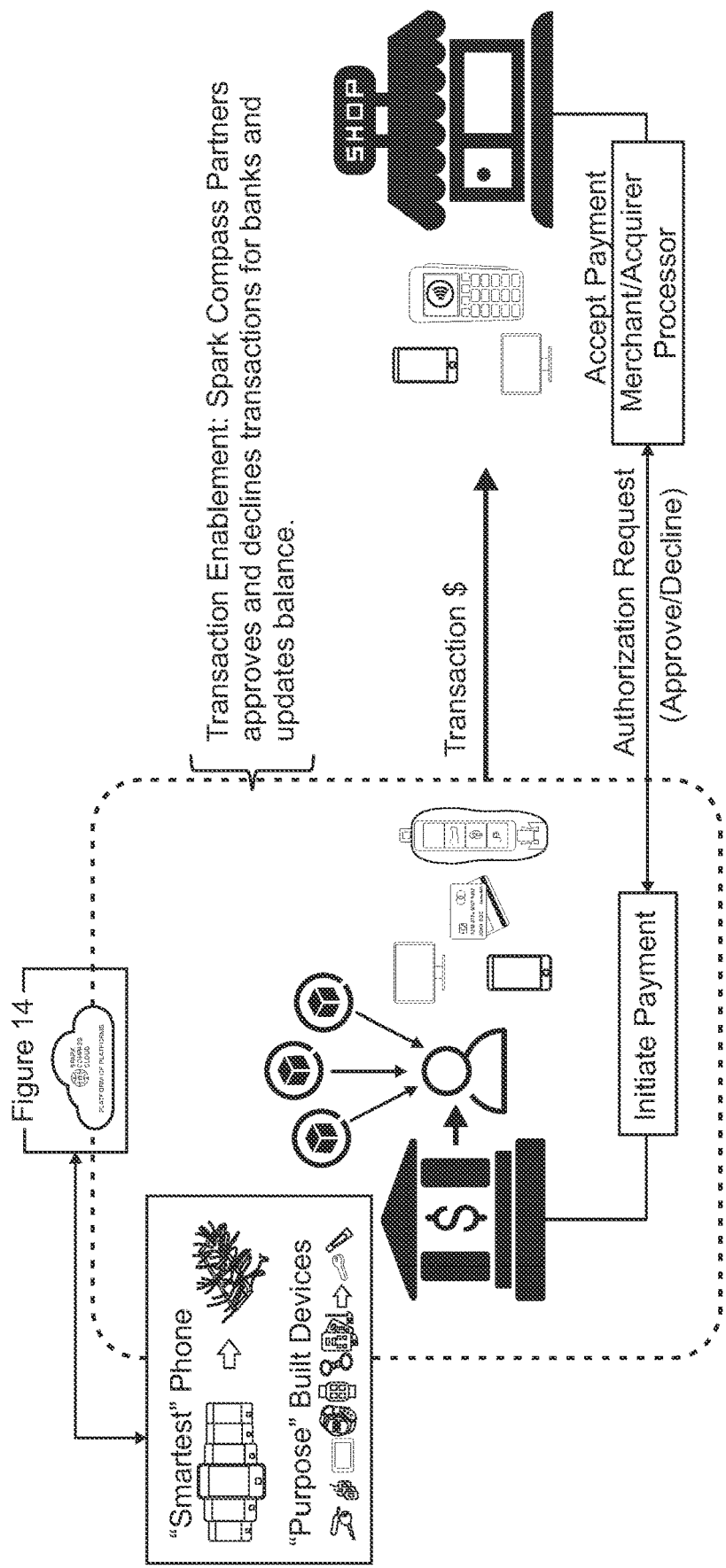
FIG. 44 is an infographic showing the payment aspects and the integration of the various enabled payment physical tokens.

FIG. 44 is an infographic showing the payment aspects and the integration of the various enabled payment physical tokens when integrated with a system as depicted in FIG. 14.

Figure 45:
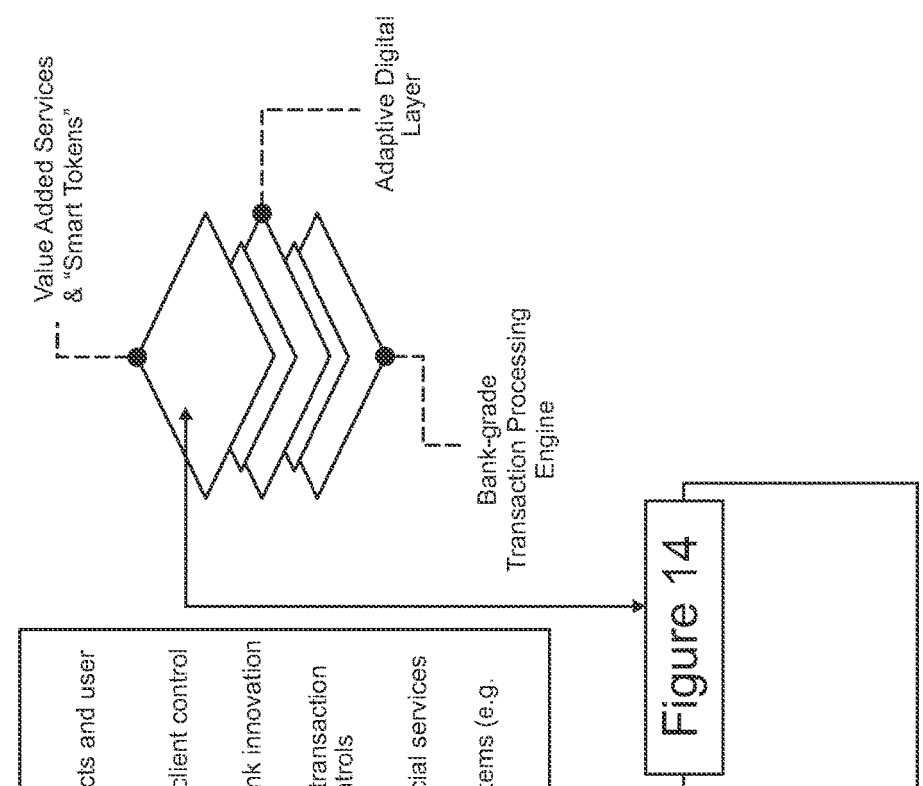
FIG. 45 is an infographic showing the details and features in a mobile payment solution that is integrated with the solutions defined in FIG. 14.

FIG. 45 is an infographic showing the details and features in a mobile payment solution that is integrated with the solutions defined in FIG. 14.

Figure 46:
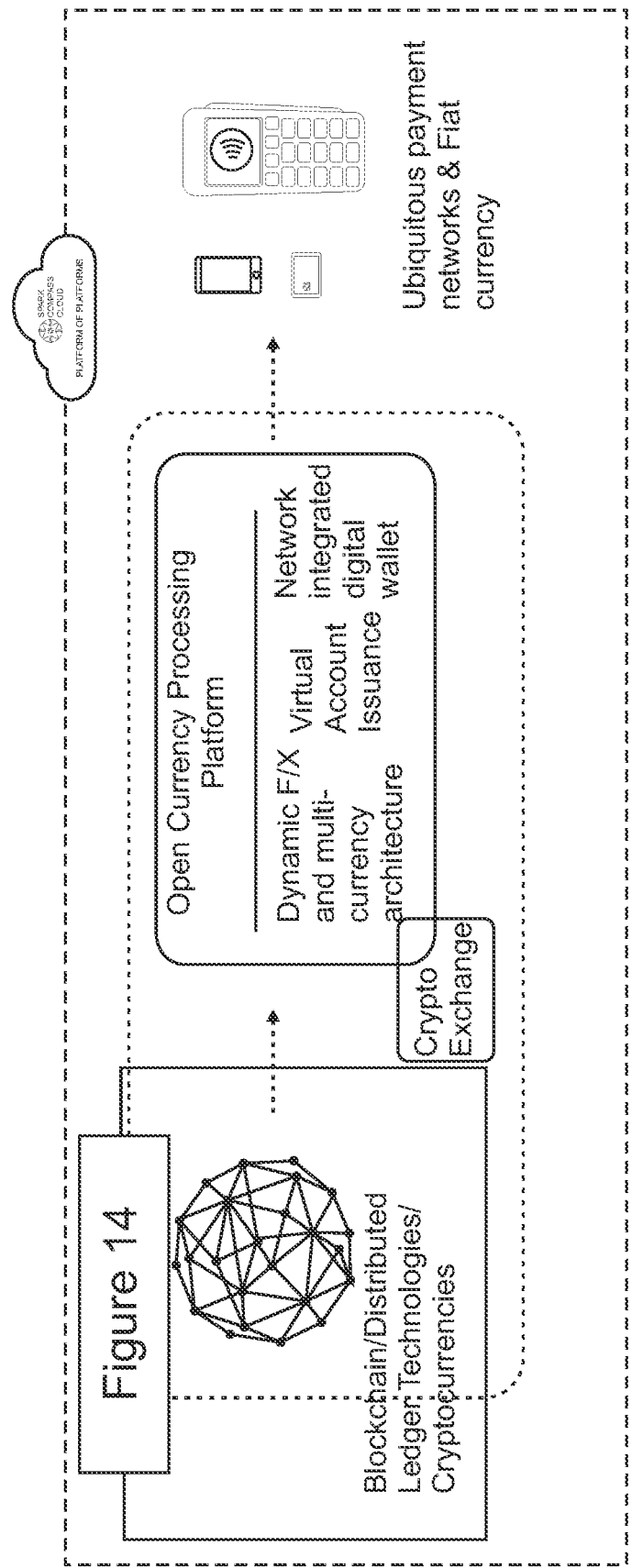
FIG. 46 is an infographic showing the way a system as defined in FIG. 14 can be integrated with multiple payment processing platforms.

FIG. 46 is an infographic showing the way a system as defined in FIG. 14 can be integrated with multiple payment processing platforms.

Figure 47:
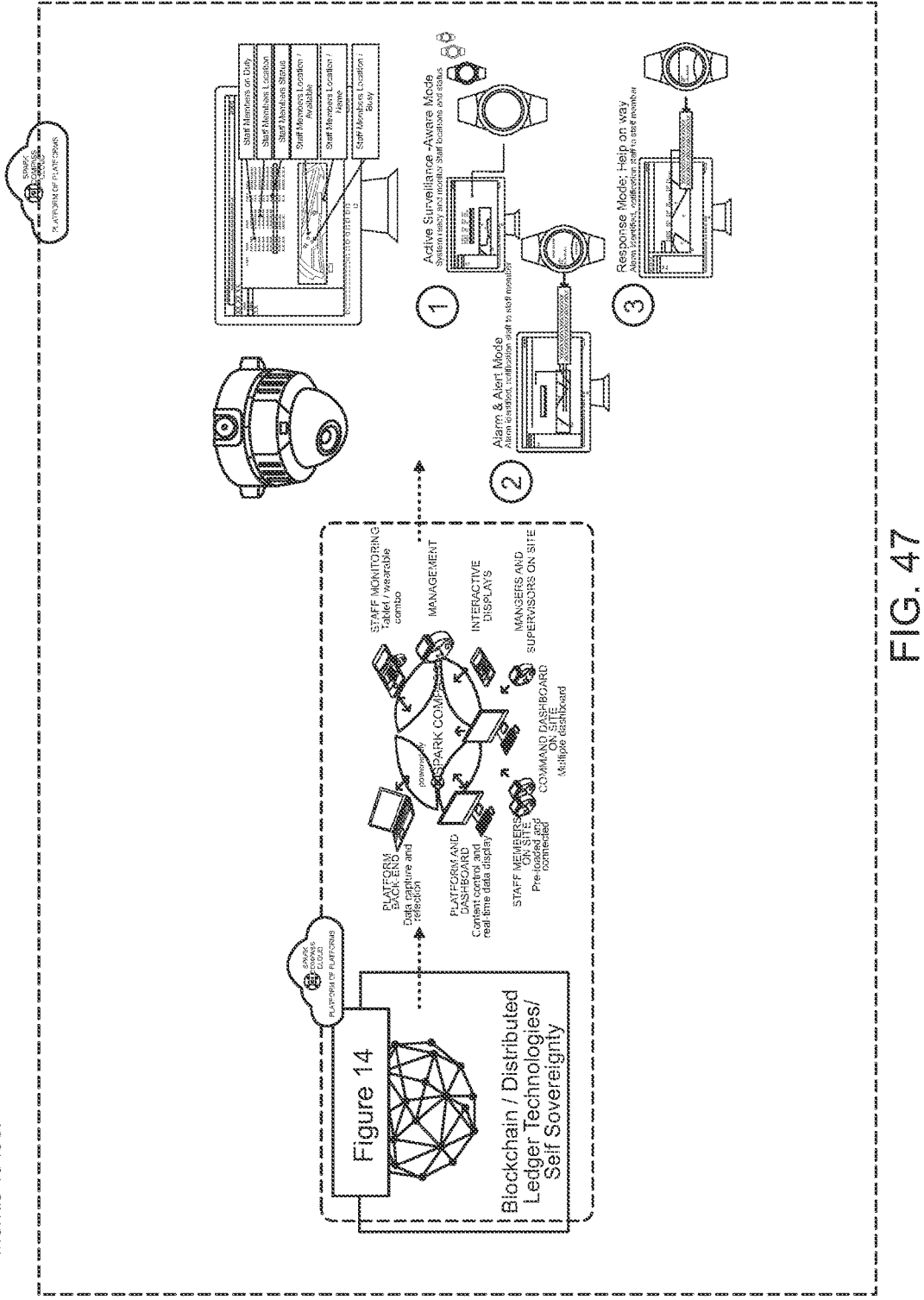
FIG. 47 is an infographic showcasing how the platform shown in FIG. 14 can be integrated with security cameras, surveillance cameras, wearables and sensors with a CICP platform that can send instructions to staff members based on their location on their connected wearable.

FIG. 47 is an infographic showcasing how the platform shown in FIG. 14 can be integrated with security cameras, surveillance cameras, wearables and sensors with a CICP platform that can send instructions to staff members based on their location on their connected wearable.

Figure 48:
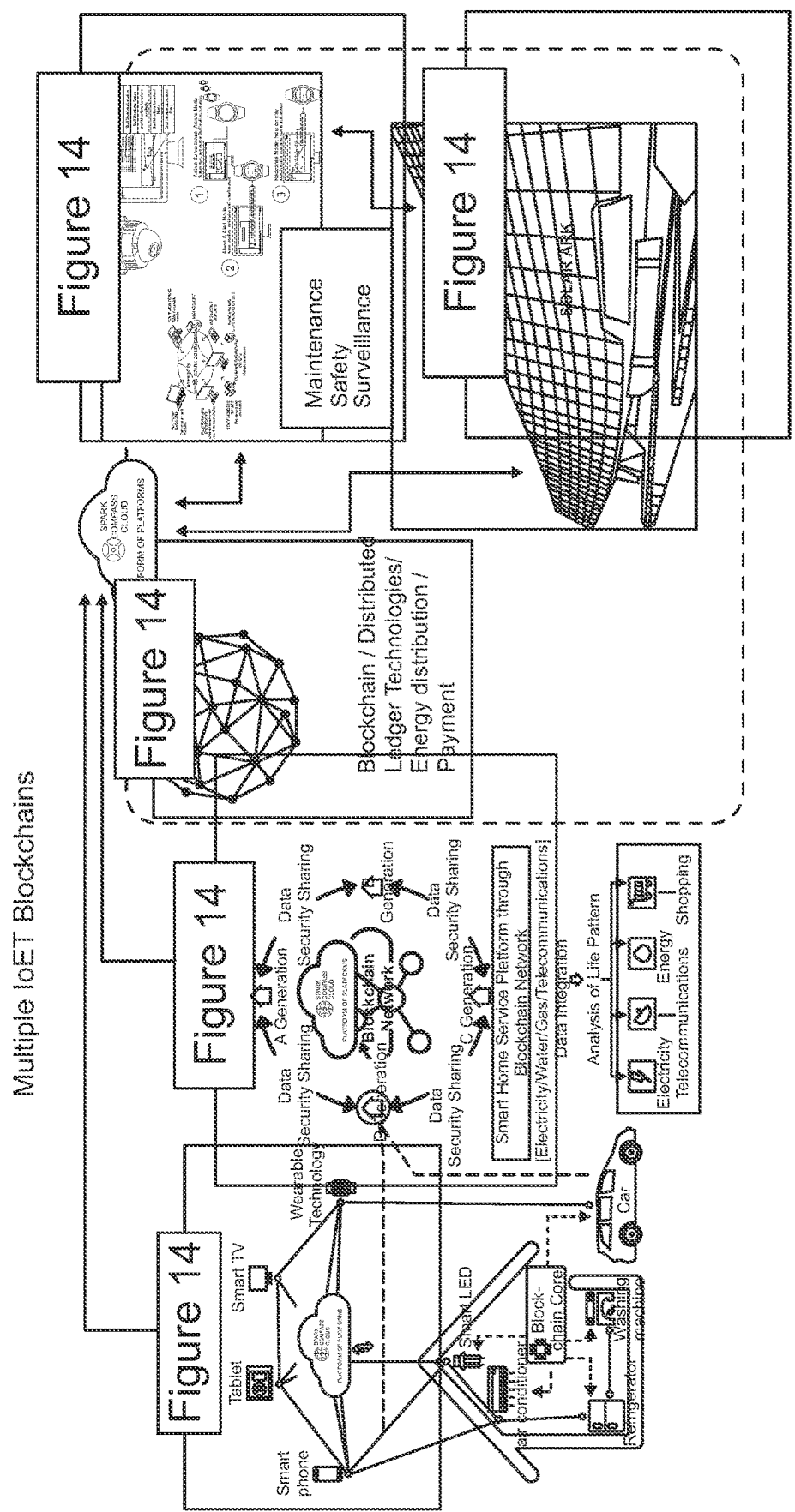
FIG. 48 is an infographic that shows multiple solutions as defined in FIG. 14 across multiple installations from homes, to autos, to surveillance to factories.

FIG. 48 is an infographic that shows multiple solutions as defined in FIG. 14 across multiple installations from homes, to autos, to surveillance to factories.

FIG. 49 is an infographic showing the solution described in FIG. 14 in use for teaching, learning and predictive data analysis.

Figure 50:
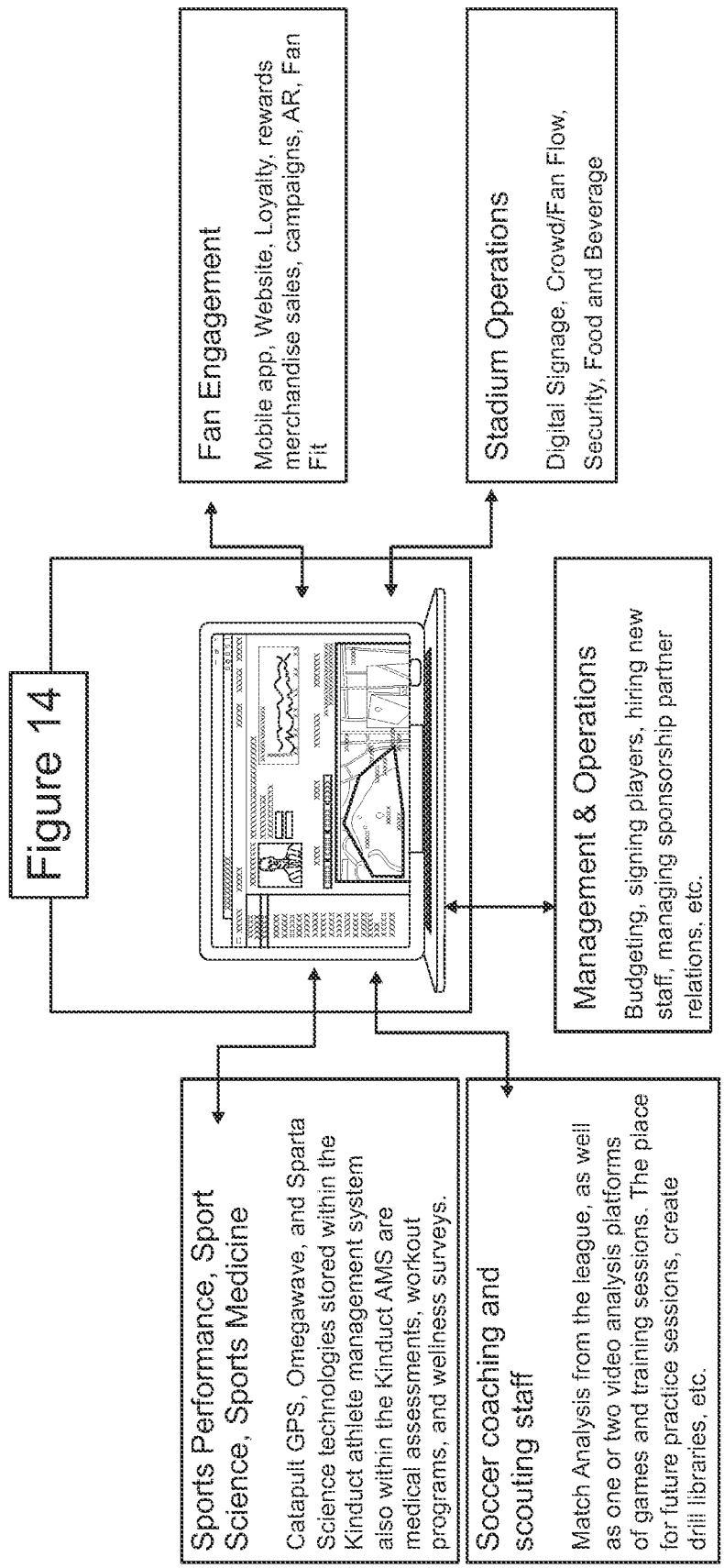
FIG. 50 is an infographic showing the centralized data collection across a sport team and how the various aspects delivers a single pane data dashboard as part of the system defined in FIG. 14.

FIG. 50 is an infographic showing the centralized data collection across a sport team and how the various aspects delivers a single pane data dashboard as part of the system defined in FIG. 14.

Figure 51:
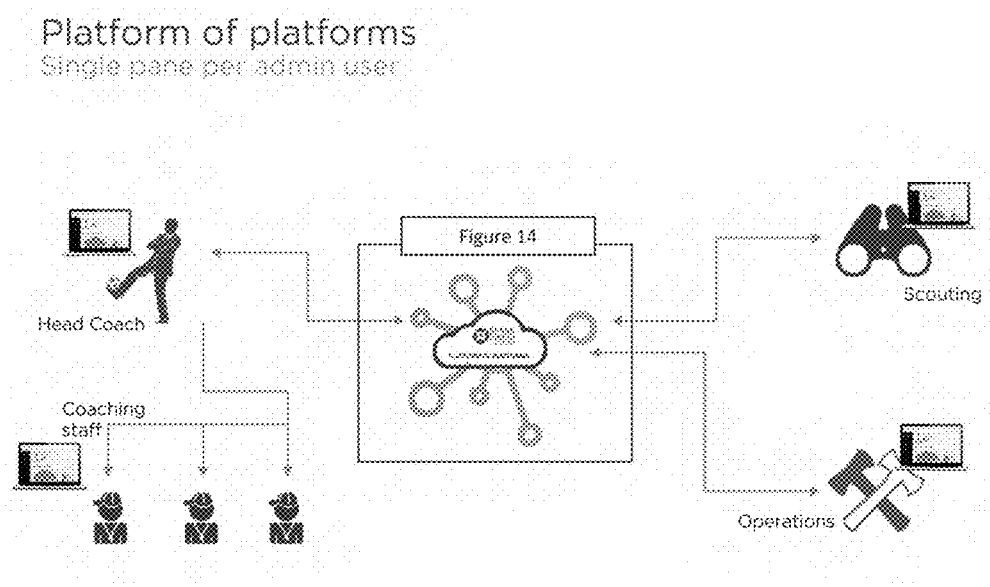
FIG. 51 is an infographic showing more detail on users of the dashboard of the systems depicted in FIG. 50.

FIG. 51 is an infographic showing more detail on users of the dashboard of the systems depicted in FIG. 50.

Figure 52:
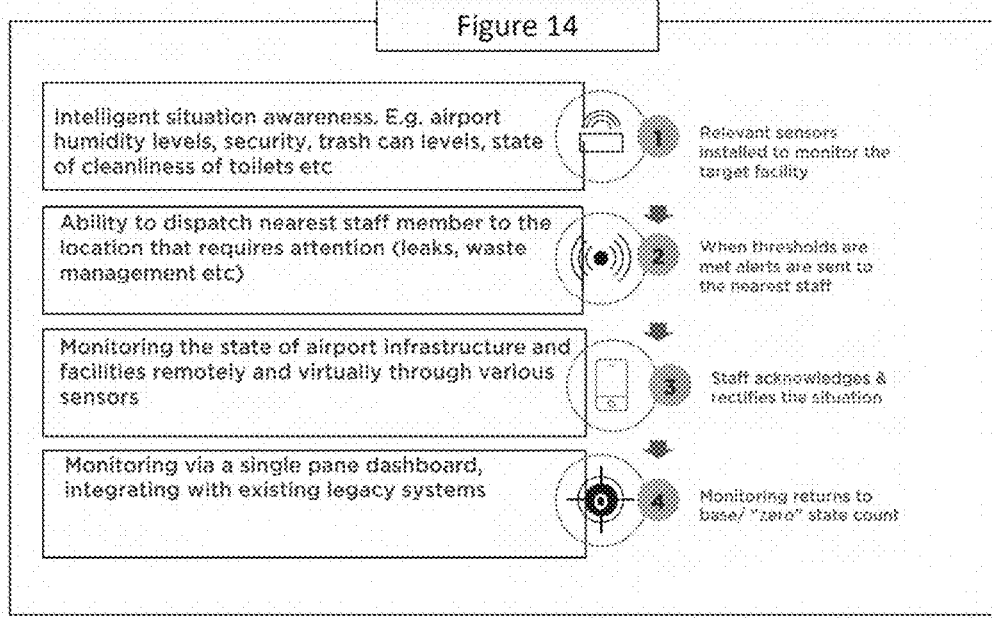
FIG. 52 is a schematic overview of the use of the platform as defined in FIG. 14 as used to capture sensor data and deliver workflow commands across an airport example.

FIG. 52 is a schematic overview of the use of the platform as defined in FIG. 14 as used to capture sensor data and deliver workflow commands across an airport example.

Figure 53:
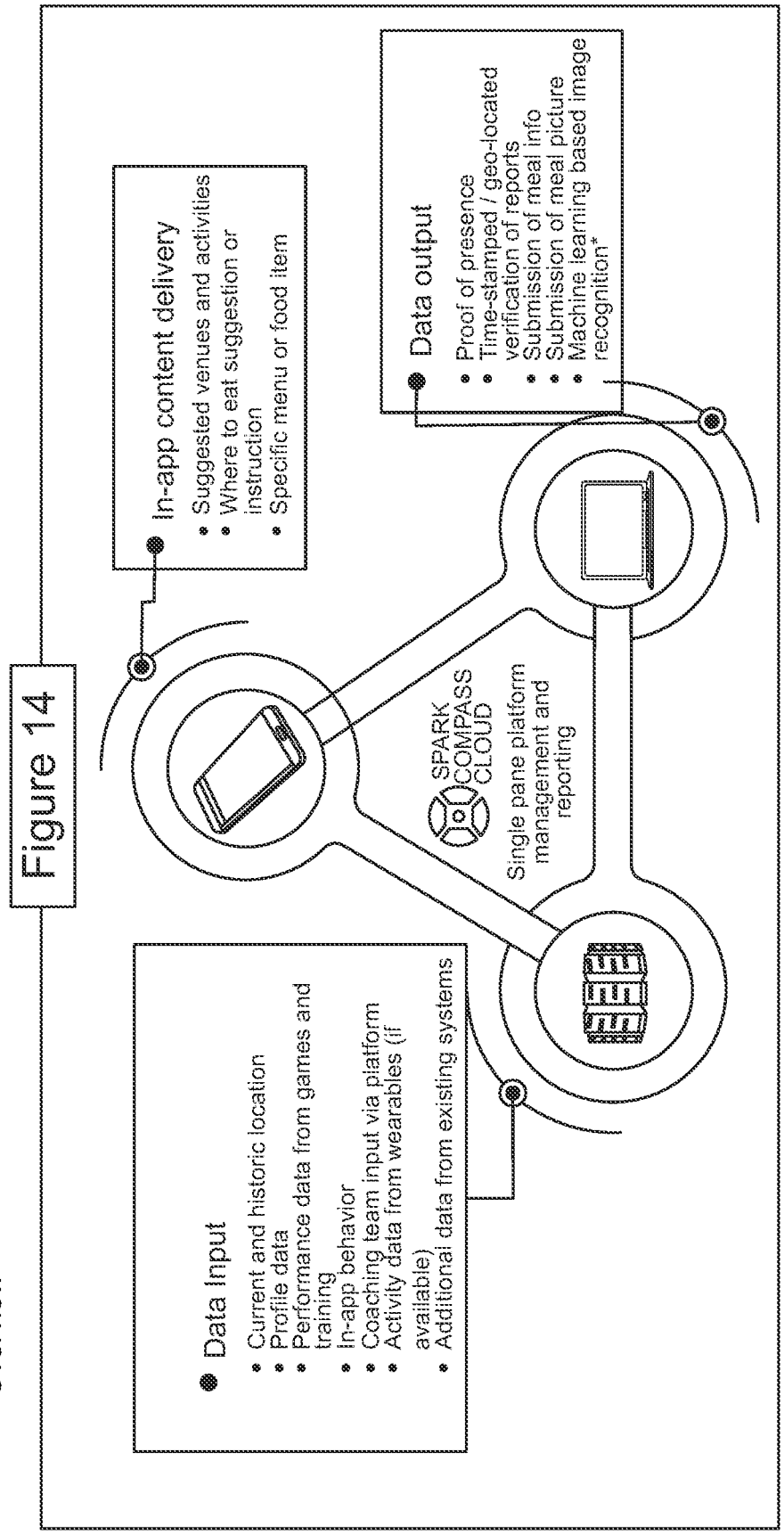
FIG. 53 is a schematic overview of the use the platform as defined in FIG. 14 as used to capture sensor data and deliver nutritional and food intake recommendations for an athlete.

FIG. 53 is a schematic overview of the use the platform as defined in FIG. 14 as used to capture sensor data and deliver nutritional and food intake recommendations for an athlete.

Figure 54:
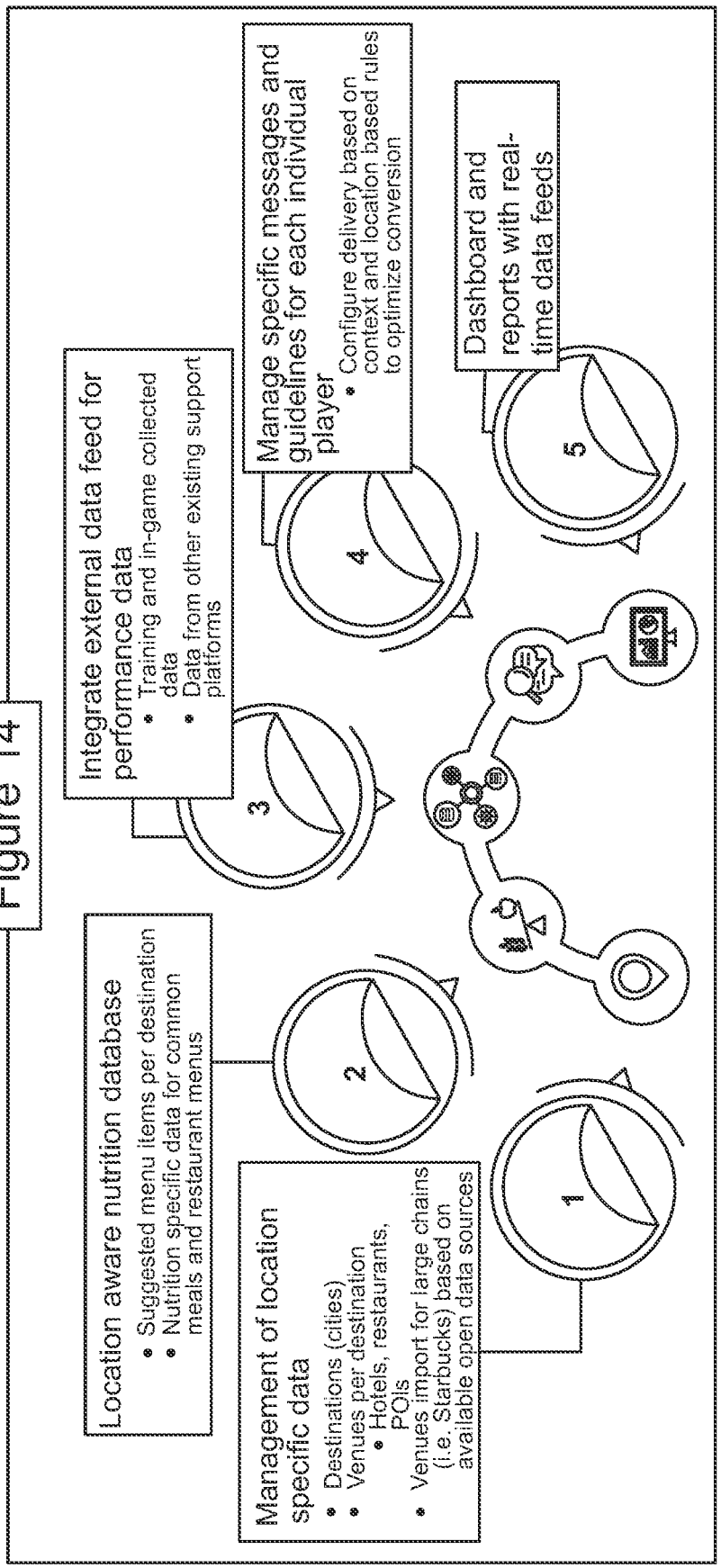
FIG. 54 is a schematic overview of the use the platform as defined in FIG. 14 as used to capture sensor data and deliver nutritional and food intake recommendations for an athlete with further details than defined in FIG. 53.

FIG. 54 is a schematic overview of the use the platform as defined in FIG. 14 as used to capture sensor data and deliver nutritional and food intake recommendations for an athlete with further details than defined in FIG. 53.

FIG. 55 is a schematic overview of the BOTT—Build Operate Train and Transfer business model used to further innovation and education using a system as defined in FIG. 14.

Figure 56:
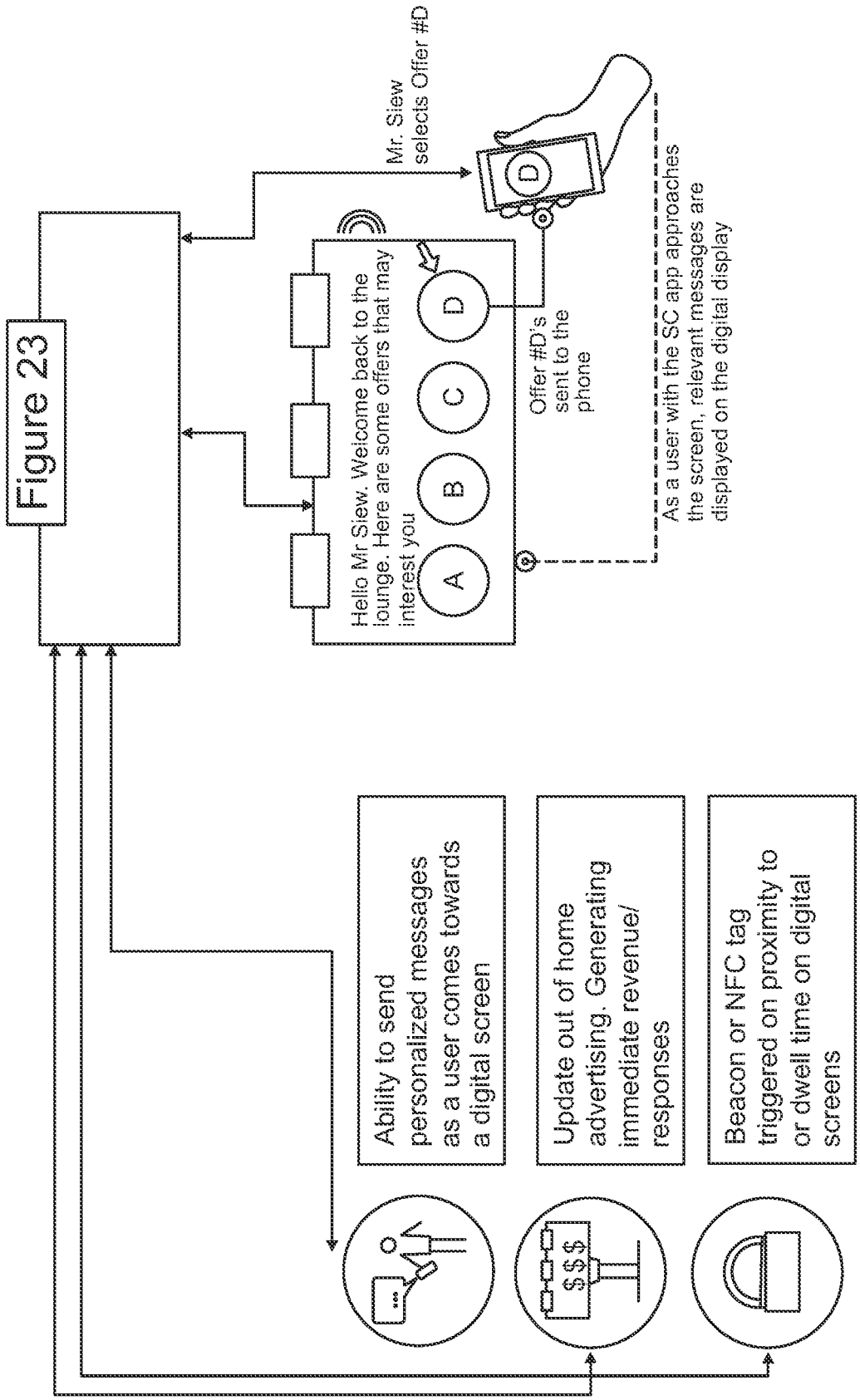
FIG. 56 is a schematic showing a solution such as defined in FIG. 23 deployed at an airport and integrated with digital signage, sensors and mobile devices.

FIG. 56 is a schematic showing a solution such as defined in FIG. 23 deployed at an airport and integrated with digital signage, sensors and mobile devices.

FIG. 57 is a schematic describing high level actions within a system as defined in FIG. 14 in use across a venue such as an airport and in use to track assets such as wheel chairs and airport buggies.

Figure 58:
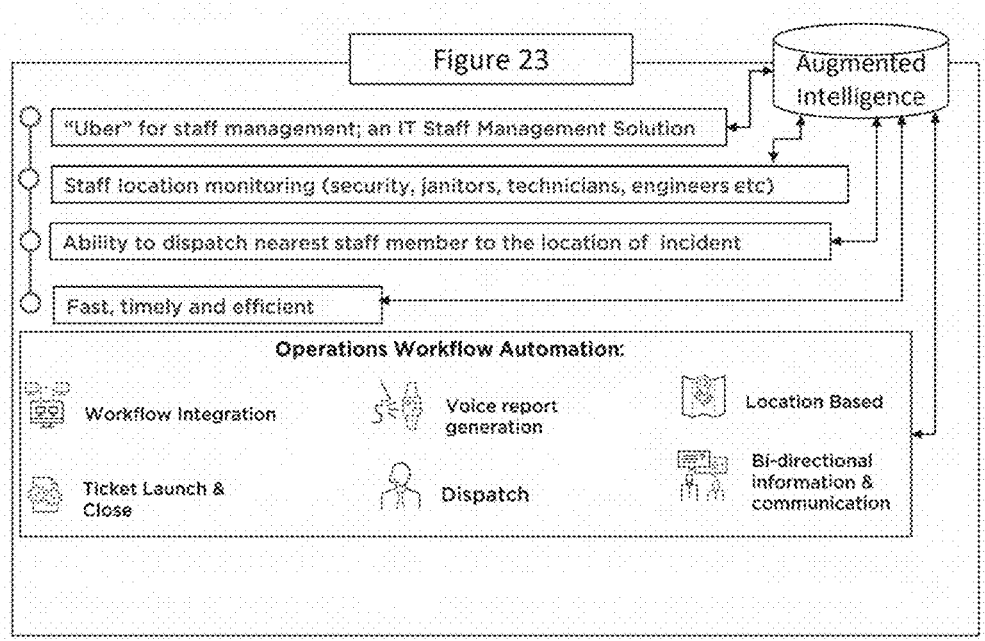
FIG. 58 is a schematic showing a solution such as defined in FIG. 23 deployed at an airport and integrated with sensors and mobile devices to improve workflow and dispatch of staff members using Augmented Intelligence.

FIG. 58 is a schematic showing a solution such as defined in FIG. 23 deployed at an airport and integrated with sensors and mobile devices to improve workflow and dispatch of staff members using Augmented Intelligence.

Figure 59:
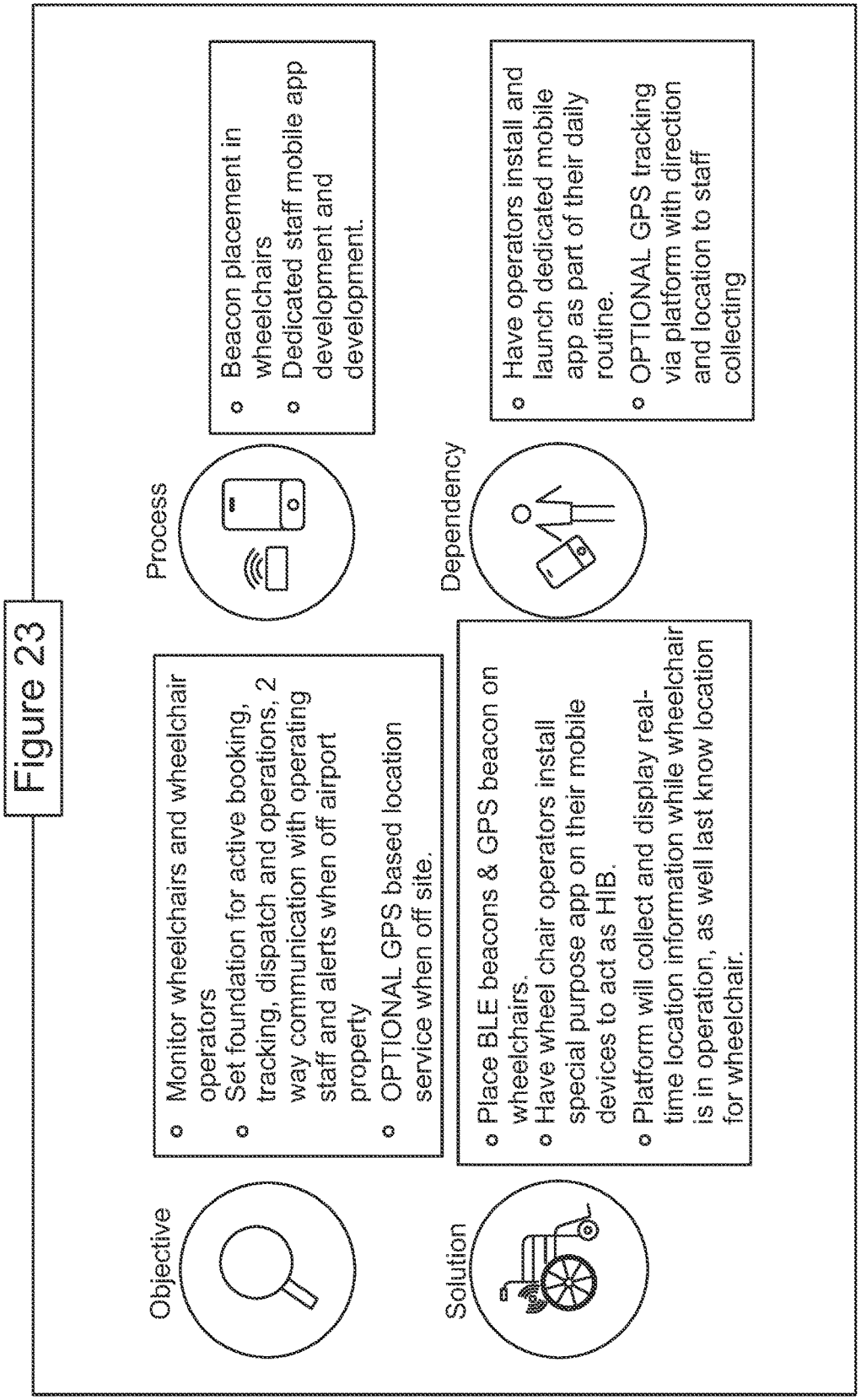
FIG. 59 is a schematic showing the various aspects such as objectives and dependencies associated with a system such as the one presented in FIG. 58.

FIG. 59 is a schematic showing the various aspects such as objectives and dependencies associated with a system such as the one presented in FIG. 58.

Figure 60:
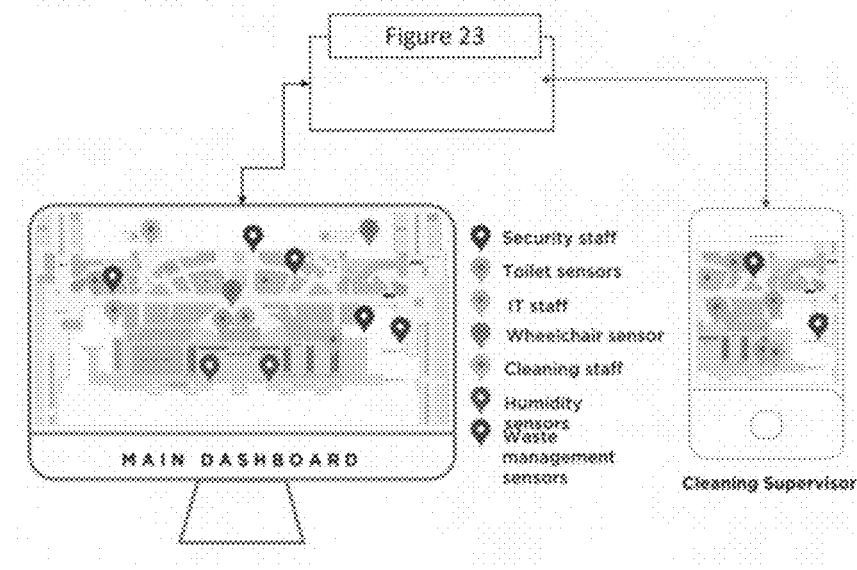
FIG. 60 is a schematic representation of the Single Pane dashboards presented by a solution as described in FIG. 23 customized to fit a standard computer monitor or a mobile device.

FIG. 60 is a schematic representation of the Single Pane dashboards presented by a solution as described in FIG. 23 customized to fit a standard computer monitor or a mobile device.

Figure 61:
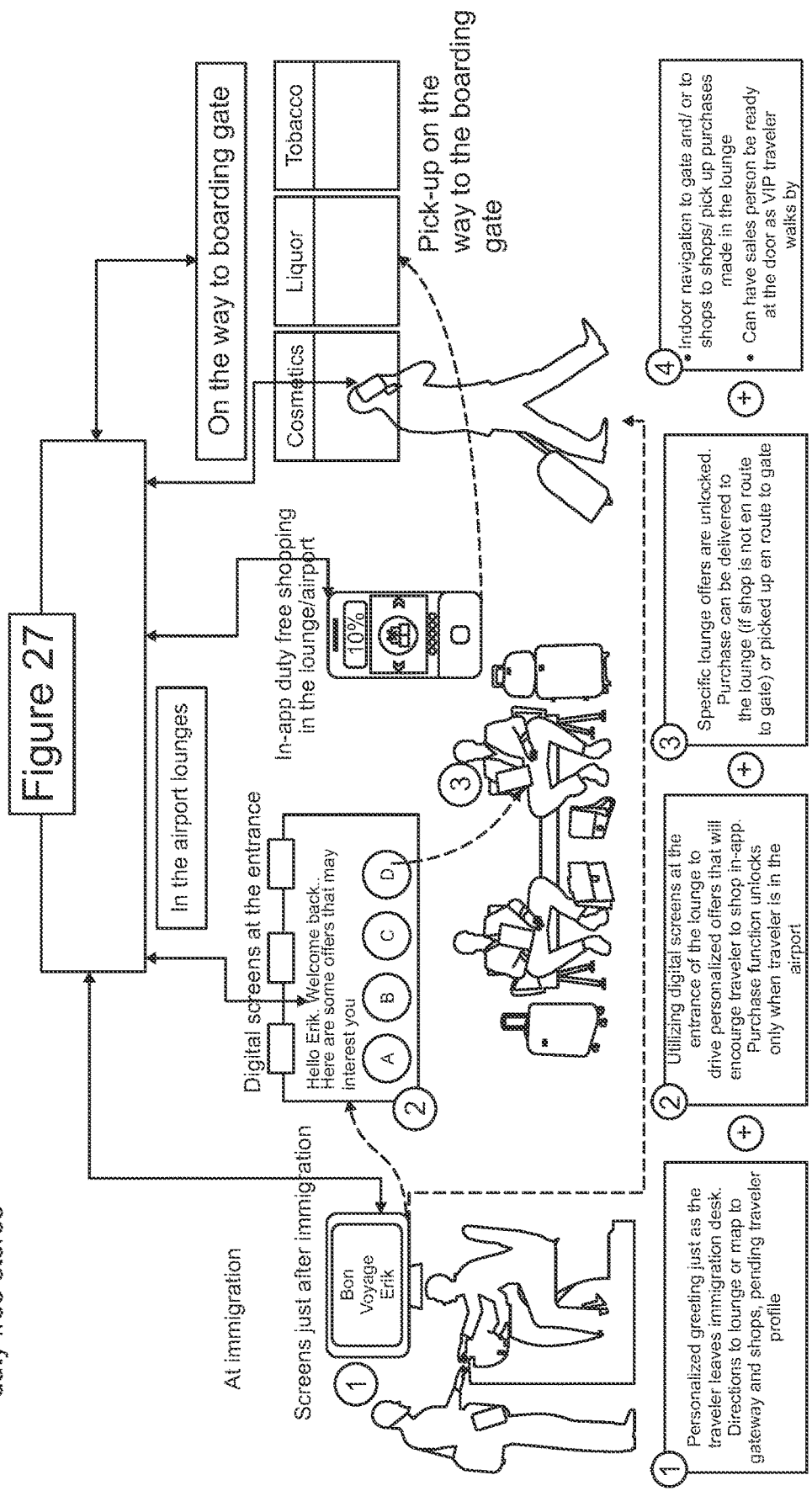
FIG. 61 depicts an installation of a system as described in FIG. 27 across and airport and the interactions on various devices with a traveler as he moves across the airport on his journey.

FIG. 61 depicts an installation of a system as described in FIG. 27 across and airport and the interactions on various devices with a traveler as he moves across the airport on his journey.

Figure 62:
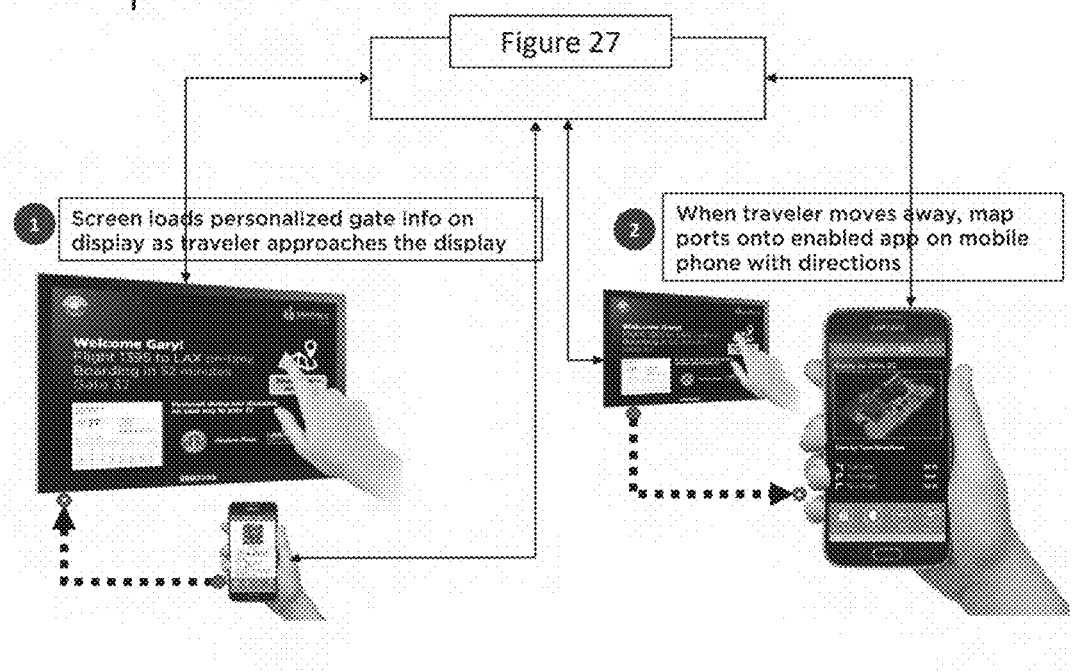
FIG. 62 depicts how a system such as described in FIG. 23 can provide interactive and personalized way finding and directions on interactive digital screens and port these instructions onto a mobile device of the user standing in front of said display.

FIG. 62 depicts how a system such as described in FIG. 23 can provide interactive and personalized way finding and directions on interactive digital screens and port these instructions onto a mobile device of the user standing in front of said display.

Figure 63:
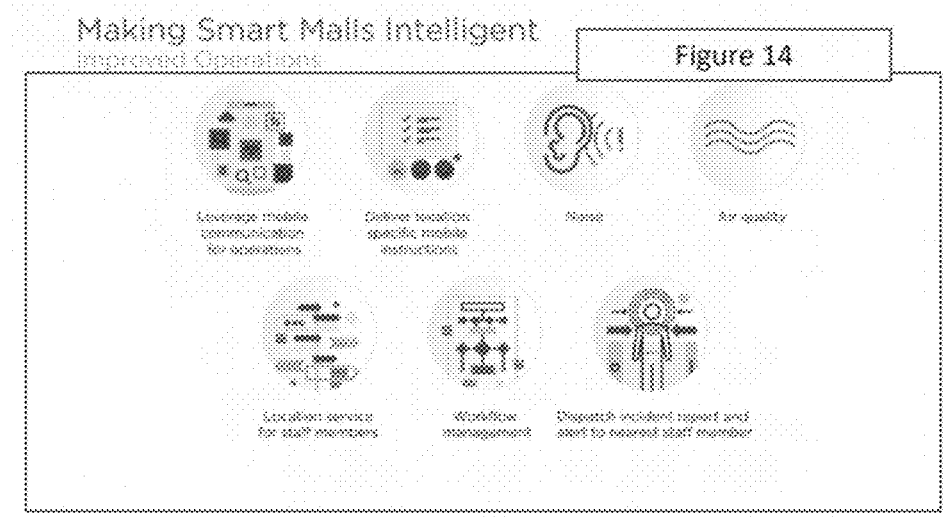
FIG. 63 depicts a schematic where a mall has a system such as the one described in FIG. 14 and the ways this can improve mall operations.

FIG. 63 depicts a schematic where a mall has a system such as the one described in FIG. 14 and the ways this can improve mall operations.

Figure 64:
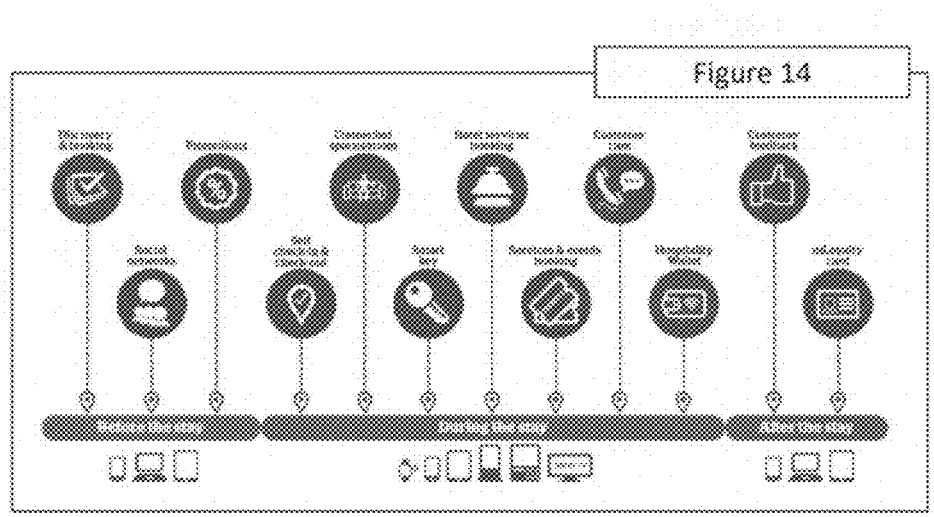
FIG. 64 depicts a schematic where a hotel operator has a system such as the one defined in FIG. 14 integrated and the ways it can interact with the hotel visitor during his travels.

FIG. 64 depicts a schematic where a hotel operator has a system such as the one defined in FIG. 14 integrated and the ways it can interact with the hotel visitor during his travels.

Figure 65:
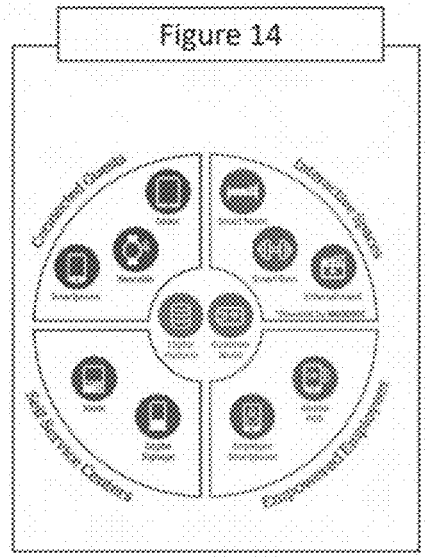
FIG. 65 depicts how a hotel operator that has a system such as the one defined in FIG. 14 integrated can empower guests and employees to deliver satisfaction.

FIG. 65 depicts how a hotel operator that has a system such as the one defined in FIG. 14 integrated can empower guests and employees to deliver satisfaction.

Figure 66:
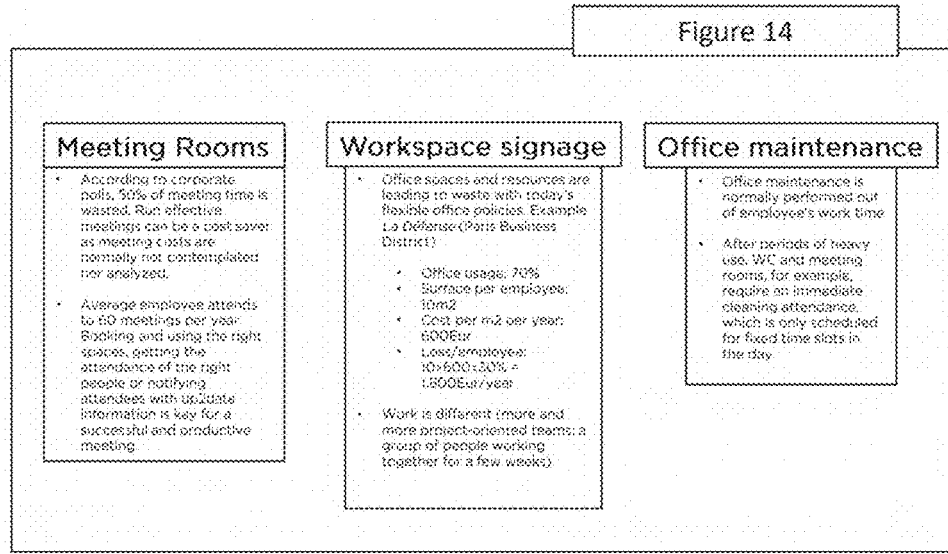
FIG. 66 is an infographic addressing some of the known issues around office space utility that a system such as the one presented in FIG. 14 can address.

FIG. 66 is an infographic addressing some of the known issues around office space utility that a system such as the one presented in FIG. 14 can address.

Figure 67:
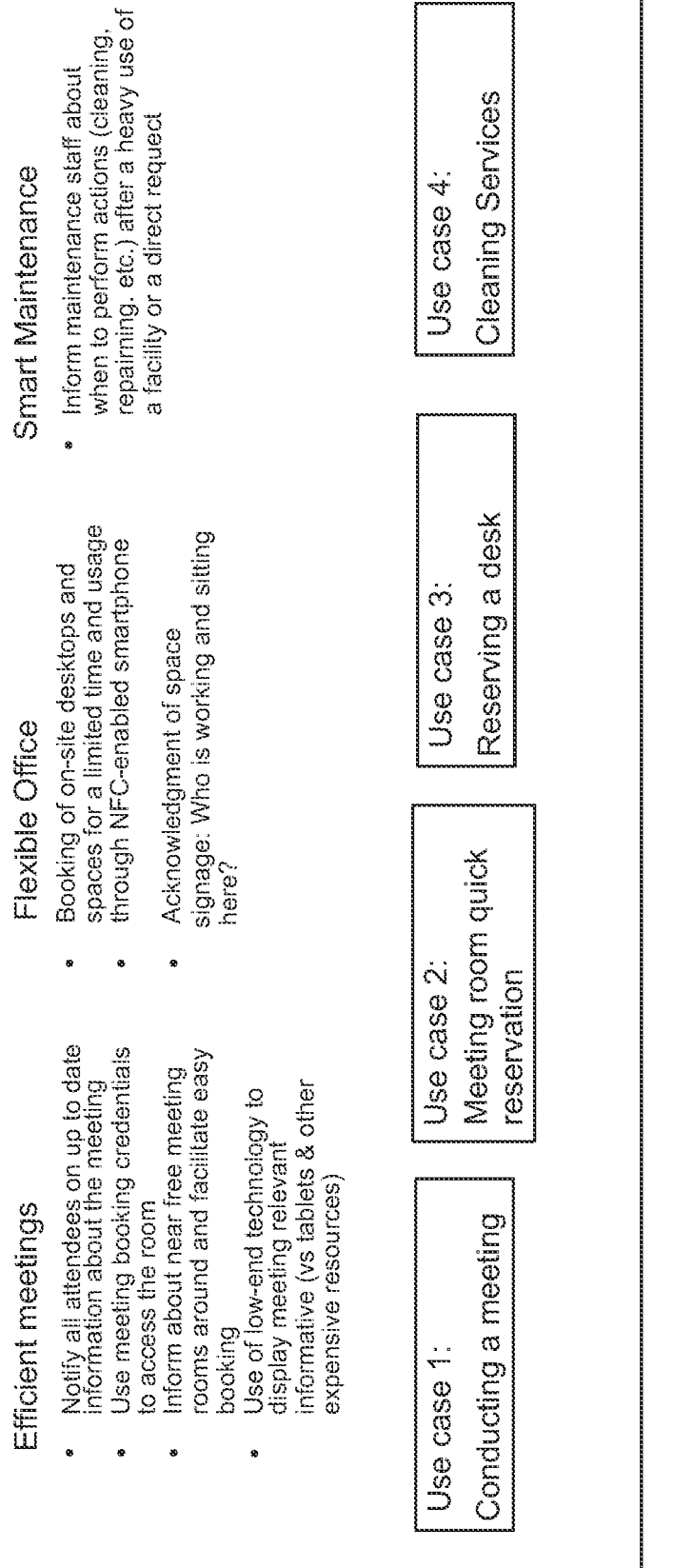
FIG. 67 is an infographic presenting a series of use cases for a connected office solution integrated with a platform such as the one described in FIG. 14.

FIG. 67 is an infographic presenting a series of use cases for a connected office solution integrated with a platform such as the one described in FIG. 14.

Figure 68:
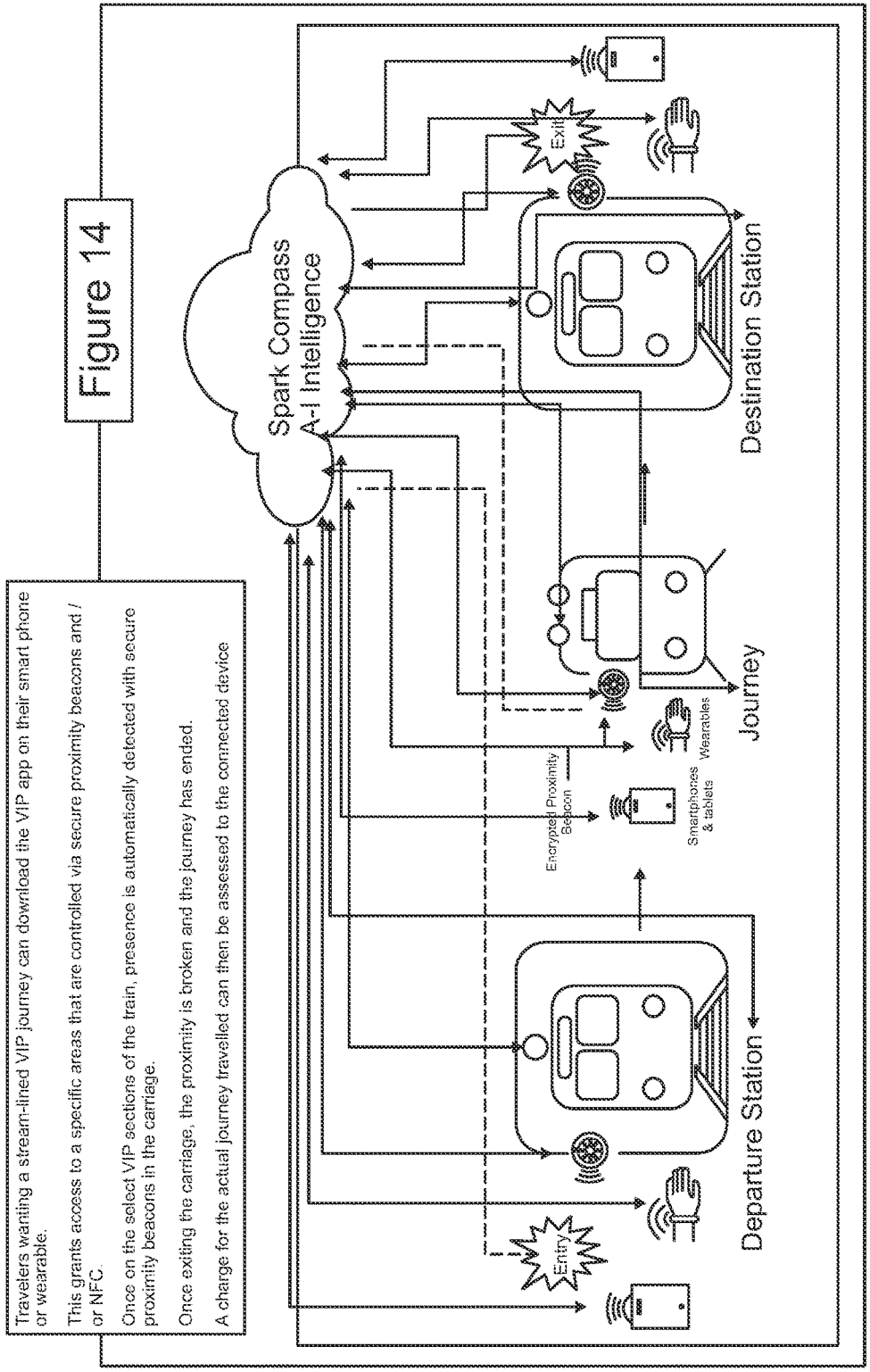
FIG. 68 is a schematic showing how a system such as the one described in FIG. 14 can be used to create enhanced journeys for a traveler on a train, deliver data and dynamic pricing capability of the operator of the system.

FIG. 68 is a schematic showing how a system such as the one described in FIG. 14 can be used to create enhanced journeys for a traveler on a train, deliver data and dynamic pricing capability of the operator of the system.

Figure 69:
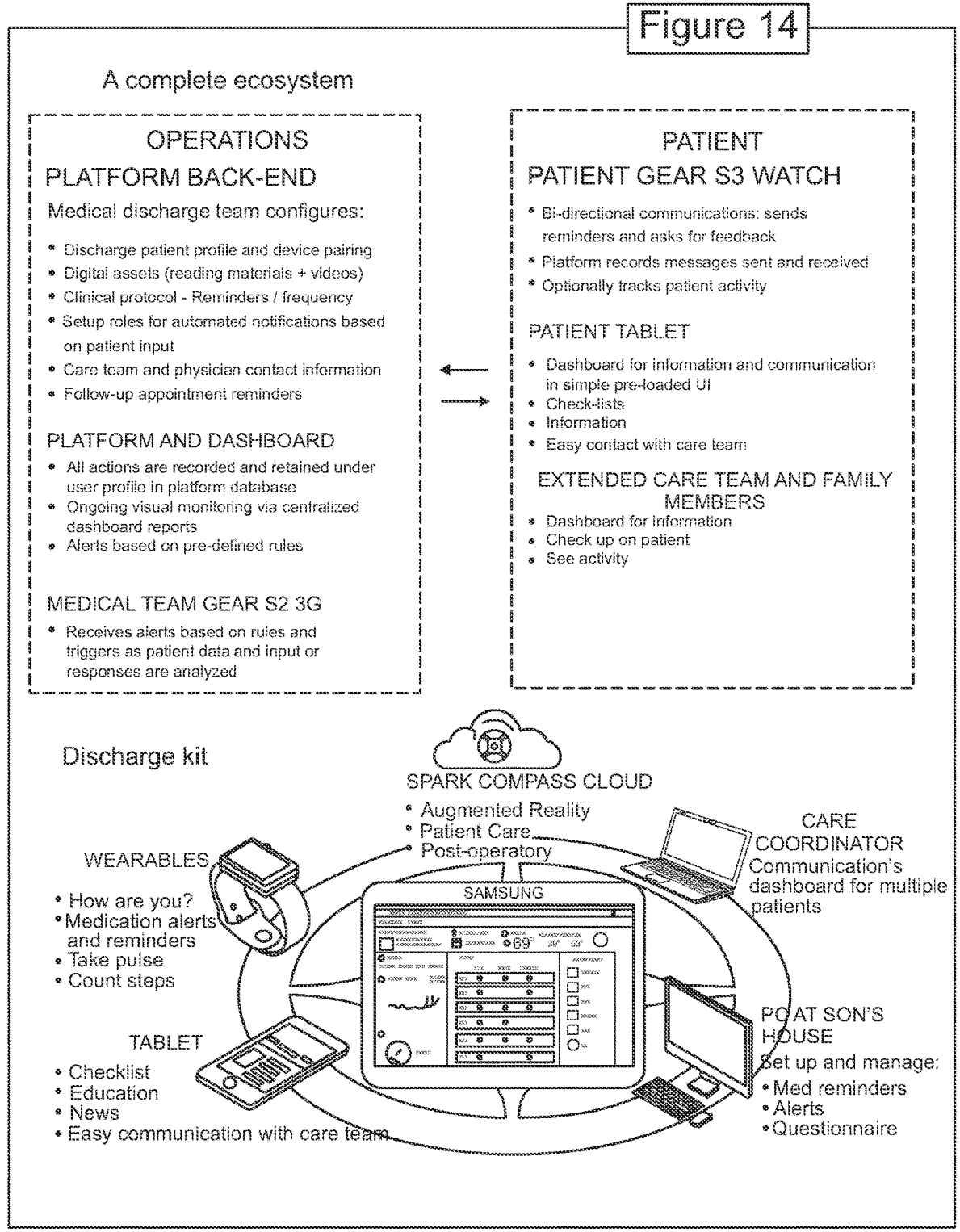
FIG. 69 is an infographic showing how a system such as the one described in FIG. 14 can be used to communicate with patients post operations via a solution such as a discharge kit.

FIG. 69 is an infographic showing how a system such as the one described in FIG. 14 can be used to communicate with patients post operations via a solution such as a discharge kit.

Figure 70:
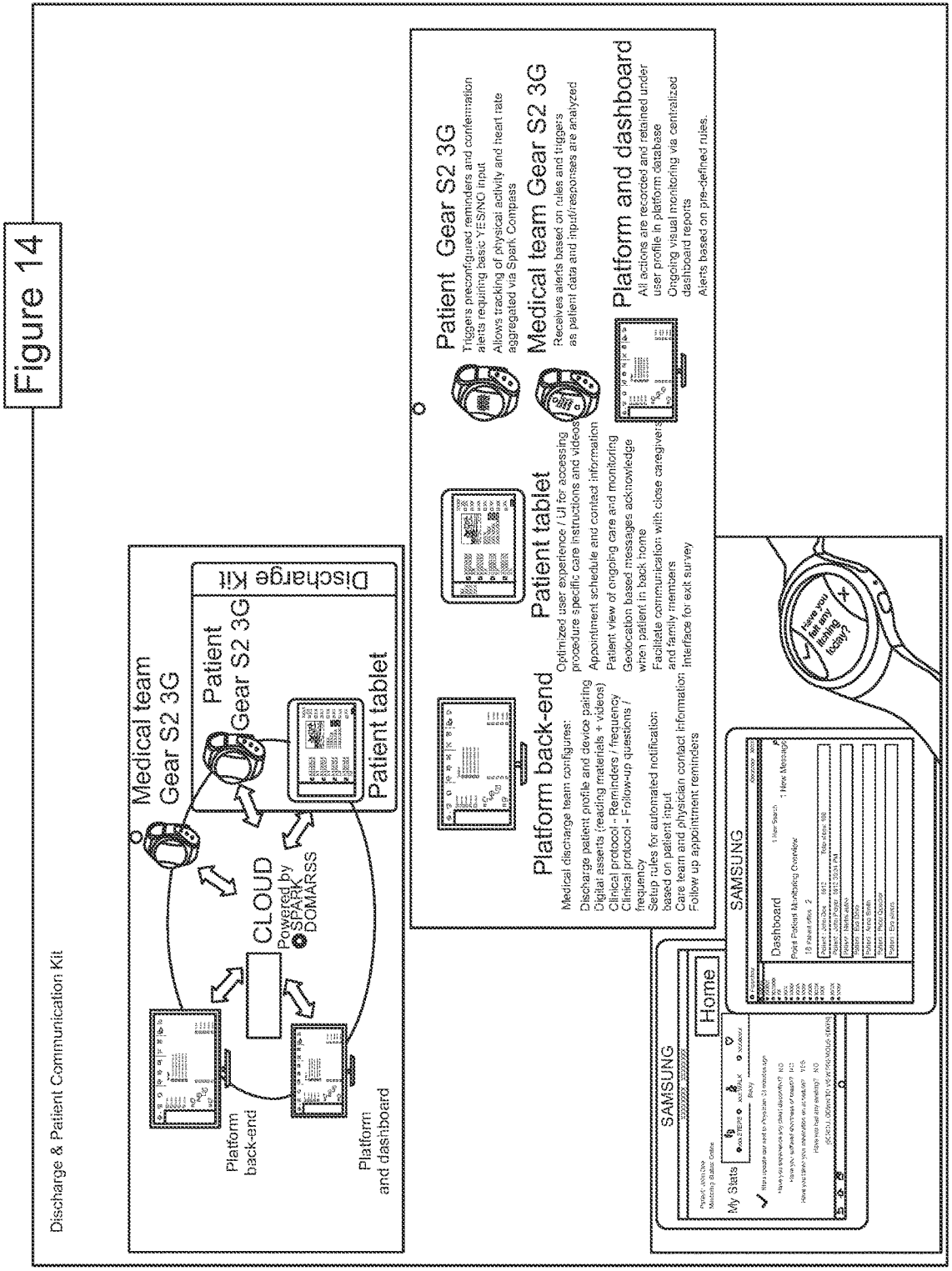
FIG. 70 is an infographic showing more details of the solution described in FIG. 69 where a system such as the one described in FIG. 14 can be used to communicate with patients post operations via a solution such as a discharge kit.

FIG. 70 is an infographic showing more details of the solution described in FIG. 69 where a system such as the one described in FIG. 14 can be used to communicate with patients post operations via a solution such as a discharge kit.

Figure 71:
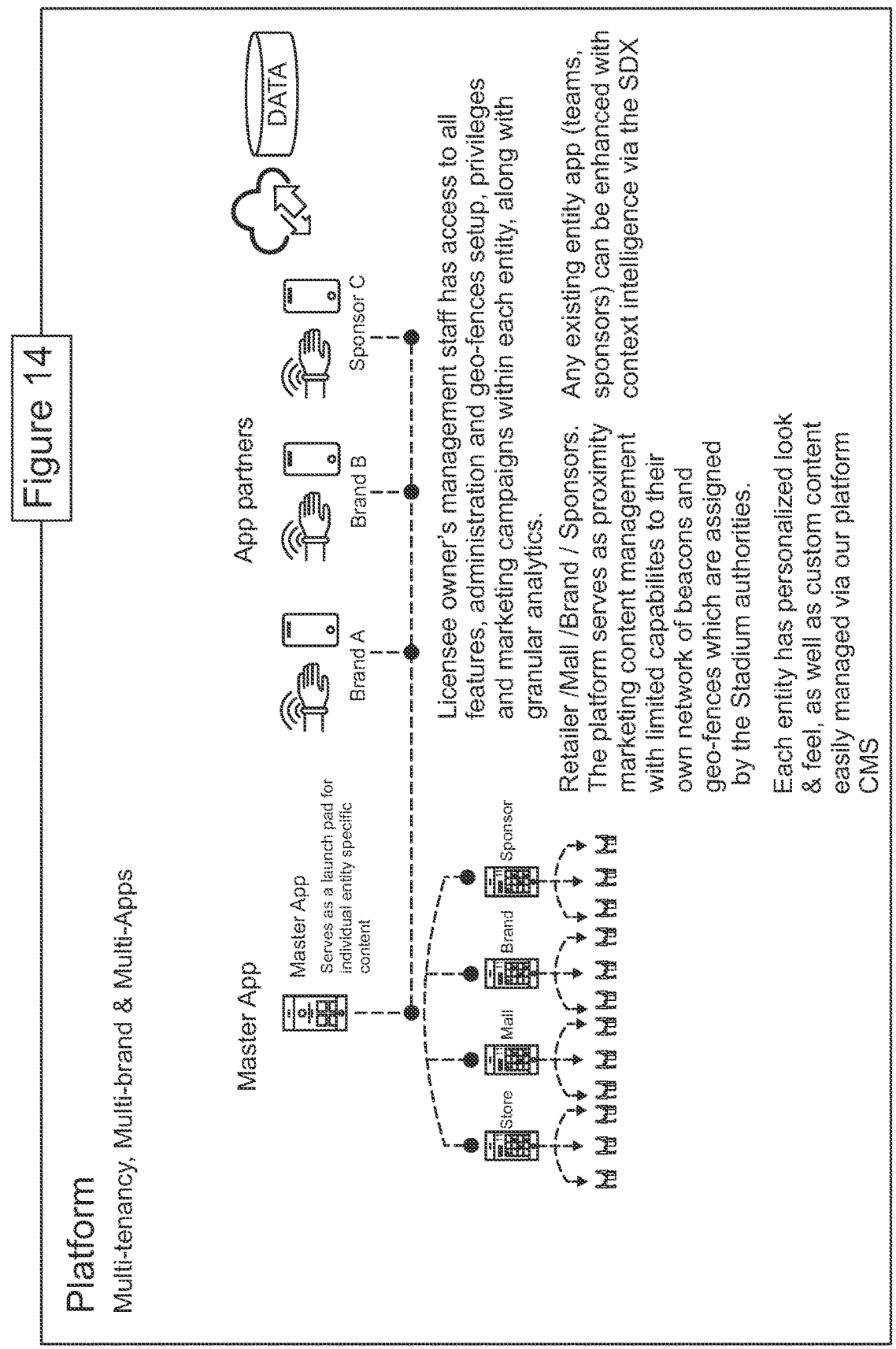
FIG. 71 is a schematic infographic showing how a system such as the one described in FIG. 14 can be used as a multi-tenant platform
Figure 72:
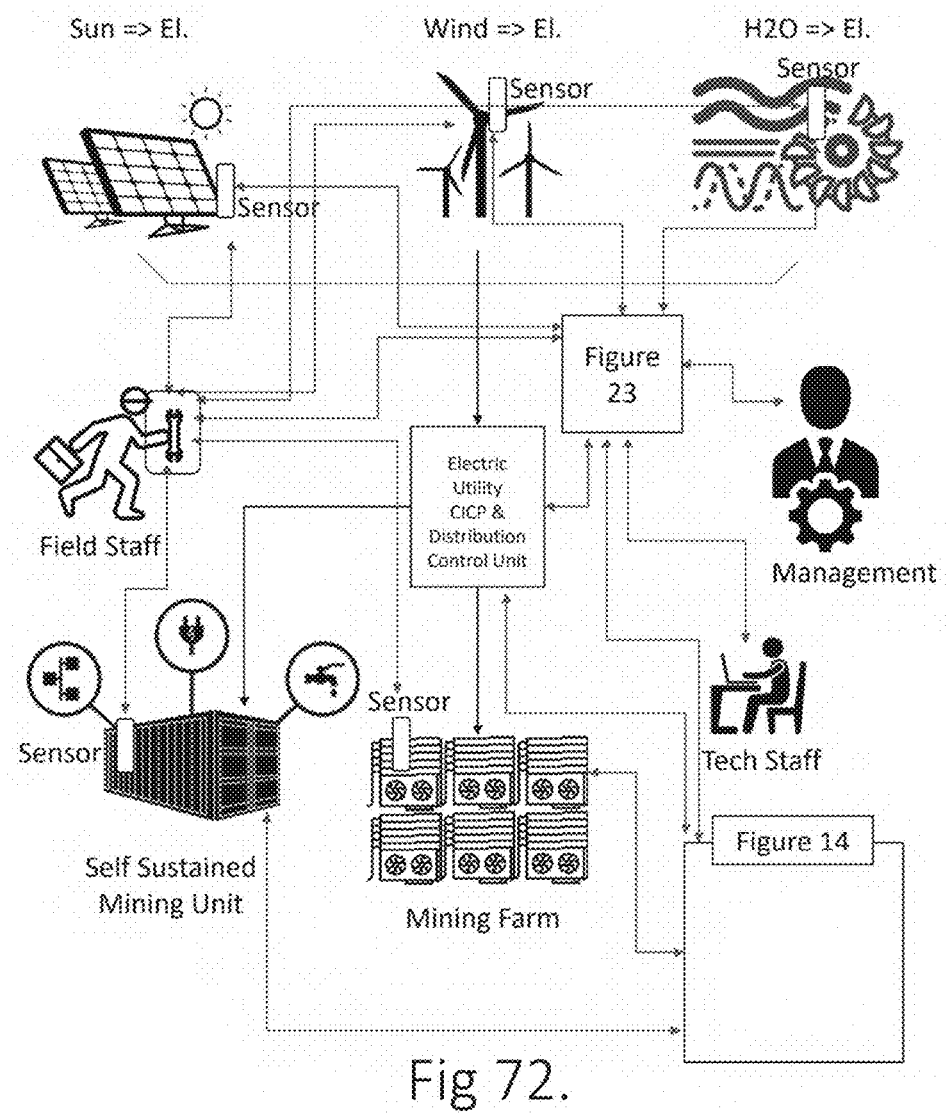
FIG. 72 is a schematic overview of a block chain mining operation that is powered by alternative electric power sources such as wind, solar, hydro that is controlled and distributed via a CICP control system that is connected to a system such as the one described in FIG. 14 and a system such as the one described in FIG. 23 for controls of staff members at any of the locations.

FIG. 71 is a schematic infographic showing how a system such as the one described in FIG. 14 can be used as a multi-tenant platform FIG. 72 is a schematic overview of a block chain mining operation that is powered by alternative electric power sources such as wind, solar, hydro that is controlled and distributed via a CICP control system that is connected to a system such as the one described in FIG. 14 and a system such as the one described in FIG. 23 for controls of staff members at any of the locations.

Figure 73:
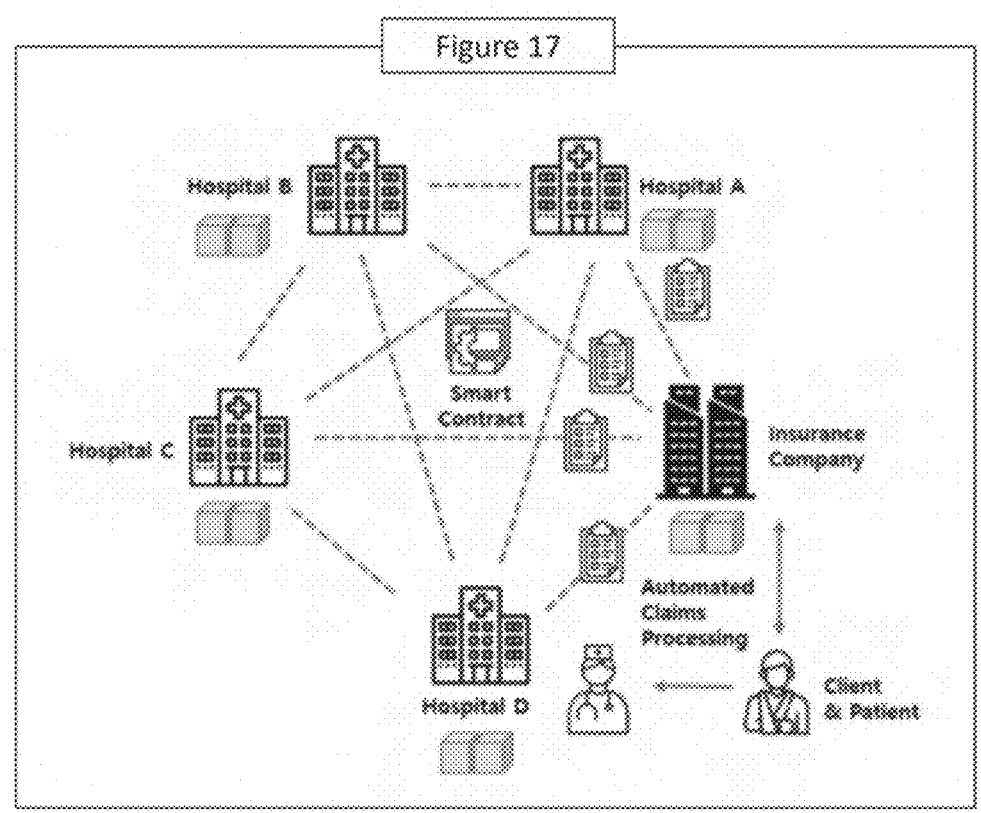
FIG. 73 is an infographic overview of a FIG. 14 system installed and integrated across a chain of hospitals and integrated with insurance companies.

FIG. 73 is an infographic overview of a FIG. 14 system installed and integrated across a chain of hospitals and integrated with insurance companies.

Figure 74:
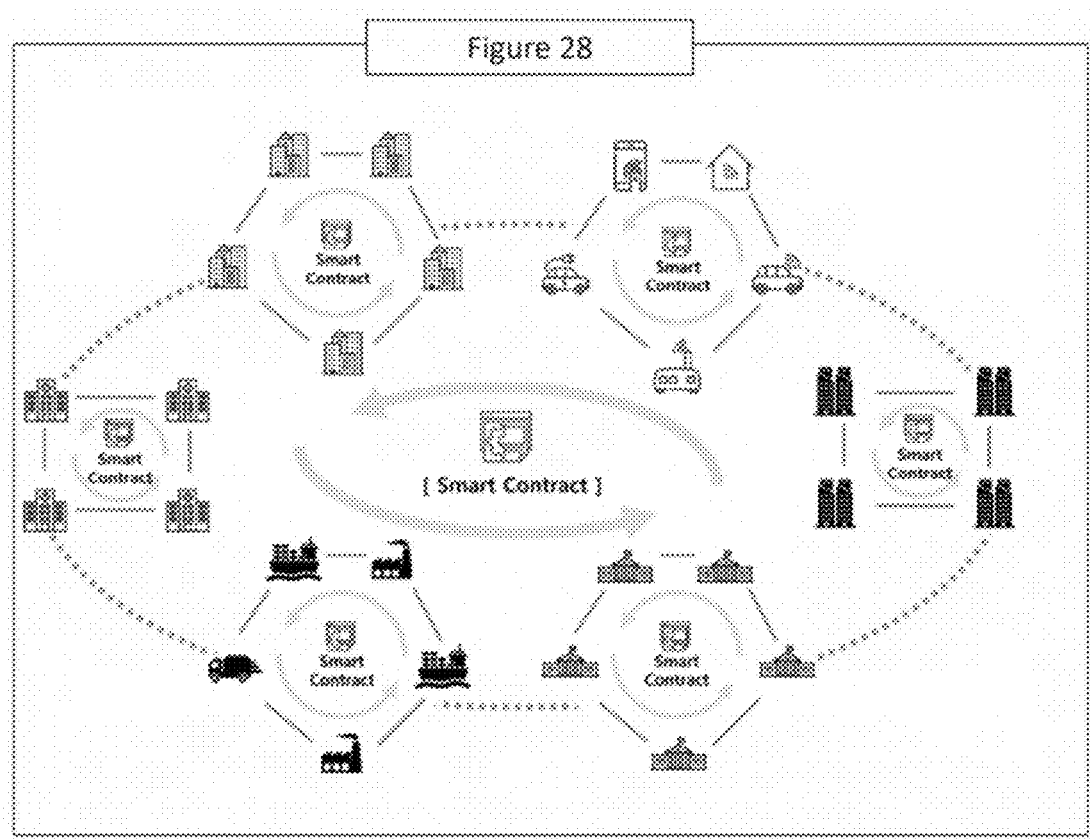
FIG. 74 is an infographic overview of a FIG. 28 system installed and integrated across a country or organization that has multiple communications across its installations.

FIG. 74 is an infographic overview of a FIG. 28 system installed and integrated across a country or organization that has multiple communications across its installations.

Figure 75:
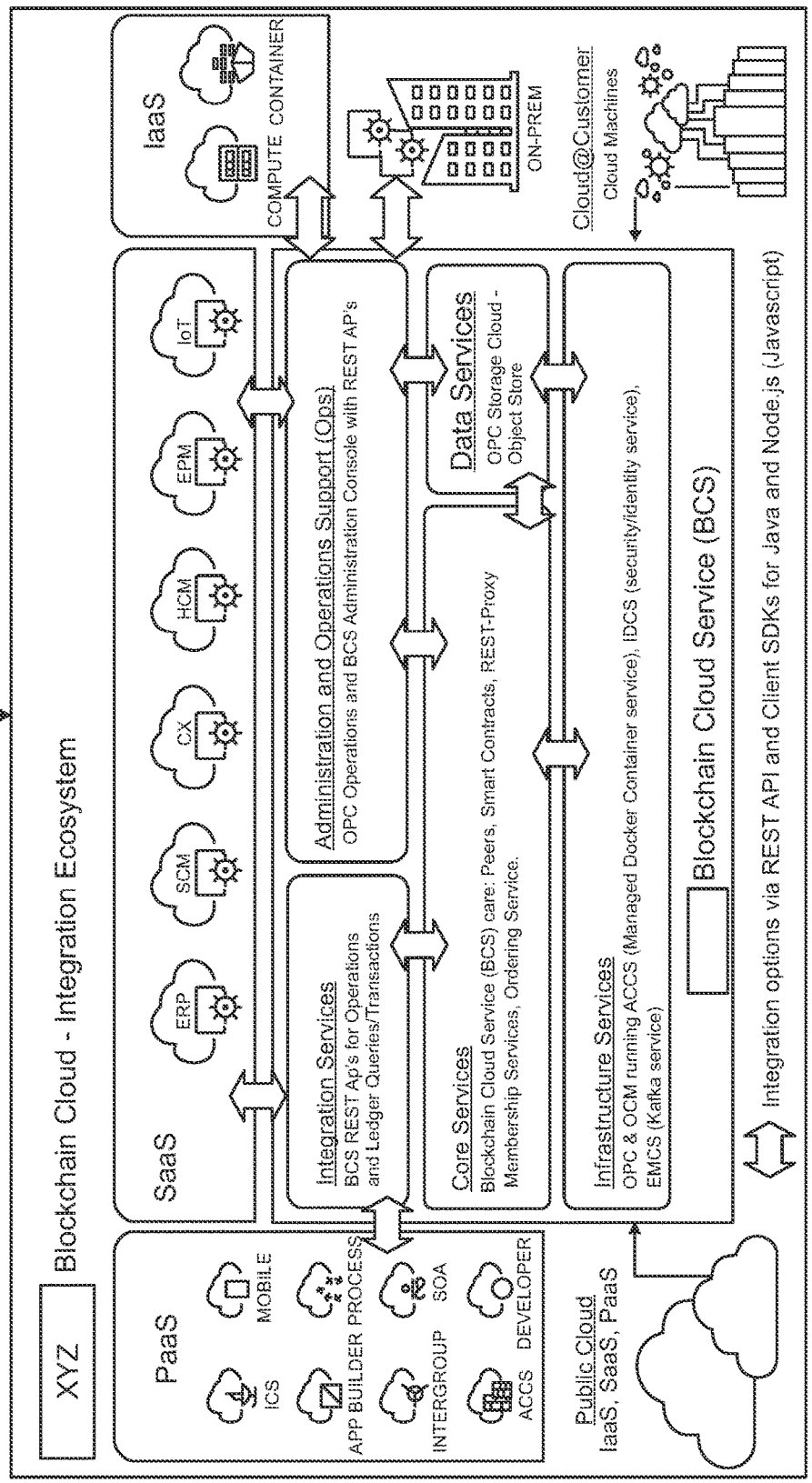
FIG. 75 is an overview schematic representation showing how third party solutions can be integrated with the FIG. 28 solution.

FIG. 75 is an overview schematic representation showing how third party solutions can be integrated with the FIG. 28 solution

What is claimed is:

1. A multi-level control, variable access, multi-user computer-implemented system adapted for providing on a network, predictably useful, contextually intelligent information among network-connected with data storage based on servers distributed across multiple servers in secure and encrypted manner with algorithms programmed into a data storage programming within a complete system comprising:
a first control level having:
 a first control level user, and
 a plurality of first level network-connected devices,
  wherein the first control level user is adapted to control access to said system, data gathered and retained from the interactions, and data retained from interactions and instructions delivered thereto;
a second control level having:
 N second control level users, where N is an integer,
 a plurality of second level network-connected devices,
  wherein access to the second control level is controlled by said first control level user and each of N second control level users have access to one or more of said second level network-connected devices where data gathered from communications with N are stored in a data storage system across multiple data storage blocks;

a third control level having:
   m third control level users, where m is an integer, wherein the third control level being controlled by data retained in data blocks and actions created from further interactions also retained and stored in blocks in distributed nodes across data storage servers and data storage devices;

a first user mobile communication device associated with a first user;

at least one sensor included on said mobile communication device, configured to collect data associated with interaction with the first user in context;

a server that is in communication with said mobile communication device;

a relationship management system that resides in said server, said relationship management system being configured to be populated with historical demographic data for said first user;

wherein all the historical demographic data is stored in blocks within a distributed data storage system;

sensor input data transmitted from said first user mobile communication device to said servers from the user's device providing sensor input from sensors within the context of the said first user is in said first user current context;

wherein said sensor input data includes data corresponding to a current location of said first user mobile communication device and at least data corresponding to one or more of the group consisting of:
   current activity of said first user, mental state of said first user, physical state of said first user, mode of travel of said first user, direction of travel of said first user, speed of travel of said first user, level of engagement of said first user in said first user current context, surrounding environment of said first user in said first user current context, identity of one or more persons in addition to said first user and who are nearby said first user in said first user current context, identity of at least one mobile device other than said first user mobile communication device, sensors in the context of said first users, sensors that detect said users' activity, systems and computations systems that enhance and assist the said first user in the current activity in said context, the computation on devices that are in the said user's use or context and that is nearby said first user mobile communication device in said first user current context;

wherein the system is configured to perform the steps of:
   providing said sensor input data from said first user mobile communication device to create acquired first user current data;
   capturing, by said first user mobile communication device through an image recognition application, real-time image data to create first user captured real-time image data for said first user current context;
   generating first user current contextual data for said first user from said acquired first user current data and from said first user captured real-time image data for said first user current context;
   gathering said first user current contextual data to create said first user current contextual data corresponding to said first user's current context;
   uploading said first user current contextual data corresponding to said first user's current context via a wide area mobile communication network to said server;
   matching said first user current contextual data corresponding to said first user's current context with said first user historical demographic and environmental data;
   combining and processing in the relationship management system the first user current contextual data, current environmental data and historical demographic data to define a message relevant to the first user while the first user is in the current context;
   generating feedback data for said first user that is contextually relevant to said first user's current context and that is predictably useful to said first user as said first user enters a said new context to form first user useful feedback data; and,
   transmitting to and displaying on said first user mobile communication device said first user useful feedback data to provide said contextually intelligent mobile information.

2. The system of claim 1, further comprising an Augmented Intelligence computation network where connected devices with computation power perform computation based on the capability of each such device in enabling the network's understanding of context, said computation network configured to:
   retain and transmit computation outcomes to a central CICP, thereby providing a deeper intelligence and understanding of the context of each such device,
   perform further computations based on the output of the original computation as this is processed by the central computation device and any and all associated smart contract computations performed by the connected blockchain; and
   perform further communications based on the feedback from such computations and the aggregated understanding of the improved contextual intelligence resulting from such computations.

3. The system of claim 1, wherein the distributed network of nodes, comprises:
   the at least one connected sensor having data storage capability and communication capabilities;
   wherein smart contracts are integrated within a blockchain node for on-device computation; and
   wherein communication of the output from said smart contracts on connected node storage devices are transmitted to a main CICP and stored on the main blockchain for a fully integrated and augmented intelligence data storage network integration to the CICP.

4. The system of claim 3, wherein each node and the access to each node of the distributed network of nodes can be granted via tokens, wherein each token includes:
   a value associated with each interaction, action and/or event; and
   an associated smart contract;
   said nodes configured to interface with the CICP to verify, record and retain any interactions, content, instructions, outcomes, actions, events, commands or other associated computations, wherein said nodes are further configured to:
      collect data related to a token owner's real-world interactions with the CICP, including performance of tasks that trigger actions and associated communications within the network; and store owner interaction data relating to at least one of: a main distributed ledger block chain, the CICP, and edge data storage nodes.

5. The system of claim 4, wherein the edge data storage nodes are a physical device that acts as a token, namely at least one of the group consisting of: an automobile key, magnetic card, implanted device, augmented reality glasses or regular mobile communication device or wearable.

* * * * *